US012229966B2

(12) United States Patent
Li et al.

(10) Patent No.: US 12,229,966 B2
(45) Date of Patent: *Feb. 18, 2025

(54) SYSTEMS AND METHODS FOR CLASSIFICATION OF ARTERIAL IMAGE REGIONS AND FEATURES THEREOF

(71) Applicant: LightLab Imaging, Inc., Westford, MA (US)

(72) Inventors: Shimin Li, Acton, MA (US); Ajay Gopinath, Bedford, MA (US); Kyle Savidge, Medford, MA (US)

(73) Assignee: LightLab Imaging, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,148

(22) Filed: Jan. 11, 2023

(65) Prior Publication Data

US 2023/0162367 A1 May 25, 2023

Related U.S. Application Data

(63) Continuation of application No. 17/561,018, filed on Dec. 23, 2021, which is a continuation of application
(Continued)

(51) Int. Cl.
*G06N 3/08* (2023.01)
*G06F 18/211* (2023.01)
(Continued)

(52) U.S. Cl.
CPC .............. *G06T 7/11* (2017.01); *G06F 18/211* (2023.01); *G06F 18/214* (2023.01); *G06F 18/40* (2023.01);
(Continued)

(58) Field of Classification Search
CPC ................... G06T 7/11; G06T 2200/24; G06T 2207/10016; G06T 2207/10101;
(Continued)

(56) References Cited

U.S. PATENT DOCUMENTS 6,508,769 B2 1/2003 Bonnefous
7,860,283 B2 12/2010 Begelman et al.
(Continued)

FOREIGN PATENT DOCUMENTS

CN 105637536 A 6/2016
CN 108492272 A 9/2018
(Continued)

OTHER PUBLICATIONS

International Search Report for Application No. PCT/US2020/013416, dated Apr. 3, 2020, pp. 1-3.
(Continued)

*Primary Examiner* — Charlotte M Baker
(74) *Attorney, Agent, or Firm* — Lerner David LLP

(57) ABSTRACT

In part, the disclosure relates to methods, and systems suitable for evaluating image data from a patient on a real time or substantially real time basis using machine learning (ML) methods and systems. Systems and methods for improving diagnostic tools for end users such as cardiologists and imaging specialists using machine learning techniques applied to specific problems associated with intravascular images that have polar representations. Further, given the use of rotating probes to obtain image data for OCT, IVUS, and other imaging data, dealing with the two coordinate systems associated therewith creates challenges. The present disclosure addresses these and numerous other challenges relating to solving the problem of quickly imag- (Continued)

ing and diagnosis a patient such that stenting and other procedures may be applied during a single session in the cath lab.

12 Claims, 42 Drawing Sheets
(29 of 42 Drawing Sheet(s) Filed in Color)

Related U.S. Application Data

No. 16/741,718, filed on Jan. 13, 2020, now Pat. No. 11,250,294.

(60) Provisional application No. 62/791,876, filed on Jan. 13, 2019.

(51) Int. Cl.
| | | |
|---|---|---|
| *G06F 18/214* | (2023.01) | |
| *G06F 18/40* | (2023.01) | |
| *G06N 3/04* | (2023.01) | |
| *G06T 7/11* | (2017.01) | |

(52) U.S. Cl.
CPC ............... *G06N 3/04* (2013.01); *G06N 3/08* (2013.01); *G06V 2201/03* (2022.01)

(58) Field of Classification Search
CPC . G06T 2207/10116; G06T 2207/10132; G06T 2207/20081; G06T 2207/20084; G06T 2207/20101; G06T 2207/20104; G06T 2207/30048; G06T 2207/30104; G06F 18/211; G06F 18/214; G06F 18/40; G06N 3/04; G06N 3/08; G06V 2201/03
USPC ........................................................ 382/156
See application file for complete search history.

(56) References Cited

U.S. PATENT DOCUMENTS

| | | | |
|---|---|---|---|
| 9,138,147 | B2 | 9/2015 | Schmitt et al. |
| 10,878,572 | B2 | 12/2020 | Gopinath et al. |
| 2010/0094127 | A1 | 4/2010 | Xu |
| 2012/0075638 | A1 | 3/2012 | Rollins et al. |
| 2012/0283569 | A1 | 11/2012 | Ciompi et al. |
| 2013/0310698 | A1 | 11/2013 | Judell et al. |
| 2014/0100440 | A1 | 4/2014 | Cheline et al. |
| 2014/0254900 | A1 | 9/2014 | Sturm |
| 2015/0010223 | A1 | 1/2015 | Sapiro et al. |
| 2015/0297373 | A1 | 10/2015 | Schmitt et al. |
| 2016/0235373 | A1 | 8/2016 | Sharma et al. |
| 2017/0148161 | A1 | 5/2017 | Griffin |
| 2017/0262733 | A1* | 9/2017 | Gulsun ............... G06V 10/454 |
| 2018/0253531 | A1 | 9/2018 | Sharma et al. |
| 2020/0187790 | A1* | 6/2020 | Milner ............... G06V 10/764 |
| 2021/0255304 | A1* | 8/2021 | Fontijne ............... G01S 17/931 |

FOREIGN PATENT DOCUMENTS

| | | |
|---|---|---|
| JP | 2012505669 A | 3/2012 |
| JP | 2015061611 A | 4/2015 |
| JP | 2018536235 A | 12/2018 |
| WO | 2017214421 A1 | 12/2017 |

OTHER PUBLICATIONS

Jun, et al, Thin-Cap Fibroatheroma Detection with Deep Neural Networks, International Conference on Financial Cryptography and Data Security, Lecture Notes in Computer Science, Oct. 2017, pp. 759-768, Springer, XP047453708.
Noble, et al, Ultrasound Image Segmentation: A Survey, IEEE Transactions on Medical Imaging, Aug. 2006, pp. 987-1009, vol. 25, No. 8, XP001545930.
Japanese Office Action issued in Appln. No. 2021-540465 mailed Nov. 7, 2023.
Murakami et al.,CNN, FCN, Comparison of extraction of diffuse lung disease areas using CNN, FCN and U-Net, The 32nd Annual Conference of the Japanese Society for Artificial Intelligence, Jun. 8, 2018, ID:1Z3-05.
Zhou et al., Simultaneous Recognition and Segmentation of Multiple Anatomical Structures on CT Images by Using Deep Learning Approach, Medical Imaging Technology, Japan, Medical Imaging Technology, Sep. 2017, vol. 35 (2017), No. 4, pp. 187-193.
European Office Action issued in Appln. No. 20704704.4 mailed Feb. 5, 2024 (8 pages).
Japanese Search Report for Application No. 2021-540465 mailed Oct. 18, 23, 22 pages.
Morimoto et al. "Detection of the stent regions in OCT images using convolutional neural network," IPSJ SIG Technical Report, Information Processing Society Research Report, Feb. 2018, vol. 7, 6 pages.
Tearney, Guillermo J et al. "Three-dimensional coronary artery microscopy by intracoronary optical frequency domain imaging." JACC. Cardiovascular imaging vol. 1,6 (Nov. 2008): pp. 752-761. doi:10.1016/j.jcmg.2008.06.007.
Murray, Scott, et al., "Contemporary coronary imaging from patient to plaque part 1: IVUS-derived virtual histology", (May 2010), British Journal of Cardiology. Br J Cardiol. pp. 129-32.
Japanese Office Action issued in Appln. No. 2021-540465 mailed May 1, 2024. 4 pgs.
Search Report dated Jun. 7, 24 from Office Action for Chinese Application No. 202080019813.9 issued Jun. 13, 2024. 3 pgs.
VH® IVUS, "The Gold Standard for Complete Lesion Assessment" Volcano's VH IVUS technology uses advanced, proprietary spectral analysis techniques to classify plaque into 4 tissue types. Aug. 2013. For further information about Volcano and its products, please visit www.volcanocorp.com, pp. 1-4.
Volcano, "S5 with VH™ IVUS" The Volcano s5 Imaging System, Jan. 2013. For further information about Volcano and its products, please visit www.volcanocorp.com, pp. 1-2.
Chinese Notification of Allowance, including Search Report, for Application No. 202080019813.9, dated Oct. 31, 2024, 4 pages.
Japanese Office Action for JP Appl. No. 2021-540465, dated Dec. 10, 2024, 2 pages.
Li Kuo Tan et al., Convolutional neural network regression for short-axis left ventricle segmentation in cardiac cine MR sequences, Medical Image Analysis, vol. 39, issued Apr. 12, 2017, pp. 78-86.

\* cited by examiner

200

215

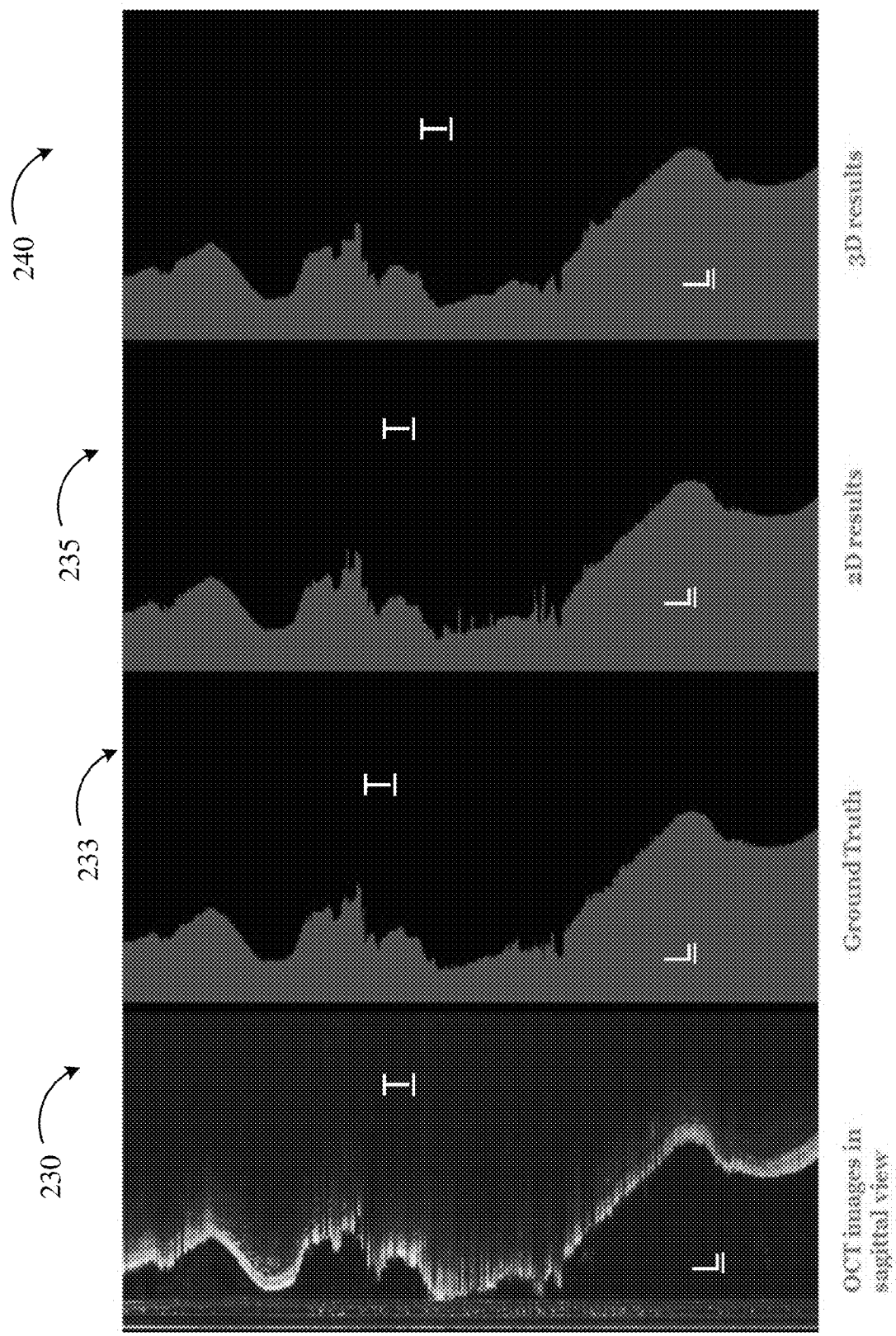

SYSTEMS AND METHODS FOR CLASSIFICATION OF ARTERIAL IMAGE REGIONS AND FEATURES THEREOF

CROSS REFERENCE TO RELATED APPLICATIONS

This application is a continuation of U.S. patent application Ser. No. 17/561,018, filed on Dec. 23, 2021, which is a continuation of U.S. patent application Ser. No. 16/741,718 filed on Jan. 13, 2020, which claims priority to and the benefit of U.S. Provisional Patent Application No. 62/791,876 filed on Jan. 13, 2019, the entire disclosures of which are incorporated by reference therein.

FIELD

In part, this application relates to imaging arteries and segmenting and characterizing components thereof. Specifically, in some embodiments, this application relates to applications of machine learning to characterizing and/or classifying arterial tissue and related arterial regions and features of interest.

BACKGROUND

Optical coherence tomography (OCT) is an interferometric imaging technique with widespread applications in ophthalmology, cardiology, gastroenterology and other fields of medicine. The ability to view subsurface structures with high resolution through small-diameter fiber-optic probes makes OCT especially useful for minimally invasive imaging of internal tissues and organs. OCT systems can generate images up to 100 frames per second, making it possible to image coronary arteries in the beating heart artery within a few seconds. OCT can be implemented in both time domain (TD-OCT) and frequency domain (Fourier domain OCT or optical frequency domain imaging, OFDI). OCT can be used in conjunction with various other imaging technologies such as intravascular ultrasound (IVUS), angiography, fluoroscopy, x-ray-based imaging systems, and other imaging technologies.

OCT imaging of portions of a patient's body provides a useful tool for doctors to determine the best type and course of treatment. For example, imaging of coronary arteries by intravascular OCT may reveal the location of a stenosis, the presence of vulnerable plaques, or the type of atherosclerotic plaque. This information helps cardiologists choose which treatment would best serve the patient—drug therapy (e.g., cholesterol-lowering medication), a catheter-based therapy like angioplasty and stenting, or an invasive surgical procedure like coronary bypass surgery. In addition to its applications in clinical medicine, OCT is also very useful for drug development in animal and clinical trials.

Normal arteries have a consistent layered structure consisting of intima, media and adventitia. As a result of the process of atherosclerosis, the intima becomes pathologically thickened and may contain plaques composed of different types of tissues, including fiber, proteoglycans, lipid and calcium, as well as macrophages and other inflammatory cells. These tissue types have different optical properties that can be measured by manual measurements and imaging technologies. The plaques that are believed to be most pathologically significant are the so-called vulnerable plaques that have a fibrous cap with an underlying lipid pool.

In a typical OCT imaging system, an optical probe mounted on a catheter is carefully maneuvered to a point of interest such as within a coronary blood vessel. The optical beams are then transmitted and the backscattered signals are received through coherent detection using an interferometer. As the probe is scanned through a predetermined line or area, many data lines can be collected. An image (2D or 3D) is then reconstructed using well-known techniques. This image is then analyzed visually by a cardiologist to assess pathological features, such as vessel wall thickening and plaque composition.

Since tissue type is identified by its appearance on the screen, errors may occur in the analysis because certain information (such as tissue type) cannot be readily discerned. Various other components or regions of interest with regard to a given patient artery, organ, or other body part that are difficult to accurately classify by visual inspection occur in virtually all branches of medicine. A need therefore exists for systems and methods of detecting various targets in image data and representing the same to end users. The present disclosure addresses these challenges and others.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of includes instructions that, when executed by data processing apparatus, cause the apparatus to perform the actions. One general aspect includes a method of assessing a coronary artery using one or more machine learning systems.

In one embodiment, the disclosure relates to various methods steps. The method may include acquiring a set of image data comprising frames of polar images; annotating one or more regions or features of interest in each polar image of the set of images such that each annotated region or feature is a ground truth annotation; training a neural network of a machine learning system using set of annotated polar images, wherein each a plurality of regions in each polar region are identified by class; inputting polar image data to the trained neural network; and displaying predictive output images, wherein predictive output images comprise color coded regions, wherein each color corresponds to a class.

In one embodiment, the system includes one or more AI processors having an associated memory, wherein one or more trained software-based neural networks executes on one or more AI processors. The machine learning system can include a convolutional neural network. The method may include acquiring a set of image data, such as arterial image data. In one embodiment, the image data includes intravascular image data. In one embodiment, the image data includes polar images. The method may include annotating one or more regions or features of interest in each polar image of the set of images such that each annotated region or feature is a ground truth annotation. The ground truth annotations may be stored in memory as a set of ground truth masks. The method may include training a neural network of a machine learning system using set of annotated polar images, such as through the set of ground truth masks. In one embodiment, one ground truth mask includes a region of interest corresponding to a particular feature or channel.

Thus, a first region of a ground truth mask may correspond to a first feature and a second region of a ground truth mask may correspond to a second feature. The foregoing may be applied to M features and P regions, wherein each feature corresponds to one or more regions. As an example, two or more regions of calcium, a region of lumen, and a region of intima may be part of one ground truth mask, while the classification thereof by class or type would be calcium, lumen and intima, with each region so classified/segmented. In one embodiment, ground truth masks are used to train a neural network to detect/predict which regions in input image data from a user correspond to a particular feature or channel. In one embodiment, the method includes inputting image data, such as polar image data and/or ground truth masks to the neural network to train the neural network. The neural network is trained over one or more epochs until it operably detects multiple features/channels within an error threshold. In one embodiment, the method includes inputting image data, such as polar image data to the trained neural network and displaying predictive output images from a machine learning system. In one embodiment, ground truth image masks are generated in response to annotating a depiction of an image in a user interface. In various embodiments, a polar image is annotated in such a user interface. The neural network is implemented in one or more software applications such as PyTorch, LibTorch, and others disclosed herein. Other embodiments of this aspect include corresponding computer systems, apparatus, and computer programs recorded on one or more computer storage devices, each configured to perform the actions of the methods.

Implementations may include one or more of the following processes or steps. In one embodiment, each image includes a plurality of image data elements with respect to the coronary artery. In one embodiment, annotating is performed with a graphical user interface that includes user controls to select groups of pixels or a two-dimensional boundary to define features of interest. In one embodiment, the training of the neural network is repeated until an output of a cost function is at or below a threshold, wherein the cost function compares predictive outputs of an MLS with ground truth inputs. In various embodiments, a cross entropy assessment is used to measure error associated with cost function. The method may further include classifying the one or more regions or features of interest for each polar image as a type or class. In one embodiment, the type or class is selected from the group includes intima, media, adventitia, lumen, EEL, IEL plaque, calcium, calcium plaques. In one embodiment, the image data used with systems and methods disclosed herein includes carpet view images, scan lines, pixels, 2D images, 3D images, angiography images, intravascular images, CT scan images, x-ray images, and other images of arteries, veins, organs or other components of the circulatory system. The foregoing features, regions, channels, classes, etc. may be detected using a neural network trained relative thereto.

In one embodiment, the features, regions, types, and/or classes include one or more side branch, lumen, guidewire, stent strut, stent, jailed stents, bioresorbable vascular scaffold (BVS), drug eluting stents (DES), blooming artifact, pressure wire, guidewire, lipid, atherosclerotic plaque, stenosis, calcium, calcified plaque, calcium containing tissue, lesions, fat, malapposed stent; underinflated stent; over inflated stent; radio opaque marker, branching angle of arterial tree; calibration element of probe, doped films; light scattering particles, sheath; doped sheath; fiducial registration points, diameter measure, calcium arc measure, thickness of region or feature of interest, radial measure, guide catheter, shadow region, guidewire segment, length, and thickness and others as disclosed herein.

In one embodiment, each data element, image, and output are stored in machine readable memory in electronic communication with the machine learning system. In one embodiment, the set of annotated polar images includes images that include one or more imaging artifacts or undesirable imaging conditions. In one embodiment, the one or more imaging artifacts or undesirable imaging conditions are selected from the group includes incomplete clearing of artery prior to intravascular imaging of same; insufficient contrast; insufficient contrast solution; light intensity below an average level for intravascular imaging; contrast cloud; non-uniform rotational distortion (NURD); blooming artifacts; jailed side branches; and reflections from imaging probe components. In one embodiment, method and systems disclosed herein are operable to or perform identifying, in the predictive output images, one or more arc-based metrics, measurements of similarity for both Ca and EEL; detected EEL diameters; and detected Ca depth. In one embodiment, the neural network is a convolution neural network, wherein number of input channels for first node or layer is four channels. In one embodiment, method and systems disclosed herein are operable to or perform generating a carpet view using line projections and filtering the carpet view to reduce noise in the predictive output images.

In one embodiment, each of the foregoing (and other examples disclosed herein relative to identifiable elements in input image data) is a data channel that may be used as a region of interest (ROI) or feature of interest (FOI) to train an MLS and be detectable by the trained MLS. In one embodiment, each of the foregoing has an associated mask or data channel or is one element in an image mask such as ground truth mask or an output mask. In one embodiment, an output mask includes multiple regions, wherein different regions correspond to different channels, such that a multi-channel segmented representation is generated relative to the input data. In one embodiment, a first frame of image data is processed with the neural network of the MLS to generate a first output mask corresponding to the first frame of image data, wherein the first mask is modified such that regions/features of interest are identified with an indicia such as color coding, hatching or otherwise. Thus, the first output mask includes the input image data with overlays, changes to image data or mask regions to identify its class/type, or other indicia relative to the regions of pixels classified as being of a particular feature, class, etc.

In one embodiment, the predictive output images include one or more indicia indicative of boundary of predicted or classified feature. The method further includes converting a predictive output images from polar form to Cartesian form. Thus, an output polar image mask with indicia corresponding to detected ROI/FOI may be converted to a Cartesian image, wherein the indicia are converted and represented in the Cartesian image. In various embodiments, annotating and operating on Cartesian images is avoided to generate ground truth images/masks and training of the neural network, and instead ground truth polar images are operated upon and used to train a given neural network. In one embodiment, carpet view masks, and subsets thereof may be used. In one embodiment, the carpet view has a first axis corresponding to a frame number and a second axis corresponding to a scan line number.

In one embodiment, the neural network is a conformal neural network. In one embodiment, the MLS includes an AI processor, wherein the AI processor includes one or more parallel processing elements. In one embodiment, the AI processor includes n parallel processing elements; and further includes dedicated AI processor memory. In one embodiment, the dedicated AI processor memory ranges from about 8 GB to about 64 GB. In one embodiment, the dedicated AI processor memory ranges about 64 GB to about 128 GB. In one embodiment, the AI processor is a graphic processing unit. In one embodiment, the parallel processing elements are selected from the group includes of CUDA core processors, core processors, tensor core processors, and stream processors. In one embodiment, the AI processor is run locally through an edge network appliance or server. In one embodiment, an AI processor such as a graphical processing unit is used that includes 8 GB or more of dedicated memory in conjunction with 32 GB or more of on board RAM as part of the computing device disposed within the housing of the data collection/imaging systems.

In one embodiment, the method further includes reducing processing time of MLS when classifying user image data by flattening the image data before inputting to neural network. This may be applied during training phase and with regard to patient image data when classifying, detecting, and/or identifying features/regions of interest. The method further includes reducing processing time of MLS when classifying user image data by resizing or excluding region of image before inputting to neural network. The method further includes performing a circular shift 1, 2, or 3 times with respect to one or more of the polar images. The method further includes performing a left to right flip with respect to one or more of the polar images. The method further includes performing lumen detection using an image processing method or a machine learning method to generate a set of detected lumen boundary data. The method further includes generate one or more image masks for each region or feature of interest identified in a patient image. Implementations of the described techniques may include hardware, a method or process, or computer software on a computer-accessible medium. The methods and systems may include various busses and interface components.

One general aspect includes performing lumen detection to detect lumen boundary. In one embodiment, detected lumen boundary data, such as on a per image basis, is also input to the neural network along with patient polar image data. Other embodiments of this aspect include corresponding computer systems, apparatus, and computer programs recorded on one or more computer storage devices, each configured to perform the actions of the methods.

Implementations may include one or more of the following features. In one embodiment, inputting the detected lumen boundary data reduces waiting period for classifying regions and features of interest in patient polar image data. Implementations of the described techniques may include hardware, a method or process, or computer software on a computer-accessible medium. In one embodiment, each input image for training or processing patient data is transformed into multiple versions, wherein the multiple versions are generated by left right flips and circular shifts. This provides an augmented data set, which in turns reduces error and increases accuracy of neural network/MLS. In various embodiments, references to a MLS also include a neural network and vice versa.

One general aspect includes a data collection and/or imaging and region/feature characterization system. The system also includes a housing. The system also includes a frame grabber to receive one or more of image data, such as polar data, ultrasound data, optical image data, x-ray image data and intravascular image data. The intravascular system also includes a power supply. The intravascular system also includes one or more electronic memory storage devices in electrical communication with the power supply. The intravascular system also includes one or more image processing software modules executable on the processor and stored in the one or more electronic memory storage devices. The intravascular system also includes a computing device includes a first processor, the computing device in electronic communication with the power supply and the first processor. In one embodiment, one more AI processors and dedicated AI processor memory is disposed in the housing or connected thereto through one or more ports, busses, or networks. In one embodiment, the MLS and its trained neural network is operated remotely, such as through a client/server implementation, an edge computing implementation, or a cloud or software as a service implementation.

In one embodiment, the system also includes one or more software programs stored in the one or more electronic memory storage devices. The system also includes a machine learning system includes a neural network includes one or more machine learning software modules. The intravascular system also includes one or more AI processors, wherein the one or more machine learning software modules are executable on the one or more AI processors; a bus; AI processor memory; an interface to send and receive image data from the first processor, the machine learning system in electronic communication with the power supply, wherein the machine learning system, the computing device, and the one or more electronic memory storage devices are disposed in the housing. In one embodiment, the bus is a PCIe bus. Other embodiments of this aspect include corresponding computer systems, apparatus, and computer programs recorded on one or more computer storage devices, AI processors, specialized ASICS, circuitry and circuitry components, each configured to perform the actions of the methods. In one embodiment, the bus connects the AI processor and on board memory and processor of diagnostic/imaging system.

Implementations may include one or more of the following features. The system wherein the housing, is the housing of an optical coherence tomography imaging system or an intravascular ultrasound imaging system. The system wherein the one or more image processing software modules includes one or more of: polar intravascular image to Cartesian image conversion software, includes Cartesian intravascular image to polar image conversion software, tissue classification overlay software to label regions or features of interest when displayed to an end user, lumen detection software modules, image flattening pre-processing software modules, image resizing software module, image annotation software with GUI for labeling or marking training images with ground truth data, pre-processing software modules and circular shifting software modules. The system wherein the one or more machine learning software modules includes one or more of: a neural network interface, lumen contour prediction, side branch prediction, image resizing modules, user interface and input processing software modules, MLS interface software modules to control and set parameters for neural network, MLS memory manager software, pre-processing software modules, stent strut prediction software modules, jailed stent prediction software modules, guidewire prediction software modules, and interface modules for exchanging data with imaging system. Implementations of the described techniques may include hardware, a method or process, or computer software on a computer-accessible medium.

In part, the disclosure relates to computer-based methods, and systems suitable for evaluating image data from a patient on a real time or substantially real time basis using machine learning (ML) methods and systems. In various embodiments, a set of image data, such a pull back of intravascular data is classified using a trained neural network such as a convolutional neural network on a substantially real time basis. In various embodiments, the set of image data includes between about 400 frames to about 600 frames and is obtained from memory or by imaging a patient using an imaging system. In one embodiment, a set of image data that includes between about 400 to about 600 frames is classified. In one embodiment, substantially real time basis ranges from about 1 second to about 60 seconds. In one embodiment, substantially real time basis ranges from about 1 second to about 30 seconds. In one embodiment, substantially real time basis ranges from about 1 second to about 20 seconds. In one embodiment, substantially real time basis ranges from about 1 second to about 15 seconds. In one embodiment, substantially real time basis ranges from about 1 second to about 10 seconds. In one embodiment, substantially real time basis is less than about 10 seconds. In part, the disclosure is directed to improving diagnostic tools for end users such as cardiologists and imaging specialists using machine learning techniques applied to specific problems associated with intravascular images that have Cartesian and polar representations. Further, given the use of rotating probes to obtain image data for OCT, IVUS, and other imaging data, dealing with the two coordinate systems associated therewith creates challenges. The present disclosure addresses these and numerous other challenges relating to solving the problem of quickly imaging and diagnosis a patient such that stenting and other procedures may be applied during a single session in the cath lab. The ability to perform segmentation of an image into multiple features or regions of interest reduces the time a patient spends during the initial diagnostic procedures and subsequent treatment procedures by providing clinician with diagnostic information to inform stent planning, evaluation of bypass, artherectomy, and other surgical options, and to assess changes in patient condition over time.

In one embodiment, MLS system training is performed using polar images or polar image data elements that are annotated by experts. The annotated polar images are used to train an MLS. The MLS operates on new polar images from a patient to generate outputs of classified images regions that are still in polar form. After the use of training MLS for prediction and inference, the predictive outputs from the MLS in polar form are then converted to Cartesian form and the images with classified tissue regions (lumen, intima, side branch, guidewire, stent, plaque, calcium, etc.) are then displayed in Cartesian form. In one embodiment, the coordinates may be revered with the images being in Cartesian form when annotated and then ultimately converted to polar form after processing and prediction by a given MLS.

In various embodiments, probability maps and tissue maps are generated to provide user interface feedback for various workflows. In addition, probability maps and tissue maps may be combined, compared, convolved, and otherwise used to generate output results of classifying regions and features of interest using a trained neural network. In various embodiment, a given neural network is preferably trained using annotated polar images.

In part, the disclosure relates to user interface designs that facilitate improved information and time management using one or more tissue map representation based on characterized tissue of body lumen such as a coronary artery. In various embodiments, the various detected ROI/FOI may be co-registered with angiography data and displayed using one or more user interfaces as part of an imaging system or other diagnostic system.

In part, the disclosure relates to a method for identifying regions of interest in a blood vessel that can include tissue types and other features such as side branches, stents, guidewires and other features, characteristics and materials of the blood vessel that uses an imaging processing pipeline to detect the foregoing and uses a neural network to detect other ROI/FOI such as calcium, lumen, media, intima, lipid, and others disclosed herein.

In one embodiment, the tissue type or tissue characteristic, region of interest (ROI), feature of interest, classes or types or blood vessel feature selected for segmentation and/or detection and representation in one or more mask, images, or outputs includes tissue maps includes one or more of the following cholesterol, fiber, lipid pool, lipid, fibrofatty, calcification, calcium nodule, calcium plate, intima, thrombus, foam cells, proteoglycan, and others as disclosed herein. The various systems disclosed herein are operable to perform all of the methods and processes disclosed herein using specialized circuits, controllers, FPGAs, AI processors and other components as disclosed herein.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

BRIEF DESCRIPTION OF DRAWINGS

The patent or application file contains at least one drawing executed in color. Copies of this patent or patent application publication with color drawing(s) will be provided by the Office upon request and payment of the necessary fee.

The figures are not necessarily to scale, emphasis instead generally being placed upon illustrative principles. The figures are to be considered illustrative in all aspects and are not intended to limit the disclosure, the scope of which is defined only by the claims.

FIGS. 2E-2H, from left to right, show polar image data of an artery, the polar image annotated with ground truth lumen data, lumen detection results performed with an MLS having a 2D neural net, and lumen detection results performed with an MLS having a 3D neural net according to an illustrative embodiment of the disclosure.

DETAILED DESCRIPTION

Various data collection and analysis systems are available to obtain information with regard to the coronary system. The data obtained using a device from a blood vessel or derived data from intravascular or extravascular measurements associated therewith can be analyzed or displayed to assist researchers and clinicians. Optical coherence tomography (OCT) is an imaging modality that uses an interferometer to obtain distance measurements relative to a blood vessel or objects disposed therein. Intravascular ultrasound (IVUS) can also be used in probes to image portions of a blood vessel. Angiography systems and fluoroscopy systems are also often used to image a patient such that diagnostic decisions can be made and various possible treatment options such as stent placement can be carried out. These and other imaging systems can be used to image a patient externally or internally to obtain raw data, which can include various types of image data. This disclosure relates to various machine learning system (MLS) embodiments that include one or more networks such as neural networks to provide improved classification of components of medical imaging data. Exemplary MLS-based systems are shown with regard to FIGS. 1, 1A, 1B, 1C, 1D, 1E, 4A, 4B, and others as disclosed and depicted herein.

In particular, image data obtained with regard to lumens of the body such as coronary arteries are of particular interest. Further, given the benefits of intravascular imaging for diagnosis, flow measurement, stent planning and others, obtaining timely image analysis and tissue typing and classification using an MLS system is of great value. These systems often require extensive amounts of time to perform the image processing tasks. As such, reducing the time requirements for processing a set of patient image data using an MLS system is one feature of various embodiments of the disclosure.

In general, the disclosure can apply to any intravascular data collection devices can be used to generate and receive signals that include diagnostic information, such as image data, relative to the blood vessel in which they are used. These devices can include without limitation imaging devices, such as optical or ultrasound probes, pressure sensor devices, and other devices suitable for collecting data with regard to a blood vessel or other components of a cardiovascular system.

Figure 1:
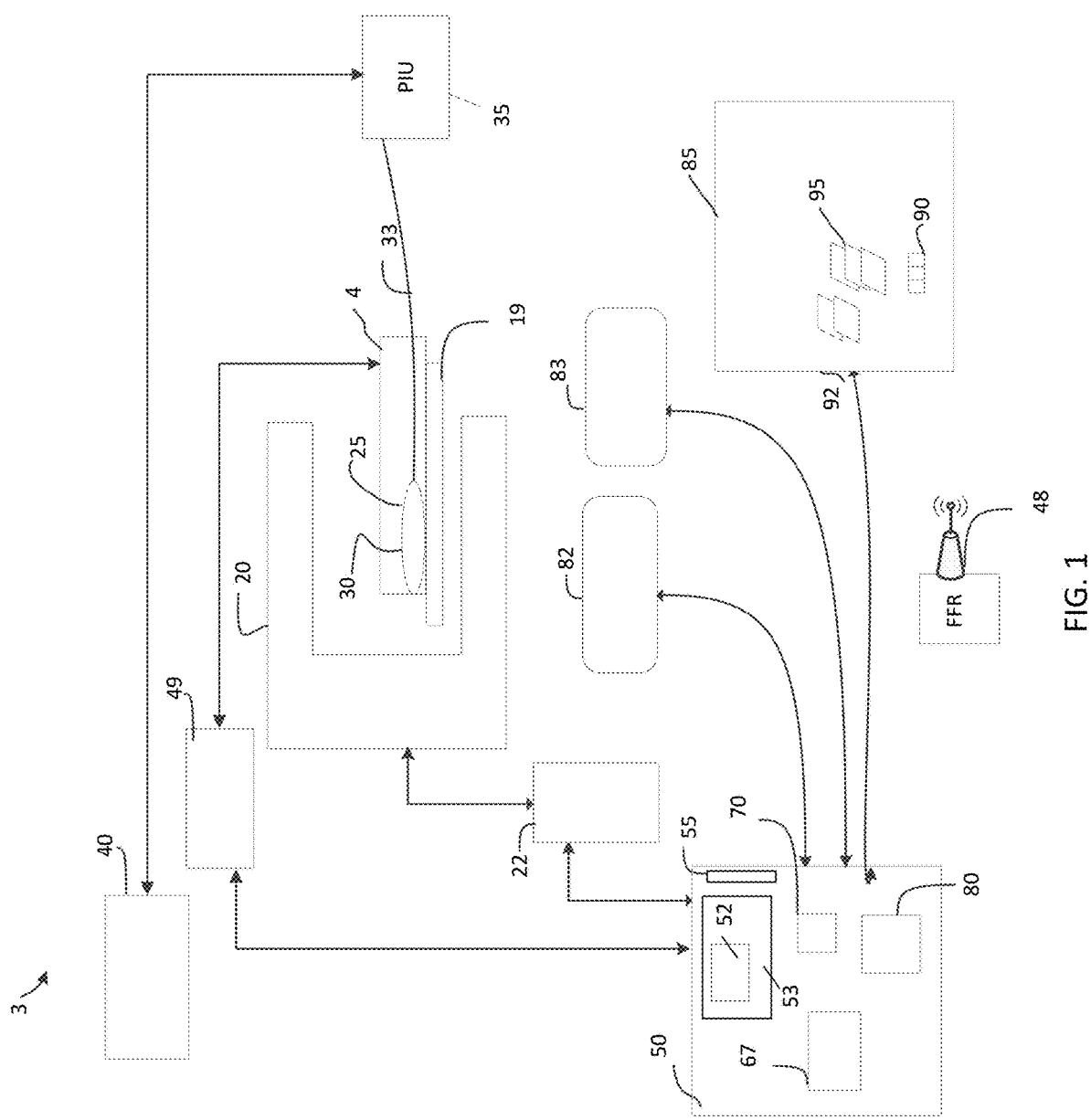
FIG. 1 is a schematic diagram of a system suitable for training a neural network using ground truth masks obtained relative to arterial image data such as image frames and using such as network to generate predictive outputs classifying particular features/regions of interest according to an illustrative embodiment of the disclosure.

FIG. 1 includes a system suitable for performing various steps of the disclosure such as collecting image data for annotating and generating ground truth masks and for classifying using a trained neural network and displaying such predictive results to users. Various user interface features are described herein to view and assess a visual representation of arterial information. These user interfaces can include one or more moveable elements that can be controlled by a user with a mouse, joystick, or other control and can be operated using one or more processors and memory storage elements.

During a stent delivery planning procedure, the levels and location of apposition the user can refer to OCT and annotated angiography to further expand or move a stent as part of delivery planning. These system features and methods can be implemented using system 3 shown in FIG. 1.

FIG. 1 shows a system 3 which includes various data collection subsystems suitable for collecting data or detecting a feature of or sensing a condition of or otherwise diagnosing a subject 4. In one embodiment, the subject is disposed upon a suitable support 19 such as table bed to chair or other suitable support. Typically, the subject 4 is the human or another animal having a particular region of interest 25.

The data collection system 3 includes a noninvasive imaging system such as a nuclear magnetic resonance, x-ray, computer aided tomography, or other suitable noninvasive imaging technology. As shown as a non-limiting example of such a noninvasive imaging system, an angiography system 20 such as suitable for generating cines is shown. The angiography system 20 can include a fluoroscopy system. Angiography system 20 is configured to noninvasively image the subject 4 such that frames of angiography data, typically in the form of frames of image data, are generated while a pullback procedure is performed using a probe 30 such that a blood vessel in region 25 of subject 4 is imaged using angiography in one or more imaging technologies such as OCT or IVUS, for example.

The angiography system 20 is in communication with an angiography data storage and image management system 22, which can be implemented as a workstation or server in one embodiment. In one embodiment, the data processing relating to the collected angiography signal is performed directly on the detector of the angiography system 20. The images from system 20 are stored and managed by the angiography data storage and image management 22.

In one embodiment system server 50 or workstation 85 handle the functions of system 22. In one embodiment, the entire system 20 generates electromagnetic radiation, such as x-rays. The system 20 also receives such radiation after passing through the subject 4. In turn, the data processing system 22 uses the signals from the angiography system 20 to image one or more regions of the subject 4 including region 25.

As shown in this particular example, the region of interest 25 is a subset of the vascular or peripherally vascular system such as a particular blood vessel. This can be imaged using OCT. A catheter-based data collection probe 30 is introduced into the subject 4 and is disposed in the lumen of the particular blood vessel, such as for example, a coronary artery. The probe 30 can be a variety of types of data collection probes such as for example an OCT probe, an FFR probe, an IVUS probe, a probe combining features of two or more of the foregoing, and other probes suitable for imaging within a blood vessel. The probe 30 typically includes a probe tip, one or more radiopaque markers, an optical fiber, and a torque wire. Additionally, the probe tip includes one or more data collecting subsystems such as an optical beam director, an acoustic beam director, a pressure detector sensor, other transducers or detectors, and combinations of the foregoing.

For a probe that includes an optical beam director, the optical fiber 33 is in optical communication with the probe with the beam director. The torque wire defines a bore in which an optical fiber is disposed. In FIG. 1, the optical fiber 33 is shown without a torque wire surrounding it. In addition, the probe 30 also includes the sheath such as a polymer sheath (not shown) which forms part of a catheter. The optical fiber 33, which in the context of an OCT system is a portion of the sample arm of an interferometer, is optically coupled to a patient interface unit (PIU) 35 as shown.

The patient interface unit 35 includes a probe connector suitable to receive an end of the probe 30 and be optically coupled thereto. Typically, the data collection probes 30 are disposable. The PIU 35 includes suitable joints and elements based on the type of data collection probe being used. For example a combination OCT and IVUS data collection probe requires an OCT and IVUS PIU. The PIU 35 typically also includes a motor suitable for pulling back the torque wire, sheath, and optical fiber 33 disposed therein as part of the pullback procedure. In addition to being pulled back, the probe tip is also typically rotated by the PIU 35. In this way, a blood vessel of the subject 4 can be imaged longitudinally or via cross-sections. The probe 30 can also be used to measure a particular parameter such as a fractional flow reserve (FFR) or other pressure measurement.

In turn, the PIU 35 is connected to one or more intravascular data collection systems 40. The intravascular data collection system 40 can be an OCT system, an IVUS system, another imaging system, and combinations of the foregoing. For example, the system 40 in the context of probe 30 being an OCT probe can include the sample arm of an interferometer, the reference arm of an interferometer, photodiodes, a control system, and patient interface unit. Similarly, as another example, in the context of an IVUS system, the intravascular data collection system 40 can include ultrasound signal generating and processing circuitry, noise filters, rotatable joint, motors, and interface units. In one embodiment, the data collection system 40 and the angiography system 20 have a shared clock or other timing signals configured to synchronize angiography video frame time stamps and OCT image frame time stamps.

In addition to the invasive and noninvasive image data collection systems and devices of FIG. 1, various other types of data can be collected with regard to region 25 of the subject and other parameters of interest of the subject. For example, the data collection probe 30 can include one or more pressure sensors such as for example a pressure wire. A pressure wire can be used without the additions of OCT or ultrasound components. Pressure readings can be obtained along the segments of a blood vessel in region 25 of the subject 4.

Such readings can be relayed either by a wired connection or via a wireless connection. As shown in a fractional flow reserve FFR data collection system, a wireless transceiver 47 is configured to receive pressure readings from the probe 30 and transmit them to a system to generate FFR measurements or more locations along the measured blood vessel. One or more displays 82, 83 can also be used to show an angiography frame of data, an OCT frame, user interfaces for OCT and angiography data and other controls and features of interest.

The intravascular image data such as the frames of intravascular data generated using the data collection probe 30 can be routed to the data collection processing system 40 coupled to the probe via PIU 35. The noninvasive image data generated using angiography system 22 can be transmitted to, stored in, and processed by one or more servers or workstations such as the co-registration server 50 workstation 85. A video frame grabber device 55 such as a computer board configured to capture the angiography image data from system 22 can be used in various embodiments.

In one embodiment, the server 50 includes one or more co-registration software modules 67 that are stored in memory 70 and are executed by processor 80. The server may includes a train neural network 52 suitable for implementing various embodiments of the disclosures. In one embodiment, an AI processor, such as a graphical processing unit, 53 is included in the server 50 and in electrical communication with memory 70. The computing device/server 50 can include other typical components for a processor-based computing server. Alternatively, more databases such as database 90 can be configured to receive image data generated, parameters of the subject, and other information generated, received by or transferred to the database 90 by one or more of the systems devices or components shown in FIG. 1.

Although database 90 is shown connected to server 50 while being stored in memory at workstation 85, this is but one exemplary configuration. For example, the software modules 67 can be running on a processor at workstation 85 and the database 90 can be located in the memory of server 50. The device or system use to run various software modules are provided as examples. In various combinations the hardware and software described herein can be used to obtain frames of image data, process such image data, and register such image data. Various software modules can also include tissue map generation software suitable for generating one or more tissue maps that show one or more regions of interest (ROI) and/or detected or characterized tissues or arterial material such as calcium As otherwise noted herein, the software modules 67 can include software such as preprocessing software, transforms, matrices, and other software-based components that are used to process image data or respond to patient triggers to facilitate co-registration of different types of image data by other software-based components 67 or to otherwise perform annotation of image data to generate ground truths and other software, modules, and functions suitable for implementing various embodiments of the disclosure. The modules can include lumen detection using a scan line based or image based approach, stent detection using a scan line based or image based approach, indicator generation, apposition bar generation for stent planning, guidewire shadow indicator to prevent confusion with dissention, side branches and missing data, and others.

The database 90 can be configured to receive and store angiography image data 92 such as image data generated by angiography system 20 and obtained by the frame grabber 55 server 50. The database 90 can be configured to receive and store OCT image data 95 such as image data generated by OCT system 40 and obtained by the frame grabber 55 of server 50.

In addition, the subject 4 can be electrically coupled via one or more electrodes to one more monitors such as, for example, monitor 49. Monitor 49 can include without limitation an electrocardiogram monitor configured to generate data relating to cardiac function and showing various states of the subject such as systole and diastole.

The use of arrow heads showing directionality in a given figure or the lack thereof are not intended to limit or require a direction in which information can flow. For a given connector, such as the arrows and lines shown connecting the elements shown in FIG. 1, for example, information can flow in one or more directions or in only one direction as suitable for a given embodiment. The connections can include various suitable data transmitting connections such as optical, wire, power, wireless, or electrical connections.

One or more software modules can be used to process frames of angiography data received from an angiography system such as system 22 shown in FIG. 1. Various software modules that can include without limitation software, a component thereof, or one or more steps of a software-based or processor executed method can be used in a given embodiment of the disclosure.

In part, the disclosure relates to intravascular data collections systems and related methods by which intravascular data collected by an intravascular probe can be transformed or analyzed by a processor-based system. The results of such analysis and transformation can be displayed to an end user in various representations such as a display that is in communication with a given MLS having a neural network to classify components of a medical image. In one embodiment, a given imaging system, such as an OCT, IVUS, x-ray based imaging system is in electronic communication with an MLS and able to display modified versions of the image data obtained using a given type of imaging system during the same session when such image data was obtained. Various neural network architectures may be used for image segmentation such as V-net, U-net, CUMedVision1, CUMedVision2, VGGNet, Multi-stage Multi-recursive-input Fully Convolutional Networks ($M^2FCN$) Coarse-to-Fine Stacked Fully Convolutional Net, Deep Active Learning Framework, ResNet, combinations thereof, and other neural networks and software-based machine learning frameworks suitable for image segmentation.

In one embodiment, the MLS includes a specialized hardware system to handle the necessary machine learning operations and training thereof processes such that results can be obtained on an expedited basis such as within from about 2 second to about 30 seconds. In one embodiment, the results are obtained in less than about 45 seconds. The specialized hardware system of a given MLS embodiment can include a plurality of processors such as AI/ML processors. The machine learning system can be implemented by training a classifier to segment or operate upon an image such that its constituent tissues, tissues types, and other regions of interest are detected and characterized based on type or another parameter. In one embodiment, the lumen, intima, media and plaque are detected and identified as having boundaries corresponding to these different tissues. Training a given MLS/neural network involves using known inputs and known outputs to teach the network.

The disclosure relates to an advanced machine learning system that includes one or more AI processors that include an increased amount of memory allocated on a per processor basis. The advanced machine learning system is designed to support a multi-channel segmentation approach. Various channels can be selected with regard to the different regions of interest and characteristics for a given implementation. For example, in one embodiment, a first channel, a second channel, a third channel and a fourth channel are specified such that one of each of the foregoing channels is associated with the lumen, intima, media and plaque. Other classes/types can be associated with different channels to facilitate segmentation.

In one embodiment, the plaque type is classified. In some embodiments, the plaque type may be classified as calcified. In addition, given that the present of a plaque and other detectable features of a given section of an artery can indicate the presence of a constriction such as from a stenosis, another feature of the disclosure is the ability to quickly and automatically obtain one or more scores associated with a given plaque or stenosis to help facilitate decision making by an end user. For example, a given score determined using the image data and the machine learning-based analysis thereof can help determine whether no immediate action is recommend, or if a stent should be placed relative to a stenosis, or if a artherectomy or other procedure such as bypass is warranted.

For a healthy patient, arteries have various layers arranged in a consistent structure that include the intima, media and adventitia. As a result of the process of atherosclerosis, the intima becomes pathologically thickened and may contain plaques composed of different types of tissues, including fiber, proteoglycans, lipid and calcium, as well as macrophages and other inflammatory cells. These tissue types have different characteristics when imaged using various imaging systems that can be used to establish a set of training data for one or more of the machine learning systems of the disclosure. The plaques that are believed to be most pathologically significant are the so-called vulnerable plaques that consist of a fibrous cap with an underlying lipid pool. Different atherosclerosis plaques have different geometrical shapes. For examples, the foam cells usually form ribbon-like features on the shoulders of large lipid pool; the media appears like annulus around the vessel, etc. The shape information is currently used in qualitative assessment of OCT images. In one embodiment, the neural net is trained to identify fibrous cap and/or fibrous cap with an underlying lipid pool. In various embodiments, references to calcium herein also include calcified plaques and other calcium containing tissue, without limitation.

The ability to quickly perform an imaging procedure on a patient and obtain arterial images and then processes the images using a machine learning system while the patient is still catheterized and prepared to receive a stent or other treatment option results in significant time savings and improvements in patient outcomes.

Figure 3A:
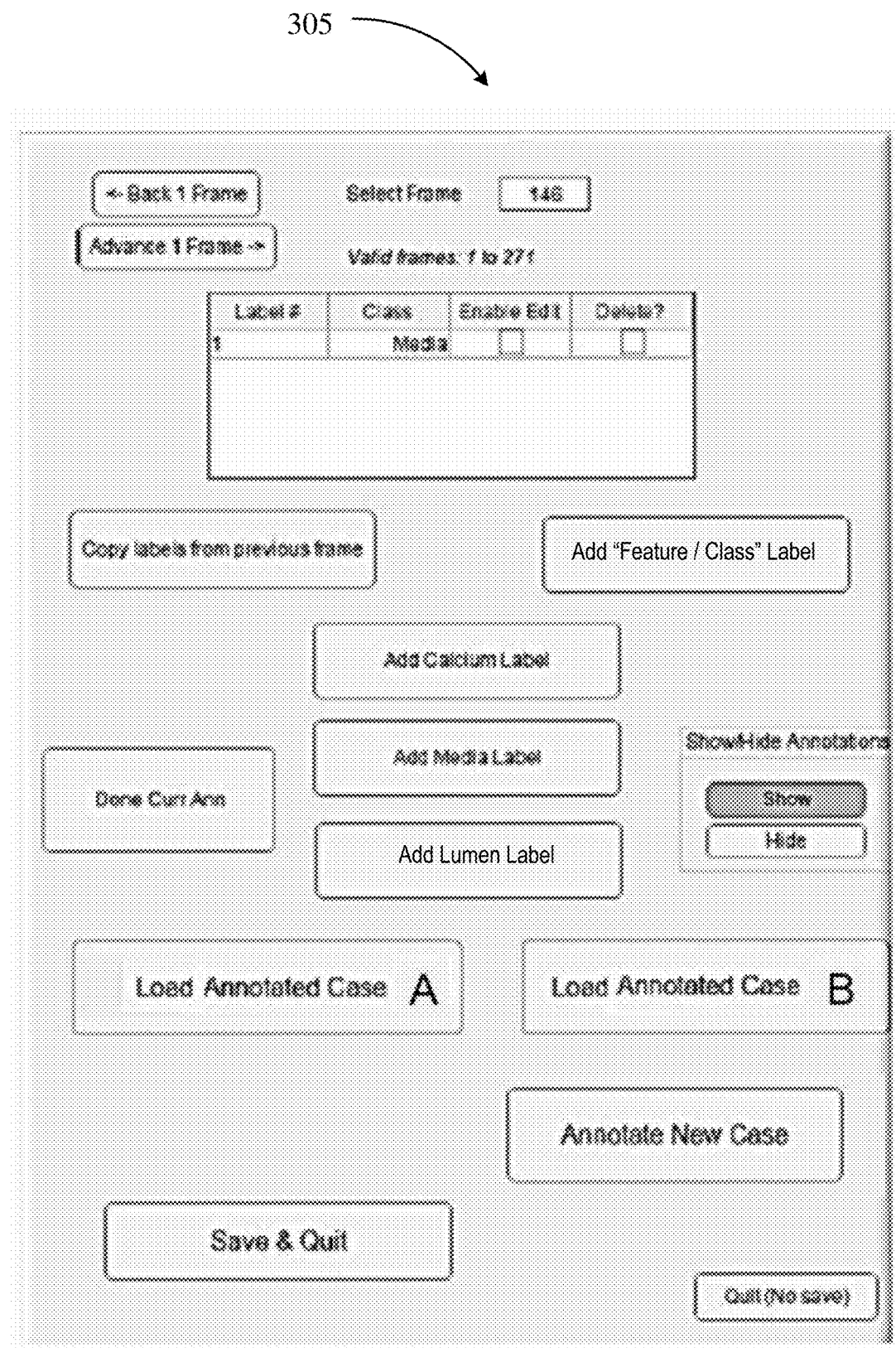
FIG. 3A shows a graphical user interface of an MLS system suitable for navigating image data and annotating the same for training the MLS or a component thereof according to an illustrative embodiment of the disclosure.
Figure 3B:
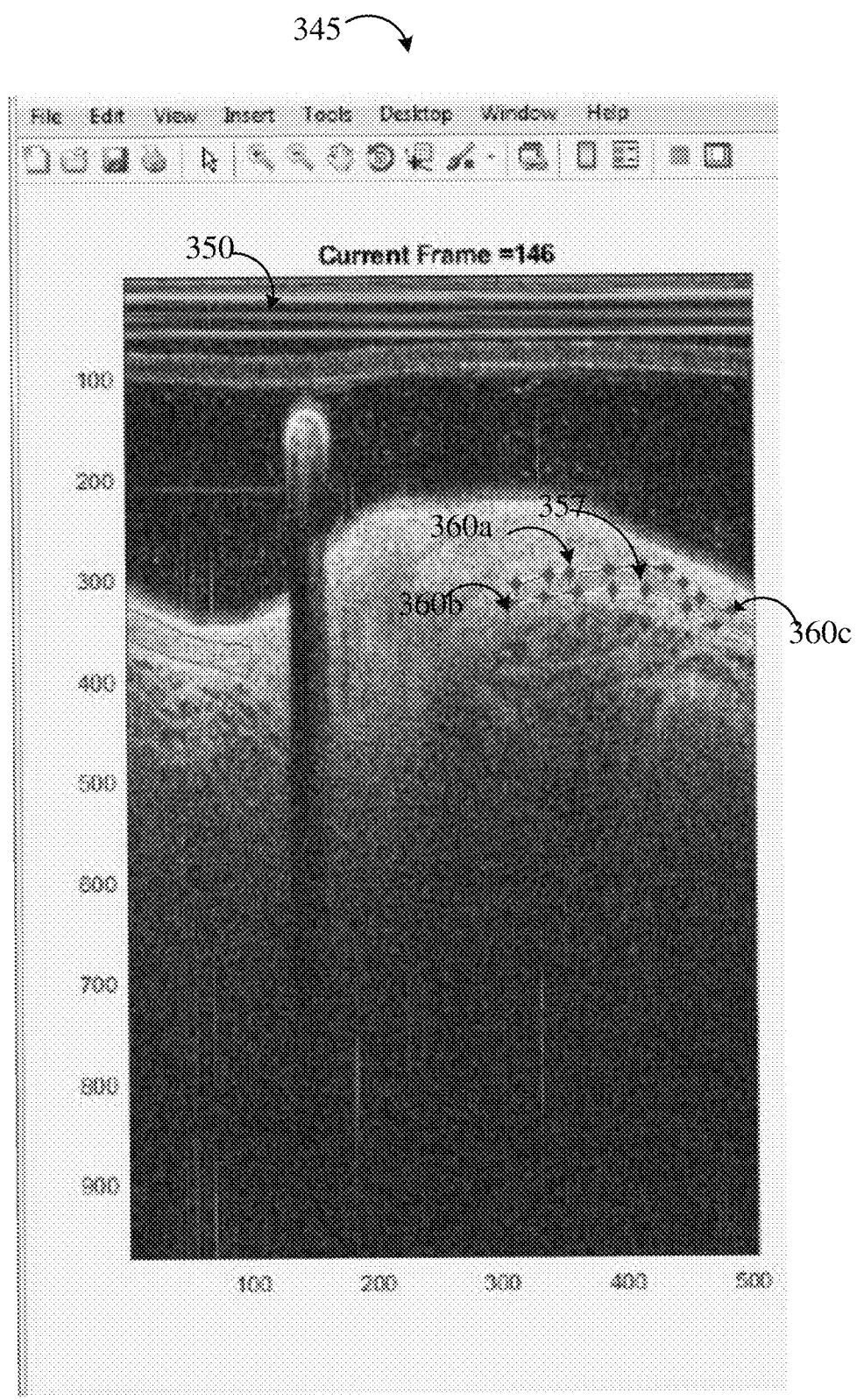
FIG. 3B is a polar frame of image data from a pullback of an imaging probe through an artery that has been annotating using graphic user interfaced based training tools of an MLS according to an illustrative embodiment of the disclosure.
Figure 3C:
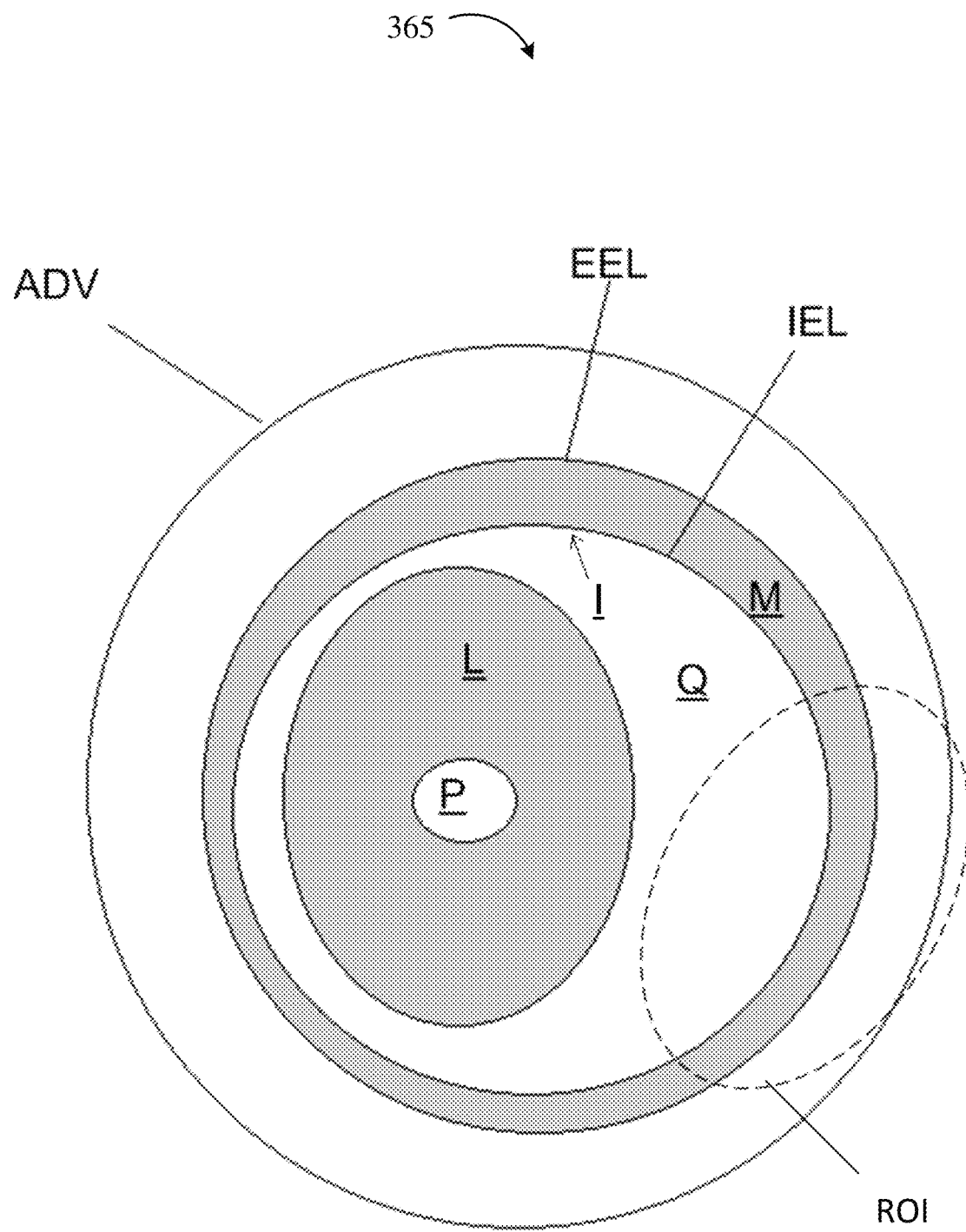
FIG. 3C is a schematic drawing in Cartesian form of a segmented arterial image in which tissue regions are classified by predictive operations of MLS according to an illustrative embodiment of the disclosure.

The media and the outer edge of the media called External Elastic Lamina are used by physicians to size their stent during intervention. Finding the media and measuring the diameter in a partly diseased tissue is time consuming and difficult. It also requires image interpretation training Automatic detection and measurement of the EEL diameter addresses these technical challenges faced when diagnosis or otherwise evaluating a patient for treatment options. An example of the measurement of such a diameter is shown in FIG. 6B. FIG. 3C shows a series of labeled masks and an ROI mask in a Cartesian view of an artery.

The ROI is shown as generally example and could correspond to calcium or another feature of interest such as region containing a side branch or a stent strut. Each region/feature corresponding to lumen L, intima I, plaque Q, adventitia ADV, imaging probe P, media M, and others may be generated by the MLS using a trained NN such as a CNN. The image 385 of FIG. 3C can be used to help guide and inform a clinician as a diagnostic tool. In various embodiments, the detections of the various features in FIG. 3C are displayed using one or more user interfaces and can be co-registered with angiography data, such as shown in FIG. 5F. In some embodiments, one or more features, regions, types, classes, predictive results are co-registered with angiography data. In FIG. 5F, calcium plaque detected in OCT is mapped/co-registered relative to the angiography images for review and planning. In some embodiments, tissue maps and other image data representations are used to support diagnosis and treatment recommendations. In one embodiment, each feature or class identified, such as ADV, EEL, IEL, L, P, I, Q may be generated as a mask or a predictive mask using one or more of the trained neural networks disclosed herein. Indicia corresponding to the output results can be show using color coded indicia and other indicia.

In one embodiment, annotated masks regions corresponding to set or group of pixels define a ground truth mask that are used to train one or more neural networks disclosed herein. Once the neural network is trained, predictive or detected masks are generated that include sets of pixels that correspond to regions of user data as well as an identifier of the feature or class of the region, such as whether it is lumen, calcium, EEL, or another class or feature disclosed herein. In one embodiment, predictive results are generated on a per class basis and then all of the predictive results for a given image data input, such as an input frame of OCT, IVUS, or other image data, are compared on a pixel-wise bases to generate a final predictive result for all classes. In one embodiment, the predictive results are displayed as an output image mask with regions corresponding to a particular class so indicated by an indicia such as color and one or more legends summarizing which indicia maps to which class.

Detecting plaque and classification of the plaque type helps the physician in choosing their intervention strategy. They could choose to perform artherectomy if the calcium burden is too high or choose to land the stent in a different zone depending on the underlying plaque composition. Automating the process of plaque identification and characterization eases image interpretation for the physicians and improves their workflow The MLS disclosed herein can be implemented with various neural networks and integrated with various imaging and diagnostic systems. In one embodiment, the systems and methods are implemented using a deep learning framework. In various embodiments, the MLS includes one or more of a neural network, rules engine, fuzzy logic system, comparators, image processing modules, such as flattening, shifting, and resizing modules, for example, heuristic systems; pattern matching and pattern recognition systems, software implementations of the foregoing.

In one embodiment, the MLS uses a neural network (NN) such as a convolutional neural network (CNN). The CNN includes a plurality of nodes or neurons and can receive and output image data, data derived therefrom, and/or changes to image data, and/or classification information regarding image data components or segments. In one embodiment, the CNN performs semantic image segmentation. In one embodiment, semantic segmentation using a given MLS embodiment can be used to detect if image has calcium and EEL and identify the pixels with calcium and EEL. This helps physicians solve various problems relating to selecting treatment options and guiding a particular treatment. In one embodiment, the MLS uses a 3D CNN such PyTorch 3D CNN or V-NET. The neural networks described herein can be implemented using various frameworks including PyTorch, Microsoft Cognitive Toolkit (CNTK), TensorRT, TensorFlow, and other similar proprietary and open source ML frameworks and tools.

In one embodiment, the tool selected for data annotation allows a user to select, move pixels, and/or draw boundaries. Such an exemplary user interface tool 305 is shown in FIGS. 3A and 3B. The use of a GUI supports consistency for annotations from frame to frame (esp. for 3D). If a standardized tool, such as a GUI-based, annotation tool is used the constraints of the tool and set of actions for annotating supports consistent training data. This is in contrast to different users hand annotating an image and then having the image scanned or processed. In one embodiment, a useful feature of GUI is ability to copy data forward from previous frame. Further, in one embodiment, points are annotated in polar, saving a Cartesian to polar conversion during pre-processing.

In one embodiment, the input to the MLS includes a training set of about 450 expert annotated images, where each image pixel's tissue type is annotated by one or more expert users. In one embodiment, the training set may be pre-processed by the same of another MLS to perform lumen detection prior to using the image data as a training set. Thus, in one embodiment, a first set of training data is pre-preprocessed using one or more pre-processing techniques. The pre-processing techniques can include lumen detection using a MLS that has been previously trained using a training set with annotated lumen regions or segments. The-pre-processing techniques can also be selected to speed training of the network and/or the predictive speed of the trained network during backward propagation. Accordingly, the pre-processing techniques can also include image data flattening, a circle shift process, a circular shift process, excluding of portions of image data, such as depth data below a noise floor, data removal can be performed on an alternating basis such that every other scan line of an image is removed or every other column is removed, pixels may be filtered to remove noise and increase uniformity of regions, and other pre-processing steps.

In one embodiment, the training set include between about 400 to about 600 image data elements such as individual images or groups, clusters, or subsets of images, scan lines or pixels ("image data elements). In one embodiment, the training set includes between about 500 to about 700 images or image data elements. In one embodiment, the training set includes between about 700 to about 800 images or image data elements. In one embodiment, the training set includes between about 800 to about 900 images or image data elements. In one embodiment, the training set includes between about 900 to about 1000 images or image data elements. In one embodiment, the training set includes between about 1000 to about 1100 images or image data elements. In one embodiment, the training set include between about 1000 to about 5000 images or image data elements In one embodiment, a given CNN for use with a particular MLS includes a plurality of nodes or neurons. Such a network can include various layers, including hidden layers. Elements of the network can have weight values, filter values, or bias values that change over time as the network is trained to learn about input image data such as OCT, IVUS, angiography, CT scans, or other image data. In one embodiment, the networks used for a given MLS implementation includes a plurality of filters that change over time in response to training sets that include polar and/or Cartesian image data inputs.

In one embodiment, a CNN interface which may include one or more graphical user interface components is use to facilitate the batch input of image data. A given image is an example of image data. Image data can also include scan lines from an intravascular pullback and other sources of medical imaging data suitable for segmentation and classification. In one embodiment, each image constituting image data that is a ground truth is classified into different parts, classes or types to support the use of such data to train the network to detect such parts, classes or types when operating upon new patient image data. In one embodiment, the ground truth and training sets are mask generated relative to regions or features of interest that are of interest for classifying and generating a trained MLS to predict or detect them automatically, without human intervention, in various embodiments while an MLS is running Human or machine learning can be used to generate a training set/ground truths. Each of these can be implemented as a mask and a data channel. Each data channel is color coded in various embodiments.

Figure 1A:
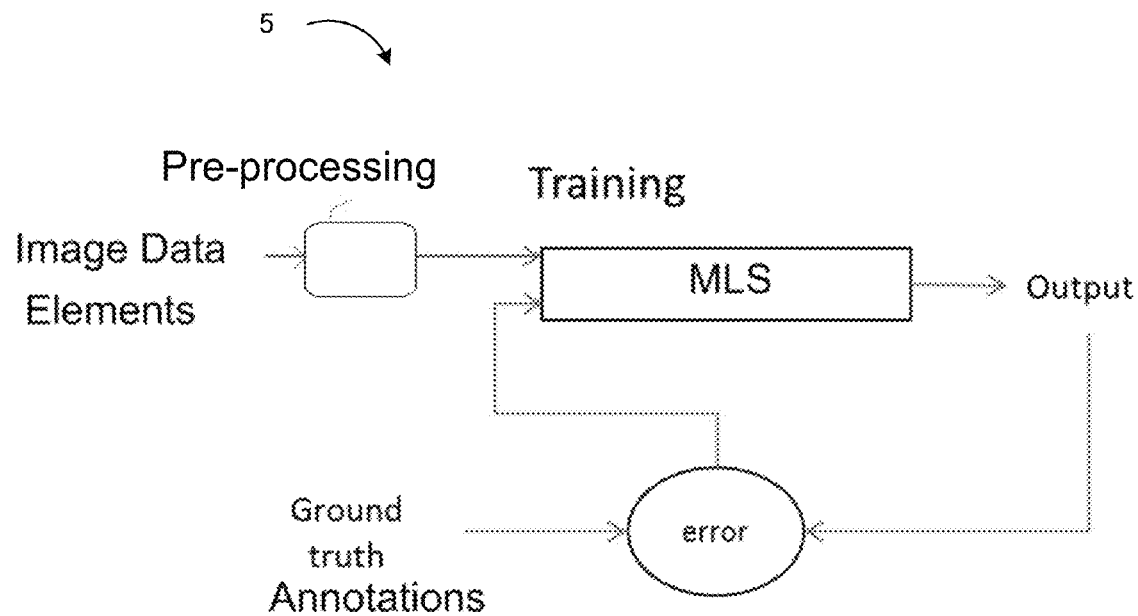
FIG. 1A is a schematic diagram of a machine learning system suitable for use with image data, such as image data obtained relative to an artery, during a training phase according to an illustrative embodiment of the disclosure.

As shown in FIG. 1A, a schematic representation of a system 5 for implementing the training phase of an MLS suitable for classifying tissue and other data types for a given set of medical image data is depicted. Various features, regions, types, and/or classes of tissue and regions, pixels, contours and boundaries in images may be tagged or identified relative to image data to obtain annotated image data such as ground truth masks. In turn, the foregoing can be used to train a neural network such that the network can operate on image data to generate outputs of image data with indicia suitable for classifying and visualizing features, regions, types, and/or classes of tissue and regions, pixels, contours and boundaries using the trained network. A given ground truth match may include one region corresponding to a particular channel or feature or a group of regions corresponding to a particular channel or feature. A given region includes a set of pixels in a given ground truth mask. In one embodiment, a ground truth mask may be annotated to include regions or features that correspond to a particular type or class, such as calcium, a plaque, EEL boundary, and various others classes, types, and classifications disclosed herein.

In one embodiment, data augmentation is performed by increasing cardinality of image data set by performing one or more transforms to the image data, annotate image data, and/or ground truth masks. These transforms may include one or more of a circular shift, left flip, right flip, flattening, resizing, cropping, filtering, binarizing, and normalizing. When image data is OCT data, IVUS data, or other data obtained using one or more rotating elements, data augmentation is performed subject to avoid transforms that inconsistent with imaging being performed.

In one embodiment, the MLS includes a CNN that includes one or more inputs to receive image data and generate outputs based on the MLS operating on the image data. In one embodiment, the MLS and/or the CNN include a deep learning classifier. In one embodiment, about 400 to about 2000 image data elements, such as for example, OCT, IVUS, or angiography images, are annotated by an expert or a first MLS are provided as image data to the MLS. This image data includes the image data elements and the ground truth annotations to such data elements obtained from one or more experts and/or a first MLS for image pre-processing, such as lumen detection. In one embodiment, each image data element's pixels (or a subset thereof) are annotated by an expert of a first MLS.

Accordingly, the image data that includes the image data elements and the ground truth annotations thereto constitute a training set that are provided as an input to the MLS. In one embodiment, the training set is input to the MLS which includes a CNN and/or a deep learning classifier. As shown in FIG. 1A, image data/image data elements and ground truth annotations are inputs to the MLS. The output from the MLS is compared to the ground truth annotations and/or the image data elements combined with the ground truth annotations and an error value is generated. In one embodiment, the error value is the output of a cost function. In one embodiment, the error value is a training error value. Various metrics, scores, and tests can be used to assess changes to and convergence of training errors over time to an acceptable threshold. In various embodiments, Dice, Jaccard, Cosine Similarity, and Overlap distances, metrics, scores, or coefficients may be outputs, inputs, or components of a cost function. Additional details relating to cost functions are described herein. The system of FIG. 1A and other systems disclosed herein can include various pre-processing steps to further improve training and or processing time.

Figure 1B:
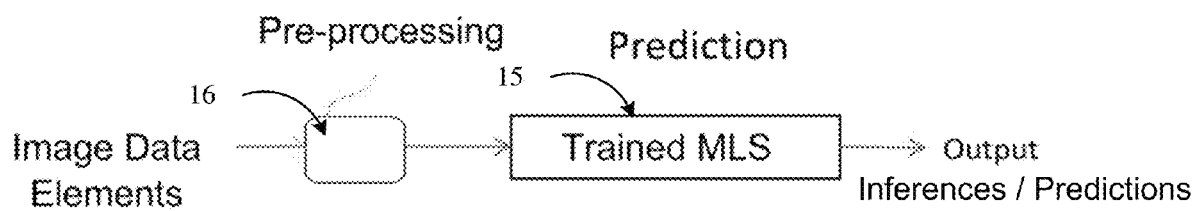
FIG. 1B is a schematic diagram of a machine learning system suitable for use with user image data, such as image data obtained relative to an artery, to detect, predict, and/or classify features of interest in user image data according to an illustrative embodiment of the disclosure.
Figure 1C:
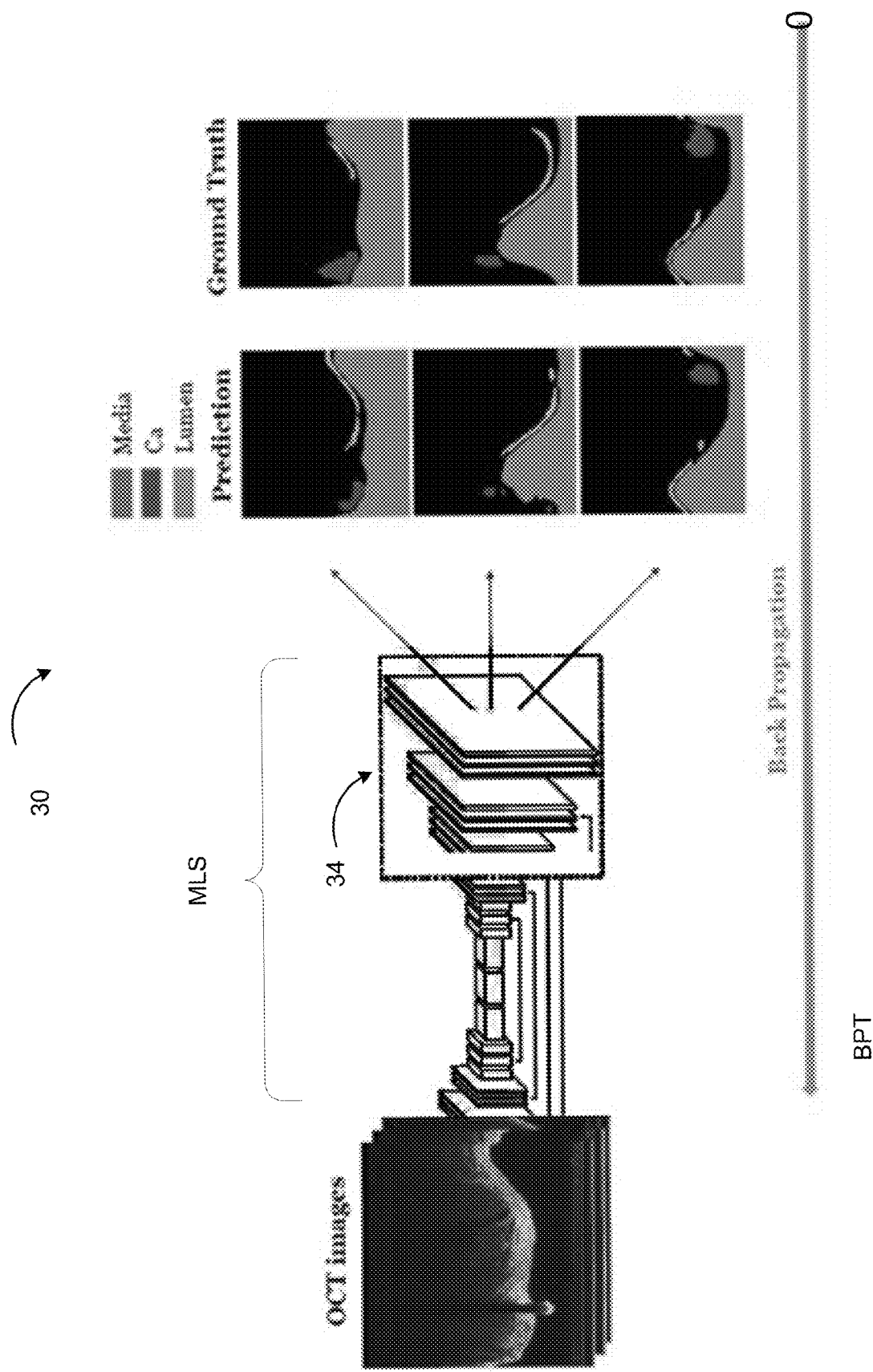
FIG. 1C is a schematic diagram of a machine learning system suitable for use with user image data that shows input polar image data, such as OCT image data, being operated upon to generate ground truth image data used to train the MLS and predictive image data obtained using a trained MLS according to an illustrative embodiment of the disclosure.
Figure 1D:
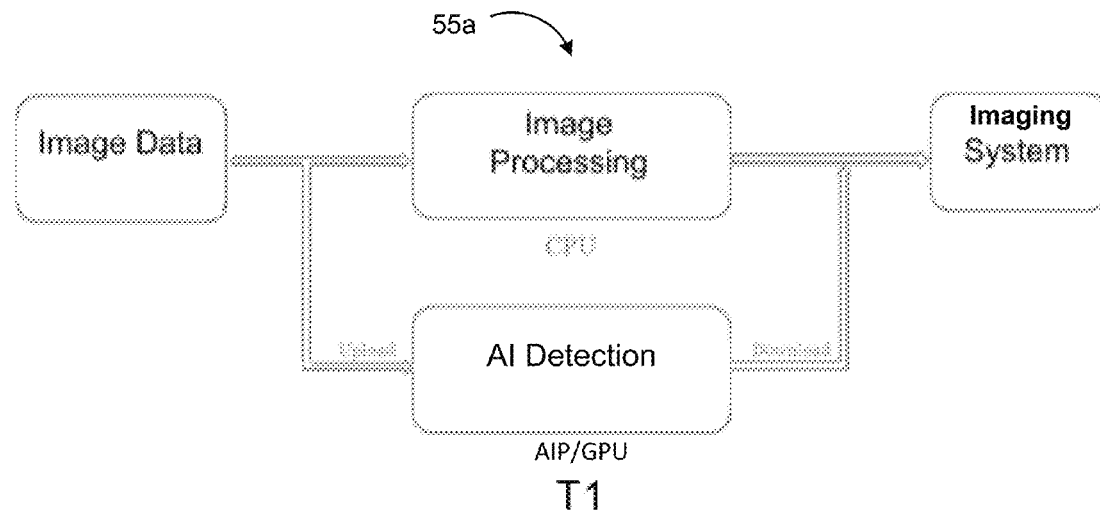
FIG. 1D is a schematic diagram of a machine learning system suitable for use with user image data that generates classified/characterized features/regions of interest relative to user image data according to an illustrative embodiment of the disclosure.
Figure 1E:
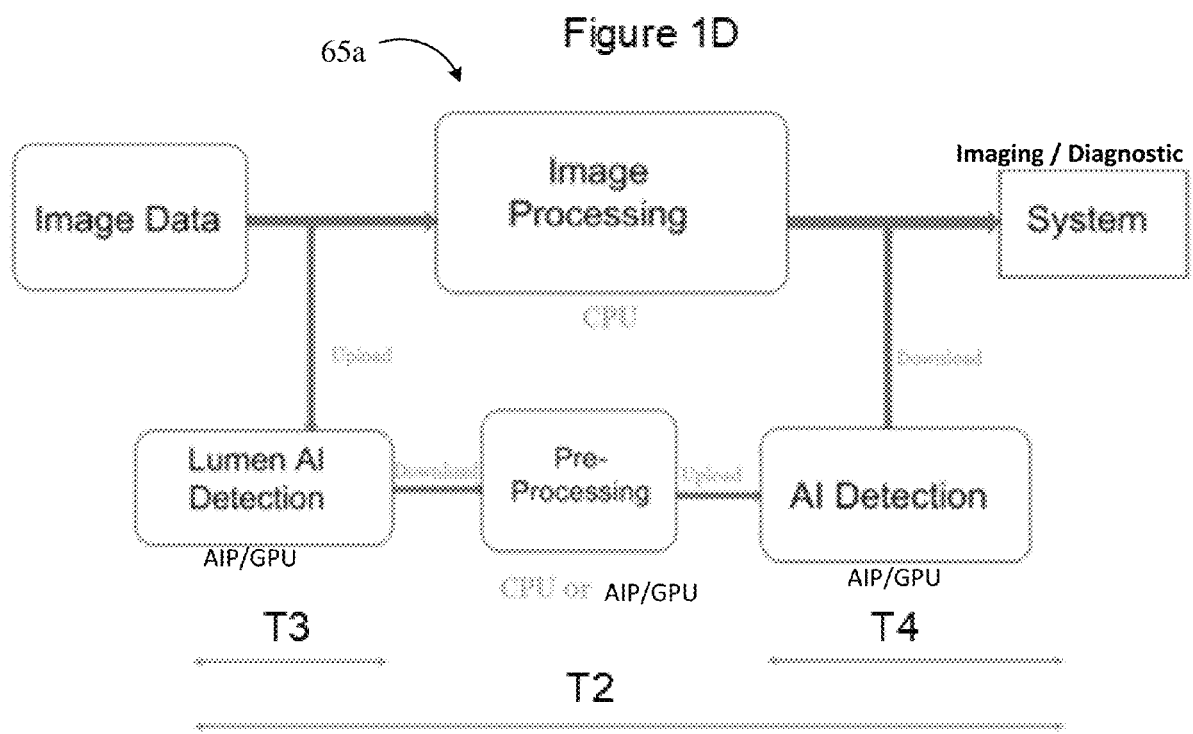
FIG. 1E is a schematic diagram of a machine learning system suitable for use with user image data that generates classified/characterized features/regions of interest relative to user image data that includes a lumen detection system and a pre-processing system according to an illustrative embodiment of the disclosure.
Figure 1F:
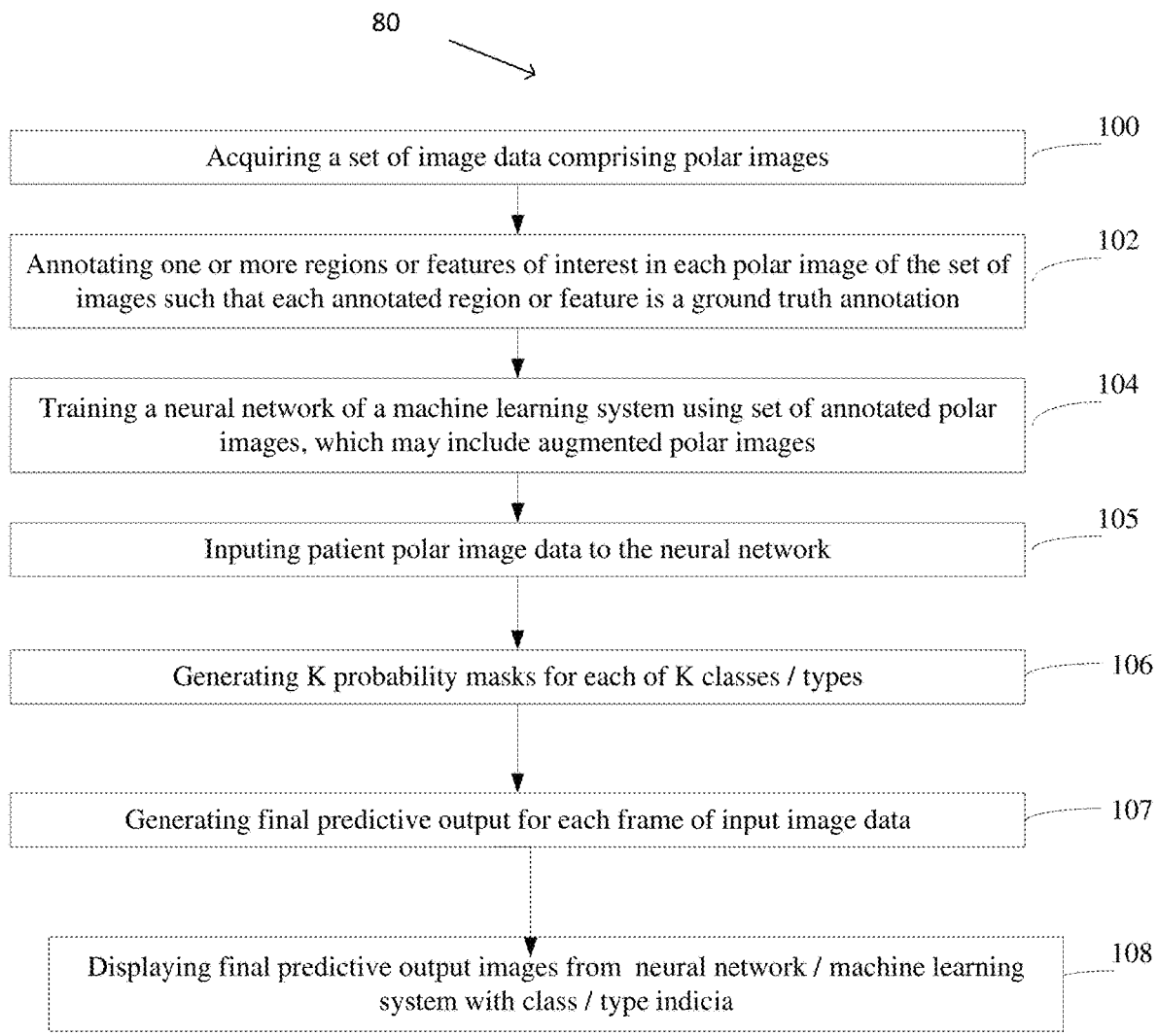
FIG. 1F is an exemplary process flow of a training process and subsequent prediction process for a given illustrative embodiment of the disclosure.

FIG. 1F is an exemplary method 80 of the disclosure that includes a training process and subsequent prediction process suitable for use with various regions/features of interest such as lumen, calcium, media, and intima. In one embodiment, the trained neural network is trained using ground truth annotations that include calcium, intima, lumen, and media. In one embodiment, the trained neural network is trained using ground truth annotations that consist or are specifically directed to one or more of calcium, intima, lumen, and media. The method includes acquiring image data, which may include polar image data, such as intravascular data. Step 100. Initially, a set of ground truth data, such as a ground truth masks is established by reviewing and annotating the set of image data. In one embodiment, the method includes annotating one or more regions or features of interest in each polar image of the set of images such that each annotated region or feature is a ground truth annotation. Step 102. Pixels corresponding to a ground truth annotation may be stored in persistent electronic memory such as the database of FIG. 1. All of the data and annotations described herein may be stored in database or other data structure acceptable by neural network and image processing software modules of a given imaging system.

In one embodiment, the ground truth annotation can be performed with a user interface as shown and discussed in more detail herein, such as with regard to FIG. 3A. In one embodiment, the annotations are stored as ground truth masks and may include a set of regions or features of interests that are identified by a user along with the boundary or pixels that constitute the region or features. In one embodiment, the mask includes an overlay of pixels that is combined with the original image, such as a polar image. In one embodiment, the mask includes address/list of pixels that correspond to a particular ground truth annotation or predictive result.

Training a neural network of a machine learning system using set of annotated polar images is performed. Step 104. The training may be performed using ground truth masks and image data annotated to obtain the ground truth masks. Ground truth masks may be augmented using circular flips, right flips, left flips, and other augmentation transforms applicable to rotational imaging modalities. In part, the disclosure relates to augmented polar images, wherein one ground truth mask is modified to increase number of ground truth masks. In one embodiment, lumen detection is performed as an initial detection step such that the ground truth masks include a lumen boundary or lumen feature or lumen region. In one embodiment, training is performed until one or more metrics such as a cost function or other measure of error is reduced to an acceptable level. As errors are reduced, the detection/prediction accuracy of the MLS increases.

Once the MLS is trained, inputting image data to the neural network is performed to generate a set of image data with predictions, detections, classifications, etc. of the various features/regions of interest. Step 105. Generating K probability masks for each of K classes/types. Step 106.

Figure 1G:
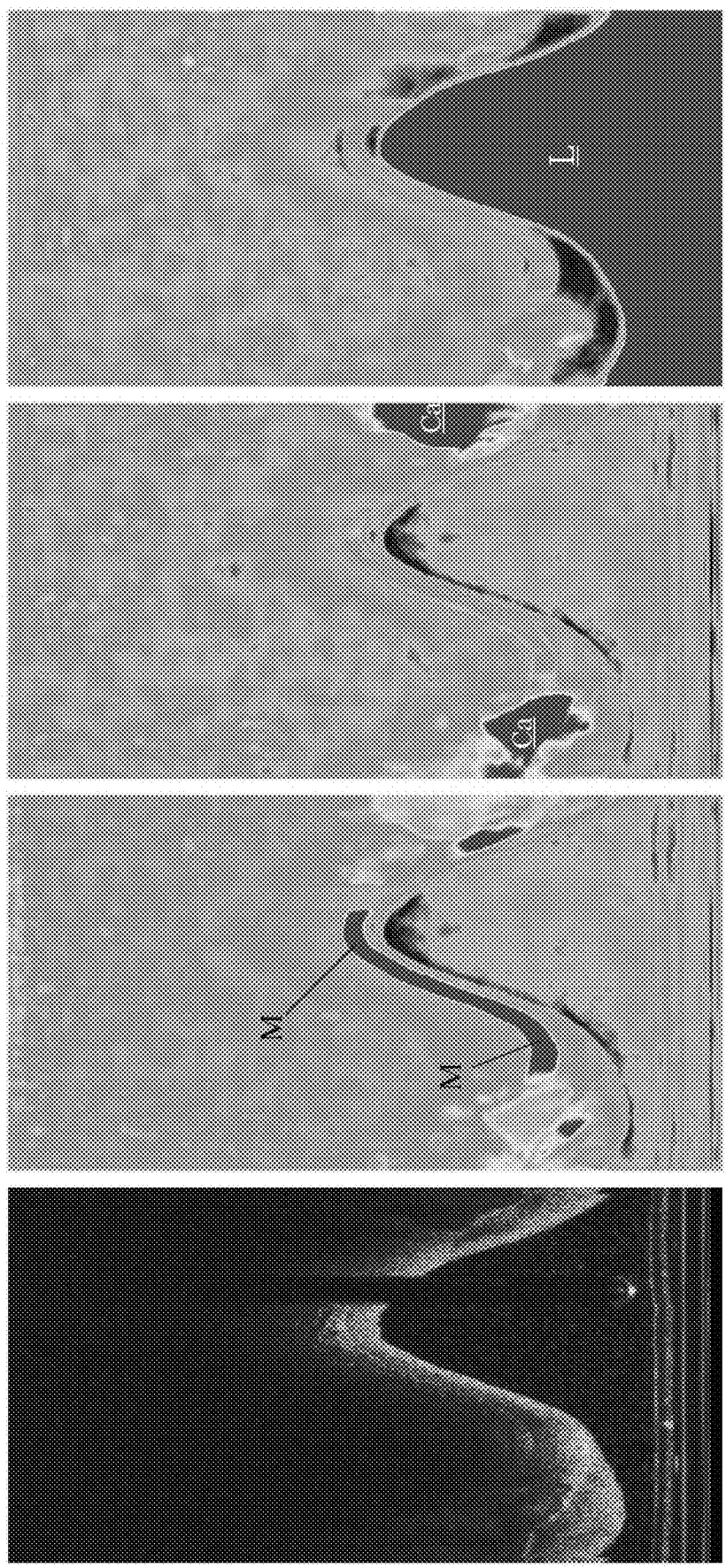
FIG. 1G shows image data from imaging a patient and three output probability maps corresponding to detecting media, calcium, and lumen as separate channels given illustrative embodiment of the disclosure.

Examples of probability map outputs/probability masks, when K is 3 for three different classes is shown in FIG. 1G. Specifically, FIG. 1G shows image data from imaging a patient and three output probability maps/probability masks for different classes. The output masks/maps corresponding to detecting media M, calcium Ca, and lumen L as separate channels given illustrative embodiment of the disclosure. As shown, for each respective channel, the class being detected is shown in red. Accordingly, in FIG. 1G, media M is red in media channel, the two detected calcium regions Ca are red in the calcium channel, and lumen L is show as red in lumen channel. Other indicia can be used to color code or represent various detected/predicted classes corresponding to regions/features of interest. In one embodiment, each class or type of a feature of interest is assigned an associated channel for tracking mask, maps, and final outputs with predictions relating to the classification of each part of an image for which the network was trained.

If calcium, media, lumen, and intima, are the classes/types for which the neural network is trained to classify features/regions, K is 4. In one embodiment, the outputs of the neural network include K probability maps, such that there is one probability map for each class/type. The method may include generating final predictive output for each frame of input image data. Step 107. In one embodiment, each of the K probability maps for reach of the different K classes/types, are compared on a per pixel basis and assessed such that each pixel for a given image frame is assessed and then a final predictive result is assigned to each pixel. In this way, each frame of image data is processed to generate a final predictive output. In one embodiment, the final predictive results are predictive output masks that include one or more indicia corresponding to a type/class. In one embodiment, the method includes displaying final predictive output images from neural network/machine learning system with class/type indicia. Step 108.

In one embodiment, various indicia are used to color code or otherwise visualize and show segmentation between different regions and features of interests identified using the trained MLS. In one embodiment, displaying output image data that has been modified to include the features/regions of interest identified/predicted using the neural network/machine learning system. The foregoing steps may be performed using one or more of the computer-based and AI processor based systems disclosed herein.

Figure 2:
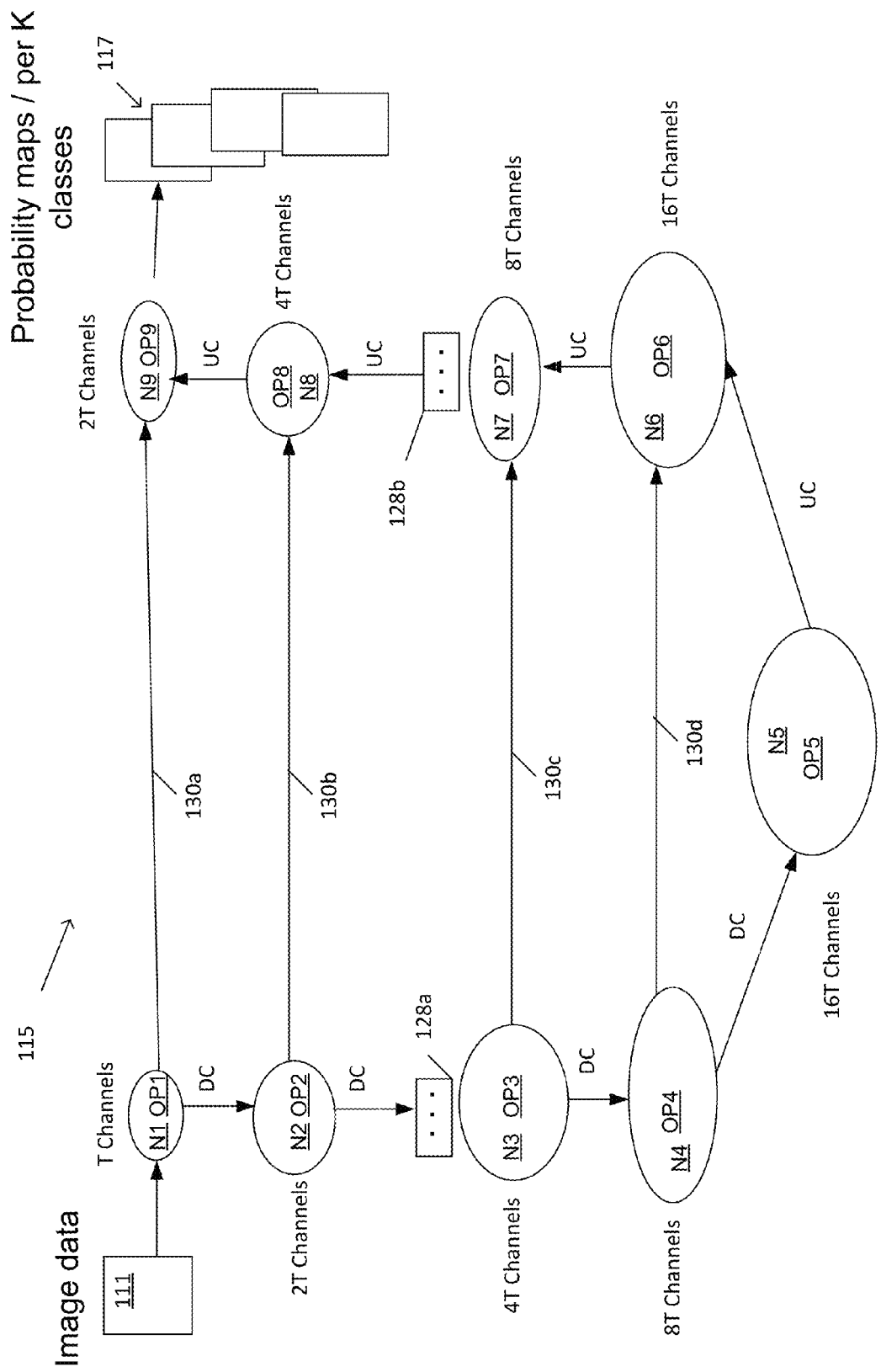
FIG. 2 is a multi-layer neural network architecture suitable for training using ground truth annotations and generating predictive results according to an illustrative embodiment of the disclosure.

Various neural network architectures may be used with the embodiments disclosed herein. For example, V-net, U-net, CUMedVision1, CUMedVision2, VGGNet, Multi-stage Multi-recursive-input Fully Convolutional Networks (M²FCN) Coarse-to-Fine Stacked Fully Convolutional Net, Deep Active Learning Framework, ResNet, combinations thereof, and other neural networks and software-based machine learning frameworks may be suitable for performing feature/region of interest image segmentation and classification as disclosed herein. FIG. 2 is an example of an architecture for a convolutional neural network suitable for training using annotated ground truth masks and generating probability maps suitable for assessing predictive outputs and showing classified image data with classified regions/features of interest. The multi-layer neural network architecture 115 of FIG. 2 is suitable for training using ground truth annotations and generating predictive results. The neural network architecture of FIG. 2 may be trained with ground truth masks for various types/classes (calcium, lumen, media, intima, and the numerous groups of others disclosed herein). Network 115 may be any of the network architectures disclosed herein or modified versions thereof or combinations thereof. In one embodiment, network 115 is a convolutional network.

The neural network 115 include inputs 111 and outputs 117. The outputs 117 are K probability maps for each image data input, when K classes are being specified to classify features and regions of interest. The K probability maps are assessed using a scoring or weighting system by which the output probability maps are compared for each frame of image data 111 and used to validate which pixels have a higher relative probability of being one of the K classes. As a result of the assessment, a final predictive output is generated that shows the various K classes and the associated features and regions with an indicia and a legend to distinguish the classes.

Various nodes are N1-N9 shown in the network 115 that have associated sets of operations and transforms "OP" that may be applied to channels of image data. In various implementations of network 115, the number of channels T is typically 16 or more channels. In an effort to streamline the processing speeds of network 115, Applicants have discovered that setting T to be 4, T=1, is suitable for classifying and training a network to assess arterial image data. Thus, in various embodiments, T channels corresponds to 4 channels, and 2 T, 4 T, 8 T, and 16 channels corresponds to 8 channels, 16 channels, 32 channels and 64 channels. These various channels are set at each layer/hidden layer of network to specify how instances of the input data should be operated upon relative to the various functions OP for the various nodes of the network. In one embodiment, the network 115 is trained with ground truth masks using function/operator such as adaptive learning algorithm. In one embodiment, a gradient descent-based method is used to train the network 115 along with the annotated ground truth masks.

The various nodes of the network 115 include sets of operations and transforms OP for the nine nodes N1-N9 shown, OP1, OP2, OP3, OP4, OP5, OP6, OP7, OP8, and OP9. Other nodes and layers may be added between nodes N2, N3 and nodes N7, N8 as shown the network elements 128a, 128b. The left side of network 115 that includes nodes N1, N2, N3, and N4, and the input arrow from node N4 to N5 perform one or more down-sampling/down converting operations DC. In contrast, on the right side of the network 115 that includes the output arrow from node N5 to N6 and nodes N6-N9, this part of the network performs one or more up-sampling/up converting operations UC between the nodes. In one embodiment, the neural network architecture includes an encoder to capture context information and of a symmetrically decoder path that enables precise localization.

The left portion of the network 115 is the down-sampling encoder part where convolution blocks and down-sampling operation used to encode the input image into feature representations at multiple different levels. The right part of the network includes up-sampling convolution operations and concatenation operations. The right part of the network operates to output an image that will have same dimension as the input image. In one embodiment, the network architecture has four instances of down-sampling operation or up-sampling operation thus the dimension of input image will require to be divided by 16 to avoid dimension mismatching. In this document, image data has an M×N pixel dimension.

In one embodiment, the M×N dimension is 912×512, but other specified dimensions may be used. In one embodiment, images other than the specified M×N size are padded or cropped to match the specified dimension. In various embodiments, the OP operations and functions perfumed at each node, OP1-OP9 are selected from the group of a convolution, a deconvolution, a additive process, a concatenation process, an up convert process, a down convert process, a Softmax process and a PReLu process. In one embodiment, the Softmax and Parametric Rectified Linear Unit (PReLu) processes are performed between one or more nodes as layers that transform network parameters transmitted between nodes from input image data into probabilities for inclusion in the output probability maps. In one embodiment, the output of the neural network include a probability assignment layer such as may be configured using a Softmax function. The probability, on a pixel-wise basis, or according to another grouping, such as per scan line, or per mask region, based on set of trained classes, also referred to as types or labels is provides as multiple outputs 117 for each of the K classes. In one embodiment, each node may operate as a layer or a layer may be defined by two horizontal nodes and an arrow therebetween. In one embodiment, the transfers between nodes shown by arrows 130a-130d from left side to the right side of the network correspond to combining or concatenating one or more channels from left side of architecture to the right side of architecture.

In one embodiment, the network architecture of FIG. 2 is configured to characterize three or more types/classes of pixel labels, such as calcium, media, lumen, and other classes and types of corresponding features and regions of interests that have been images. In one embodiment, the network 115 reduces channel count, such that T is 4, for all of the T channels shown such that processing speed of the network is substantially real time for between about 400 and about 600 frames of image data. Given objective of reducing patient time in cath lab during imaging and other procedures, a complex neural network, such as a network with T greater than 4 results in a slow down in the inference time when generating predictive results/probabilities, but also cause other problems such as overfitting in training process. In various embodiments, setting T to be 4 in the network 115 of FIG. 2 results in improved accuracy of network while reducing inference time. In one embodiment, for T equal to 4, the channels of FIG. 2 are 4, 8, 16, 32, and 64 corresponding to the T channels, 2 T channels, 4 T channels, 8 T channels, and 16 T channels shown.

In one embodiment, each horizontal layer, such as a given node or two nodes linked by transfer operation 130a-130d, is convolutional layer which is doing convolution operation such one or more of OP1-OP9 and/or vertical DC operations between nodes. These layers are extracting or learning some features of the input ground truth data. For convolution layer at left side, various strides may be set for each node. A given stride provides control over downsizing the image during a convolution operation. For example, if image size is 256× 256, the output size after convolution will be 128×128 (256/stride). De-convolution at right side of network performs upscaling per various UC operations.

Figure 2A:
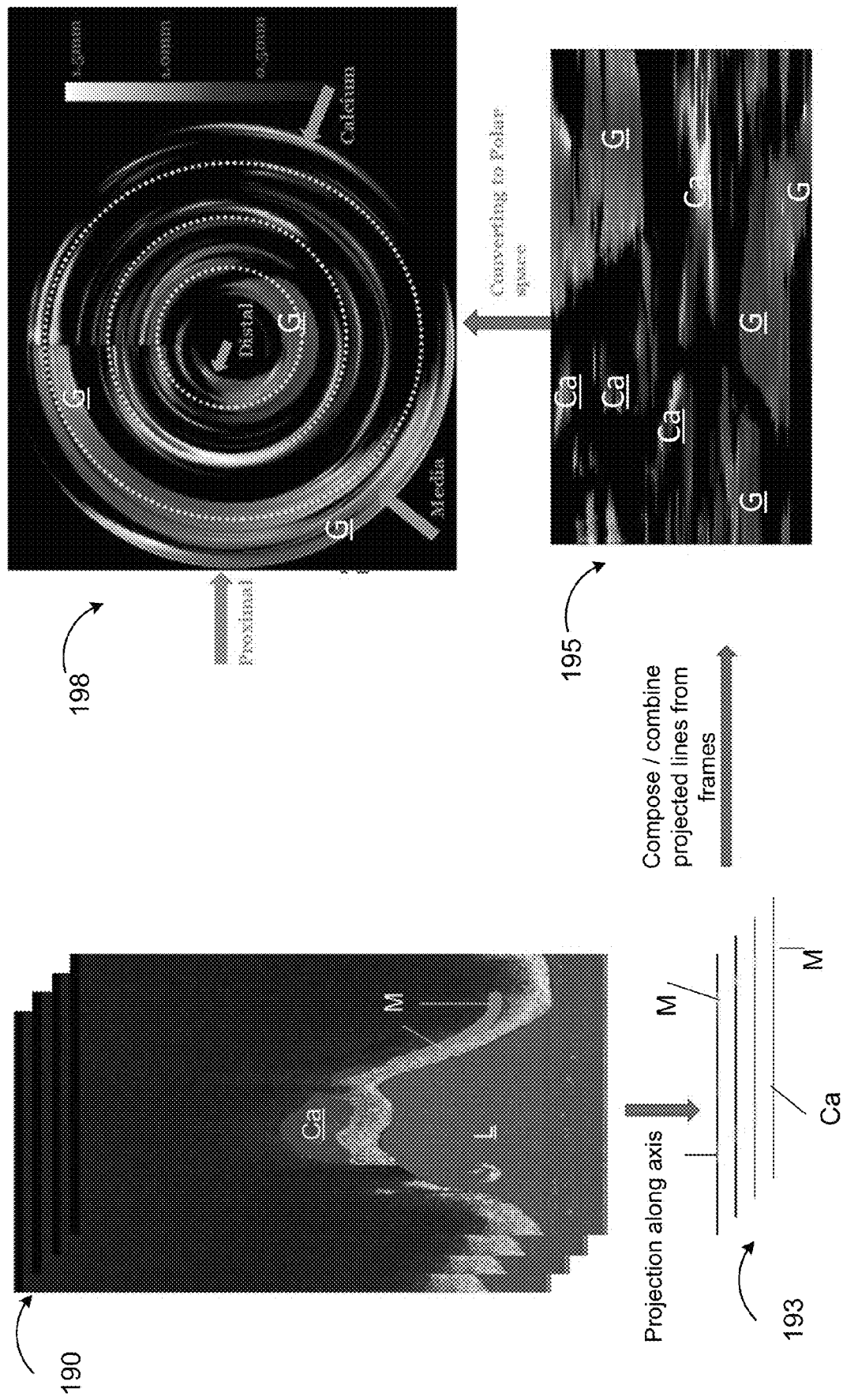
FIG. 2A is a schematic diagram showing a set of outputs from a MLS that include indicia corresponding to various color coded classes and the use of the foregoing to obtain projections and generate a carpet view and, optionally, a tissue map according to an illustrative embodiment of the disclosure.

FIG. 2A is a schematic diagram showing a set of outputs from a MLS that include indicia corresponding to various color coded classes, Ca (red), lumen (blue), and media (green) and the use of the foregoing to obtain axial projections and generate a carpet view and, optionally, a tissue map according to an illustrative embodiment of the disclosure.

In various embodiments, the neural network architecture may be 2D or 3D network and as such, operable to process 2D data and 3D data. In one embodiment, 3D for a pullback of F frames, wherein each frame is 2D polar image is displayed using a carpet view representation. In various embodiments, filters may be applied to a 2D carpet view to remove noise or other unwanted features such that processing time is increased when compared with using 3D operators. Additional details relating to the use of carpet view is provided with regard to FIG. 2A.

After media and calcium detection process, each frame in polar space will have corresponding frames/masks for media M and calcium Ca regions/features of interest. These frames/masks may include lumen L and other classes that were used to train neural network for ROI/FOI detection. A set of four output image masks/frames 190 is shown as an example. In various embodiments, this set of frames would include between about 400 to about 600 frames. Color code indicia have been used and are shown in frames and images in FIG. 2A with blue for lumen, red for calcium, and green for media. The output image masks may cover an entire pullback when OCT or IVUS data is used. In one embodiment, all of the frames of media and calcium mask, which also includes lumen in this example, are projected along axis, such as x-axis or y-axis as OR operation to get a line of mask. The lines resulting from projection operation are shown as four lines 193. The color coding of pixels in projected lines can be seen with green for media and red for calcium. In one embodiment, all the lines are combined into one binary media mask and binary calcium mask based on the order of proximal to distal frame, from left to right.

This combination of line projections 193 is shown as carpet view 195. Optionally, in some embodiments, the carpet view or lines projections 192 are used to create a tissue map 198 as shown. The outer most ring of the tissue map correspond to proximal direction, while the inner most ring shows the distal direction. In one embodiment, the tissue map 198 is created by performing a polar conversion relative to the carpet view. The carpet view includes 3D data that essentially includes all frames from pullback. In one embodiment, a binary morphological reconstruct filter is applied to media and calcium carpet view image 198 to clean up noise and small structures. In one embodiment, such a carpet view filtering step, relative to a carpet view based on predictive output frames/masks from neural network, advantageously removes small detected areas in carpet view image while large detected areas remain unchanged.

In one embodiment, the processed carpet view image may then be applied to media and calcium masks such as through a convolution, additive, or comparison process to remove noise in 3D polar space. Limiting operations on 2D carpet view to 2D filters improves processing time relative to operating on a 3D dataspace using 3D operators. The various process and operations depicted in FIG. 2A may be implemented using computer-based systems and software modules such as an image processing pipeline and neural network based feature/region detection and classification. In one embodiment, the method of detecting ROI/FOI such as Calcium, media, lumen, and intima using a trained neural network includes performing one or more of side branch detection, guidewire detection, and stent detection using an image processing pipeline in lieu of using a trained neural network to increase processing rate of set of image frames obtained during an OCT pullback.

In one embodiment, the carpet view is 3D representation of image frames of an intravascular pullback. The intravascular image data obtained during a pullback procedure using a probe can be displayed to a user by creating a representation of the scan lines by unfolding a cross-sectional or polar view along a longitudinal view. A carpet view is a two-dimensional data representation. In one embodiment, the carpet view shows a cross-sectional OCT image, but unrolled or unfolded in a manner akin to an unrolled wrapped cylinder of carpet.

Figure 13A:
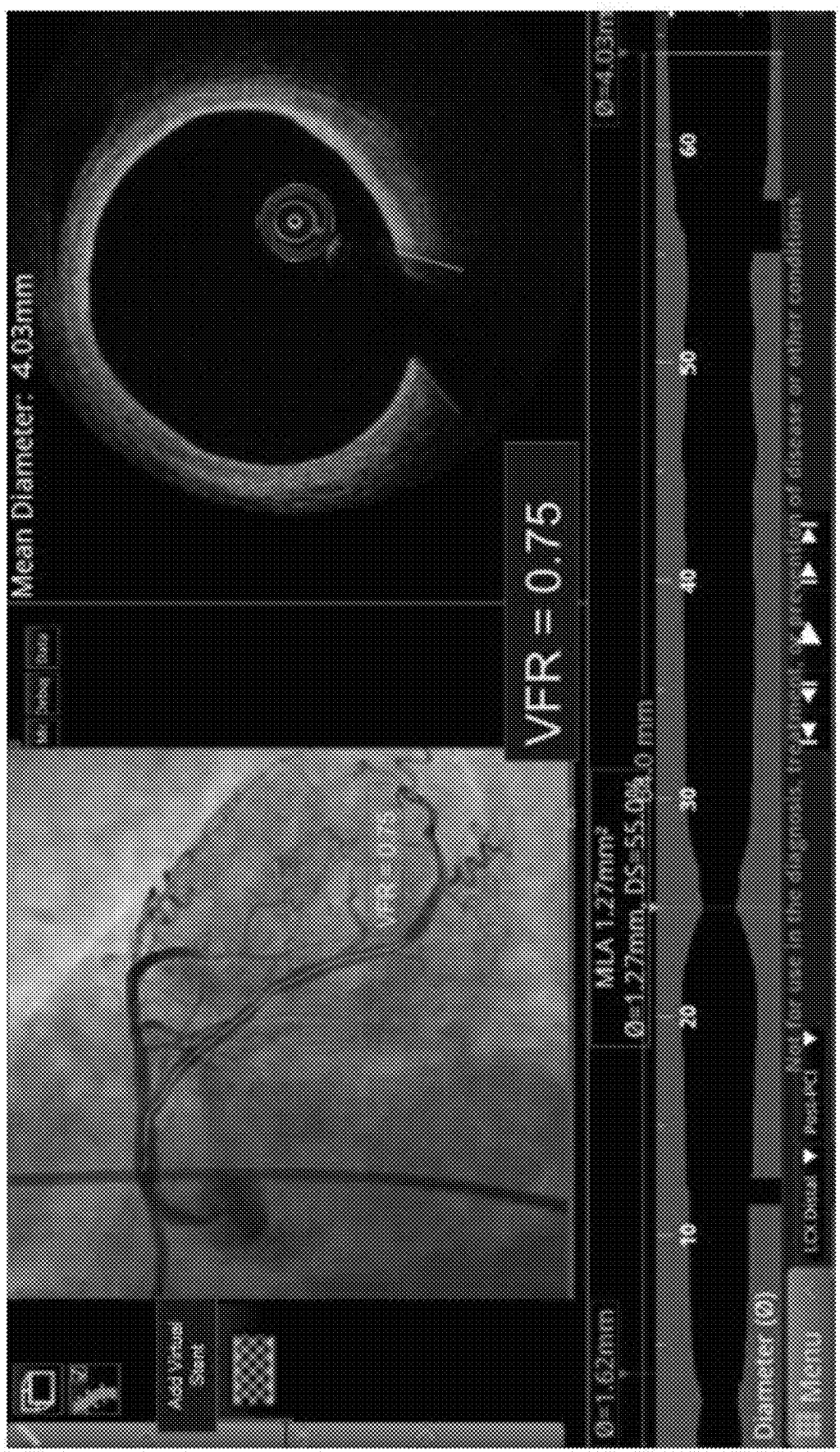
FIGS. 13A and 13B show exemplary user interfaces for diagnostic tools to support stent planning through virtual stenting that incorporate tissue classification using MLS systems and methods according to illustrative embodiments of the disclosure.
Figure 13B:
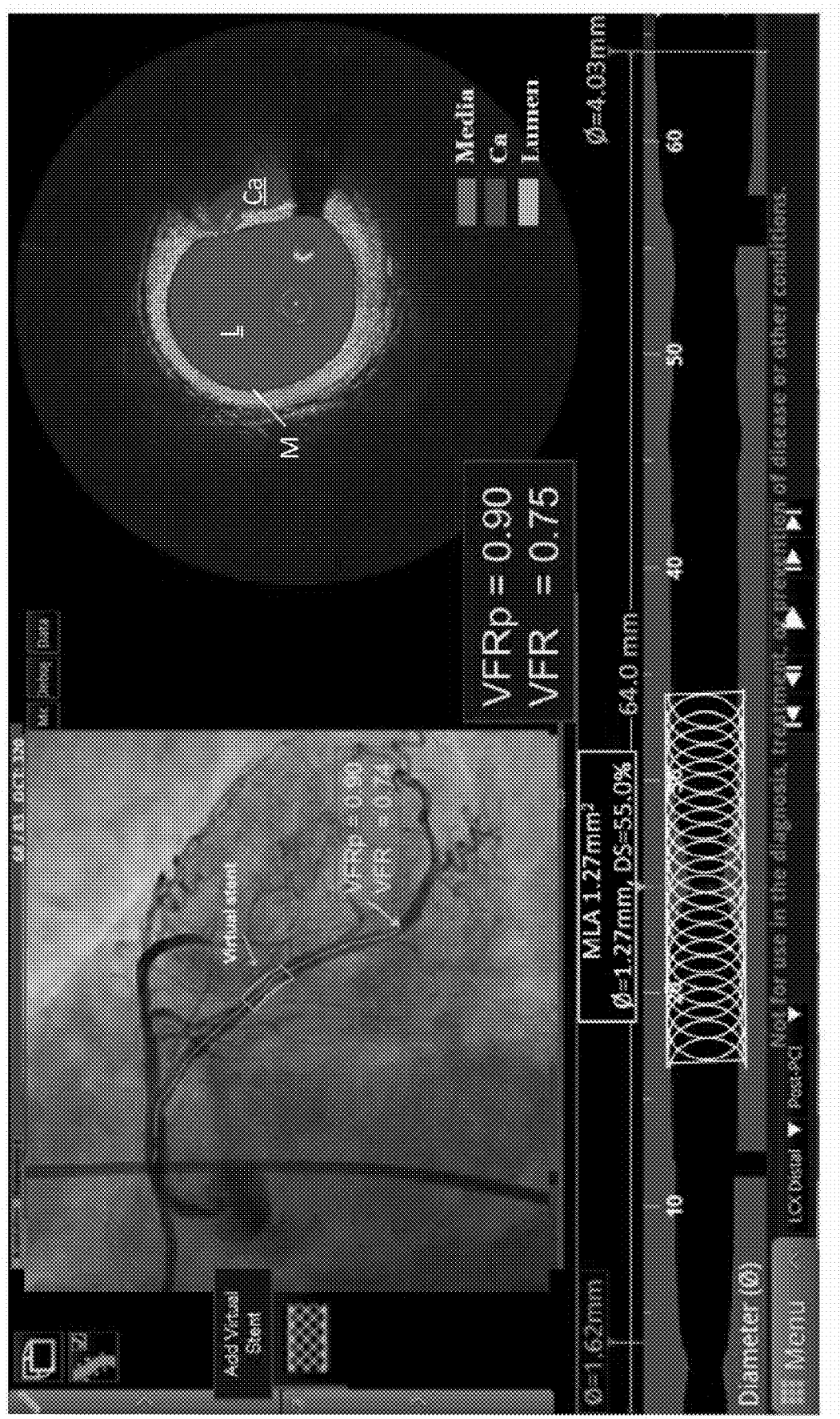

The carpet view can be used to display groups of polar image data or its underlying components in one or more ways. For example, in one embodiment, the carpet view collapses the radial offset dimension of the 3-D intravascular data set into a single intensity. In this way, the data can be represented in (Z, Theta) coordinates. In one embodiment, line projections can be used to generate a carpet view. In one embodiment, the method of collapsing that radial offset dimension is to sum intensity values between a near and far offset estimate. This intensity value summing generates a detectable increase in contrast with respect to certain regions in the carpet view/OCT image. These may be used to improve resolution and remove noise from output predictive masks that are displayed using one or more panels of graphical user interfaces as shown in FIGS. 5E, and 13A, 13B.

In one embodiment, the carpet view or OCT data can be used to generate a carpet view mask. The carpet view mask of the intravascular data can be generated to facilitate filtering of noise and artifacts from final predictive outputs displayed via a user interface such as shown in FIGS. 5E, and 13A, 13B. The process of binarization performed relative to a carpet view image is advantageous. In one embodiment, the carpet view mask is used as an input for subsequent intravascular image processing stages in which unwanted pixel fragments or other noise is removed.

In one embodiment, the carpet view is a two-dimensional dataset of generated from scan lines of a pullback in which the dimension of the offset along the scan line is removed or reduced. In the carpet view, the intensity values for shadows are low and the intensity values for tissues are high. The carpet view is typically a grayscale image but color versions can be displayed in some embodiments.

Figure 2B:
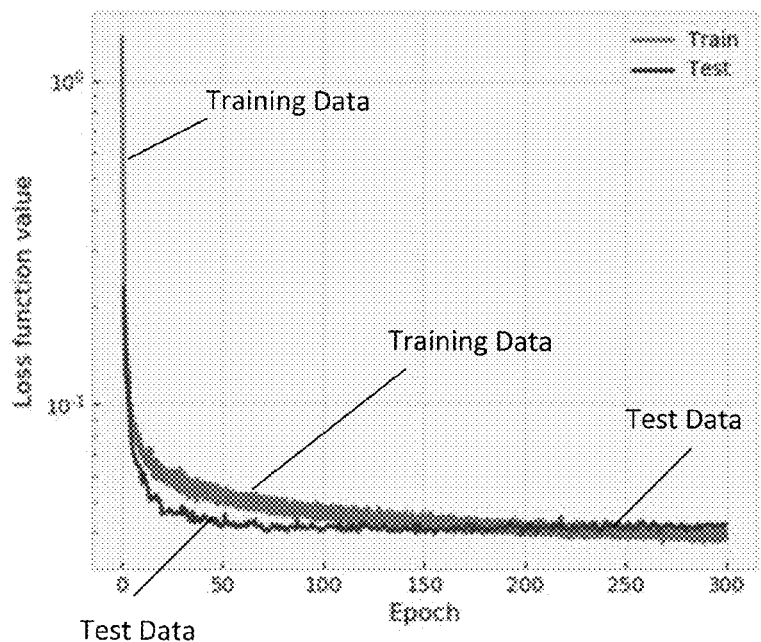
FIG. 2B is a plot of an MLS system showing loss function values for test data and training data according to an illustrative embodiment of the disclosure.
Figure 2C:
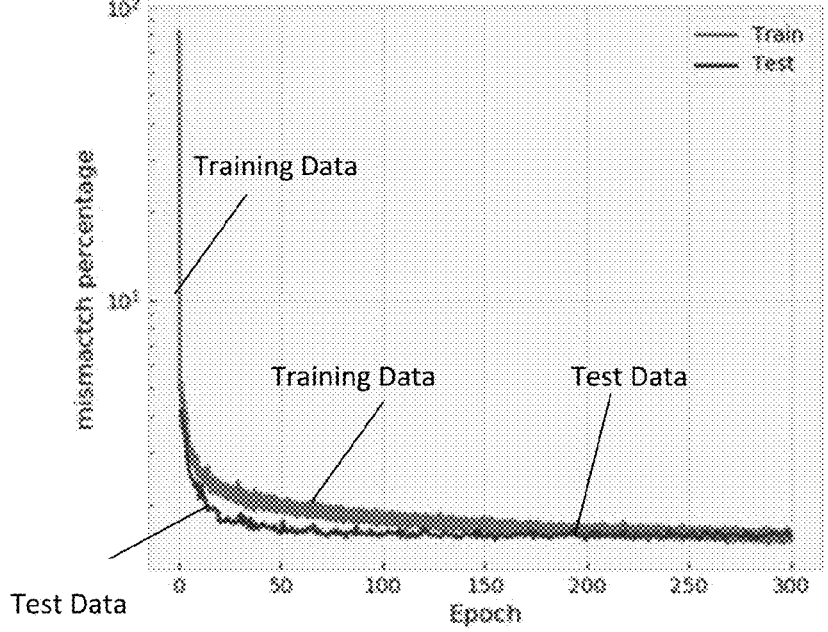
FIG. 2C is a plot of an MLS system showing mismatch percentage values for test data and training data according to an illustrative embodiment of the disclosure.

In one embodiment, trainings and experiments were performed using 3 or more AI processors such as graphical processing units. In one embodiment, the training code was implemented in Python using PyTorch framework. Before inputting OCT images and masks into neural network for training, all images were normalized to the range of (0.0~1.0). All images and masks were randomized the ordering and further split into two parts. The first part is 90% of the total dataset which was used in training model. During training session, images and masks were randomly shifted between (−256, +256) in vertical to augment training samples for each epoch. The second part was used for evaluating trained model's performance after each epoch. In one embodiment, the cross-entropy loss was computed using a pixelwise operable Softmax function over model output. The training and testing results are shown in FIGS. 2B and 2C. The loss function refers to the actual cross-entropy loss calculated from prediction and ground truth as shown in FIG. 2B. Mismatch percentage is the percentage of misclassified pixel in each image comparing to ground truth. Both FIGS. 2B and 2C showed the training process converged well after 300 epochs and there was no over-fitting problem.

Figure 2D:
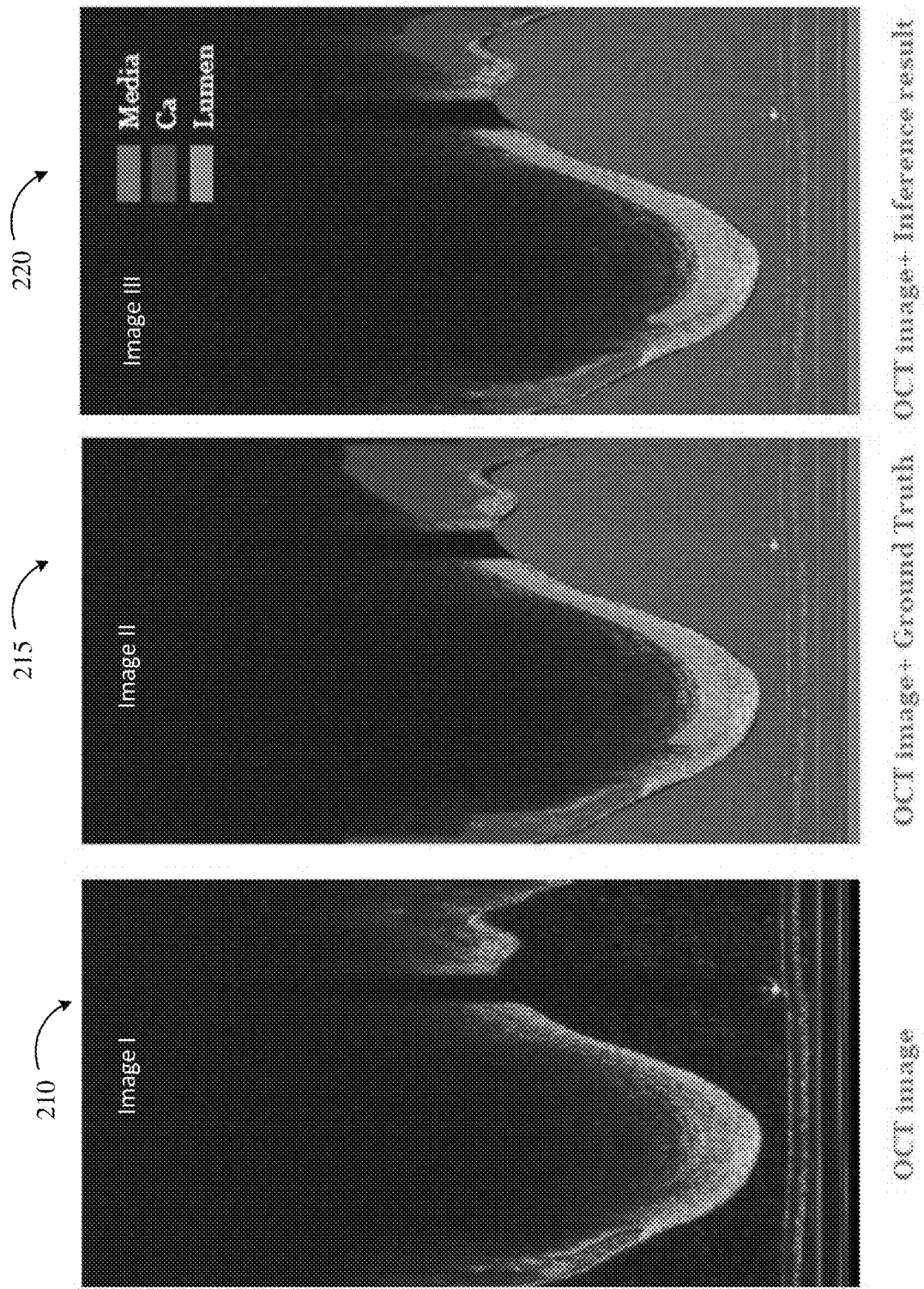
FIG. 2D shows an intravascular polar image of a patient artery, the polar image annotated or augmented with ground truth regions classified, and the polar image with features and/or regions of interest classified using an MLS according to an illustrative embodiment of the disclosure.

As noted herein, lumen detection is performed with regard to ground truth data image data and user image data that needs features/regions of interest to be detected/classified. In some embodiments, lumen detection is performed by analyzing scan lines for discontinuities, such as start and stop pairs. In other embodiments, lumen detection is implemented using a 2D or a 3D neural network that is trained with annotated images such as ground truth masks with the lumen boundary identified. FIG. 2D shows polar image data of an artery 230 with lumen L and tissue T identified. FIG. 2E shows polar image data 233 annotated with ground truth lumen data and is a mask with lumen L and tissue T corresponding to two different regions of interest/channels. FIG. 2F shows output image data 235 results with lumen detection performed with an MLS having a 2D neural net. FIG. 2G shows output image data 240 results with lumen detection performed with an MLS having a 3D neural net.

FIGS. 3A and 3B show user interfaces for a system suitable for navigating through frames of image data and annotating image data to generate ground truths. In FIG. 3B, a polar image 350 is shown in which a region 357 has been defined as a ground truth on a pointwise basis, such as through the movement of boundary points 360a, 360b, 360c with pixels outlying the region. In one embodiment, various drawing and editing tools can be used to annotate raw image data. These annotated image can be used to generate ground truth masks with the class or feature of the annotating region being defined and stored in memory using interface 305 of FIG. 3A. In FIG. 3A, 271 frames of an intravascular imaging pullback are available for annotation. Frame 146 has been selected for annotation to provide ground truth data for training the MLS. The user selected region for annotation in FIG. 3B corresponds to Media as shown by the class identifier selected in FIG. 3A. In this way, any feature/class can be selected for labelling and is stored in memory with the annotations. The annotations include pixel boundaries/regions that define masks that are matched to a particular class or feature, such as lumen, media, calcium, etc., without limitation, and may include any classes, features, or regions disclosed herein.

As an example, FIG. 2C shows a plot suitable for evaluating changes to training error over a period of time (zero to over 600 epochs). In FIG. 2C, the x-axis shows the number of training epochs and the y-axis shows the dice coefficient, which is a measure of error. The blue and orange curves indicate the network's performance on training and test data.

In one embodiment, the training data, such as ground truth data, along with the image data elements, which may include various image formats, such as raw gray scale images, is provided as input to the CNN of the MLS. The MLS is run over a period of epochs until the training error is reduced, minimized, or otherwise below a threshold. In one embodiment, the period ranges from about 100 to about 1000 epochs.

In one embodiment, the training data including the raw images and the ground truth annotations are all in polar coordinates. The ground truth annotations may be augmented by existing software algorithms that perform lumen detection. The lumen detection output from the software is combined with expert user annotations for the media, plaque and plaque type to generate the ground truth images. In one embodiment, the inputs to the MLS are the ground truth images and the outputs are classified images. When the classified images are the same as the ground truth images, the error is about 0.

FIG. 1B shows the use of a MLS 15 after training it using one or more of the training processes described herein or otherwise suitable for use with MLS and CNNs. After a given MLS/CNN has been trained, it can then process raw images and output the image segmentation that includes classified or characterized tissue. In one embodiment, a polar image from a pullback of an intravascular imaging probe is operated upon by a trained MLS to generated classified images. The system of FIG. 1B can include various pre-processing steps/operations 16 to further improve training and or processing time. In one embodiment, pre-processing includes a normalizing step. In one embodiment, the normalizing step includes normalizing intensity of one or more or all of image data, ground truth annotations, masks, frames, scan lines, neural network outputs, and other intensity-based data such that the intensity is normalized within a range such as from about 0 to about 1, or another applicable range.

Figure 3D:
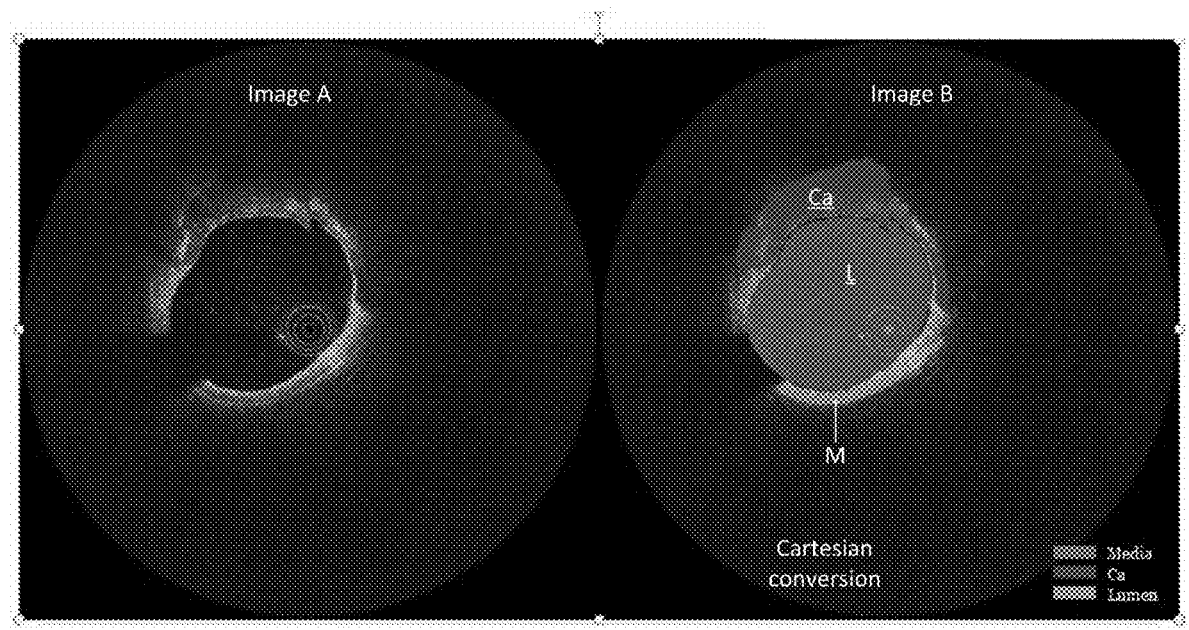
FIGS. 3D and 3E are output images from an MLS transformed into Cartesian form that show input images and semantic segmentation of the images to show MLS-classified media, lumen, and Ca regions/masks according to illustrative embodiments of the disclosure.
Figure 3E:
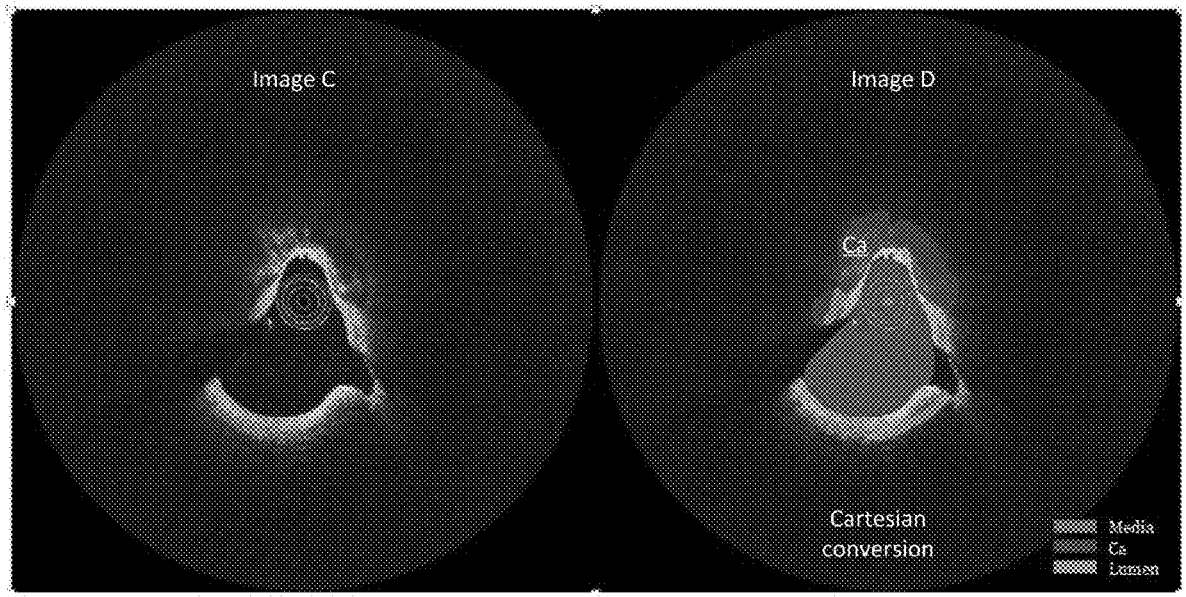

An example of an unclassified/uncharacterized OCT image in a polar form that corresponds to an image of a cross-section of a coronary artery is shown in first image of FIG. 2D. The second image of FIG. 2D is polar image plus a ground truth mask indicating ROIs/FOIs of media, Ca, and lumen. FIG. 2D's third image is a polar OCT image that includes an inference result or predictive result shown the color-coded indicia-green for Media, red for Calcium, and blue for lumen. An example of a user image data obtained using optical coherence tomography images that have been classified or characterized by a trained MLS are shown in FIGS. 3D and 3E and others. In comparing FIG. 3D to FIG. 3C, it is clear that both images are Cartesian images. In one embodiment, MLS training and prediction is performed on polar images and after classification has occurred, the polar views are converted to Cartesian views and the annotations generated by the trained MLS are displayed on the image using color coding or other suitable indicia or visualizations. As shown in FIG. 3D, the inner lumen region is shown as blue, the calcium containing plaque regions at the 9 o'clock position is shown in red and the media region is shown roughly as a thin curved region on the right side of the image that extends past the top and bottom midway points of the lumen.

A given cost function provides a metric to evaluate the output of a machine learning system by comparing the ground truth input/training set with the expected output when operating on patient data. The goodness of fit between the training data and the output data can be measured with a cost function. The output of a cost function can be a value that corresponds to an error metric. This output is a comparative metric such as a difference or a distance to summarize how the machine learning system or the neural network or other operative components thereof is succeeding in terms of accurate predictions given the predicative results and the ground truth used to train the system. If the output result of the cost function where zero, the system would be effectively working perfectly. As such, iterative changes to the system can be used to reduce the cost or error function of the system and improve its predictive accuracy.

In addition, a pixel-wise based cost function is specified to measure the distance or another suitable metric or score between prediction and ground truth. In one embodiment, backpropagation is to update each of the weights in the network based values derived from the cost function. In one embodiment, on partial derivatives of the cost function are used to update the weights during backpropagation. This weight updating process has the benefit of the actual predictive results being closer the ground truth. This has the benefit of reducing or minimizing the error for each output neuron/node of the neural network. In one embodiment, the neural network is a convolutional neural network (CNN).

FIG. 1C is a schematic diagram of a machine learning system 30 that includes a trained neural network 34, such as a network trained with an augmented data set of annotated ground truth masks. As shown, input image data, such as OCT polar image data, in example shown, is operated upon by trained neural network 34. The input polar OCT image are being operated upon to generated predictions/predictive outputs in the form of polar images that include color coded indicia corresponding to various arterial features/regions, such as Media (green), Calcium (red), and Lumen (blue) and as shown. Examples of ground truth images, in the form of annotated ground truth image masks that are used to train the neural network 34 of the MLS are also shown. In various embodiments, the outputs of the MLS system include one or more of arc-based metrics/measurements of similarity for both Ca and EEL; detected EEL diameters; and detected Ca depth. In some embodiments, these values are measured relative to image data after classifying EEL, media, calcium, lumen, and other regions and features of interest.

Still referring to FIG. 1C, once the MLS is trained, back propagation can be run from a time zero to a back-propagation time BPT. In this way, the predictions corresponding to annotated images or masks are generated by inputting raw images from a patient such as from an OCT pullback into the MLS and propagating the data through the network to generate predictive outputs. In one embodiment, the BPT time ranges from greater than 0 to about 60 seconds. In one embodiment, the BPT time is less than about 180 seconds. In one embodiment, the BPT time is less than about 90 seconds. In one embodiment, the BPT time is substantial real time as disclosed herein, in various examples. Various neural networks 34 can be used to implement the systems and methods disclosed herein. These network can include various hidden layers, functions, operators, and operably combined and operator upon multiple channels. In one embodiment, the channels correspond to the input image data, such as a set of pixels from a given frame or a subset of pixels from a given frame.

FIG. 1D shows and MLS 55a that works in conjunction with image processing components of an imaging system to generate results that are sent to the imaging system. In one embodiment, the image processing is OCT image processing. The MLS performs AI detection using a neural network. This can be performed with an AIP/GPU. The processing time T1 ranges from about 20 to about 40 seconds in one embodiment. In one embodiment, the AIP is a GeForce GPU of the 1080 or higher family. The AI detection can be configured to detect lumen, calcium, EEL, and any of the ROI/FOIs disclosed herein. The system 65a of FIG. 1E separates lumen detection as a separate processing stages with a processing time T3. Lumen AI detection can be performed using one or more AIPs/GPUs. The system of FIG. 1E also includes various pre-processing steps to reduce downstream processing times when a patient is in the cath lap and tissue detection/prediction is being performed while they are prepped for a procedure. The pre-processing may have a processing time. In one embodiment, pre-processing includes a data flattening step.

Finally, AI detection can be performed on the image data that has been lumen detected and pre-preprocessed. The AI detection process may take a time period T4. In one embodiment, T3 ranges from about 1 to about 5 seconds. In one embodiment, T4 ranges from about 5 to about 12 seconds. In one embodiment, the overall processing time T2 ranges from about 8 to about 20 seconds. In one embodiment, T2 is from about 5 seconds to about 15 seconds.

In one embodiment, the MLS and method steps and operations performed can include semantic image segmentation that utilize a neural network, trained end-to end, to process OCT images. Training data includes about 900 OCT images in polar space with manually labeled regions of interest, wherein each region of interest corresponds to a given ground truth. Each given ground truth can map to a channel that will be detected in image data using the trained network. In one embodiment, various input images and their corresponding channel specific masks are used to train the network using one or more algorithms. In one embodiment, a stochastic gradient descent optimization algorithm is used.

In part, the disclosure relates to methods for classifying tissue and different constituent layers and materials (each of the foregoing exemplary tissue types or tissue characteristics) as well as changes in the foregoing over time. An exemplary output Cartesian image of a patient artery that has been classified by an MLS and one or more related methods is shown in FIGS. 3D and 3E in images B and D.

FIGS. 2D-2G show a polar image of an artery, the polar image annotated with ground truth lumen data, lumen detection results performed with an MLS having a 2D neural net, and lumen detection results performed with an MLS having a 3D neural net.

Various layers of a coronary artery are shown. An inner region P, corresponding to shadows or reflections from an intravascular imaging probe P is show in the lumen of the vessel L. In particular, the disclosure relates to detecting and identifying tissue types and regions and/or features of interest with regard to an artery and displaying indicia or other visualization of such tissue types. This predictions or inferences from the MLS depicted in a tissue characterized/classified arterial image helps an end user facilitate diagnostic and treatment decision making Some non-limiting examples of tissue types for which the methods and systems disclosed herein can be used to detect include inner region where blood flows, the lumen, the intima, the media, external elastic lamina (EEL) (also referred to as external elastic membrane), internal elastic lamina (IEL), adventitia, plaque, calcium or calcified tissue, and others. The media is bounded by the IEL and EEL. The intima is bounded by the lumen and the IEL.

The disclosure relates to various embodiments that use one or more machine learning or artificial intelligence (AI) systems to detect or segment an image of an artery or other structure into various component tissue types or regions of interest. In part, the machine learning systems are designed such that they can be installed or combined with an imaging system such as an intravascular imaging system, an ultrasound system, or an x-ray system such as an angiography or fluoroscopy system. In one embodiment, the disclosure relates to using an MLS to perform tissue characterization to detect one or more of Lumen, EEL, Media, and calcium/calcium plaques. Additional details relating to these arterial layers and calcium plaques are shown in FIGS. 5G-5J.

In one embodiment, the image data, which may be raw image data from one or more imaging systems (OCT, IVUS, Angiography, X-ray, Fluoroscopy and others), the ground truth annotations are all in one or more coordinate systems. The ground truths, the ROI, FOIs, and the predictive results can each correspond to a channel and have an associated image mask in a given training or patient image. Processing data that is in a polar coordinate form such as OCT data is challenging for various systems.

Given the real time demands associated with generating a classified set of image data immediately after obtaining such data from a patient that is still catheterized makes timely processing of the image data using the MLS a practical necessity. In order to allow machine learning and AI techniques to be used, various pre-processing or MLS design choices may be implemented to facilitate data processing times that range from about 1 second to about 20 seconds.

In general, the systems and methods disclosed herein provide to various automated diagnostic tools to help physicians determine if they should treat a given patient and, if so, which lesion/stenosis should be treated. In one embodiment, the system provides guidance to treat the most significant lesion based on physiology. In addition, the details relating to plaque type, and other MLS detected features can be used to selected shortest stent that provides maximal flow recovery. In addition, virtual-stenting can be implemented that provides interactive planning that allows for stent to be tailored for placement in an artery that is informed by tissue classifications and other measurements as disclosed herein.

The systems and methods disclosed herein provide guidance such that a clinician can assess various stent landing zones. This can be supported by virtual-Stenting with virtual flow reserve values that help select a lesion landing zone. Co-registration with angiography and OCT data further supports this. Per the use of MLS detection, normal frames (frames with healthy tissue) will have fuller Media/EEL coverage. In this way, MLS as implemented herein solves the problem of guiding stent planning and helping to improve patient outcomes.

Further, automated EEL measurements obtained using the MLS described herein inform what stent size to consider and what type of stent should be used. Calcium detection via MLS provides info on lesion preparation and treatment choices, such as selecting artherectomy over stenting. In addition, calcium detection provides an input parameter when deciding between Calcium detection will help decide BVS vs DES.

Figure 4A:
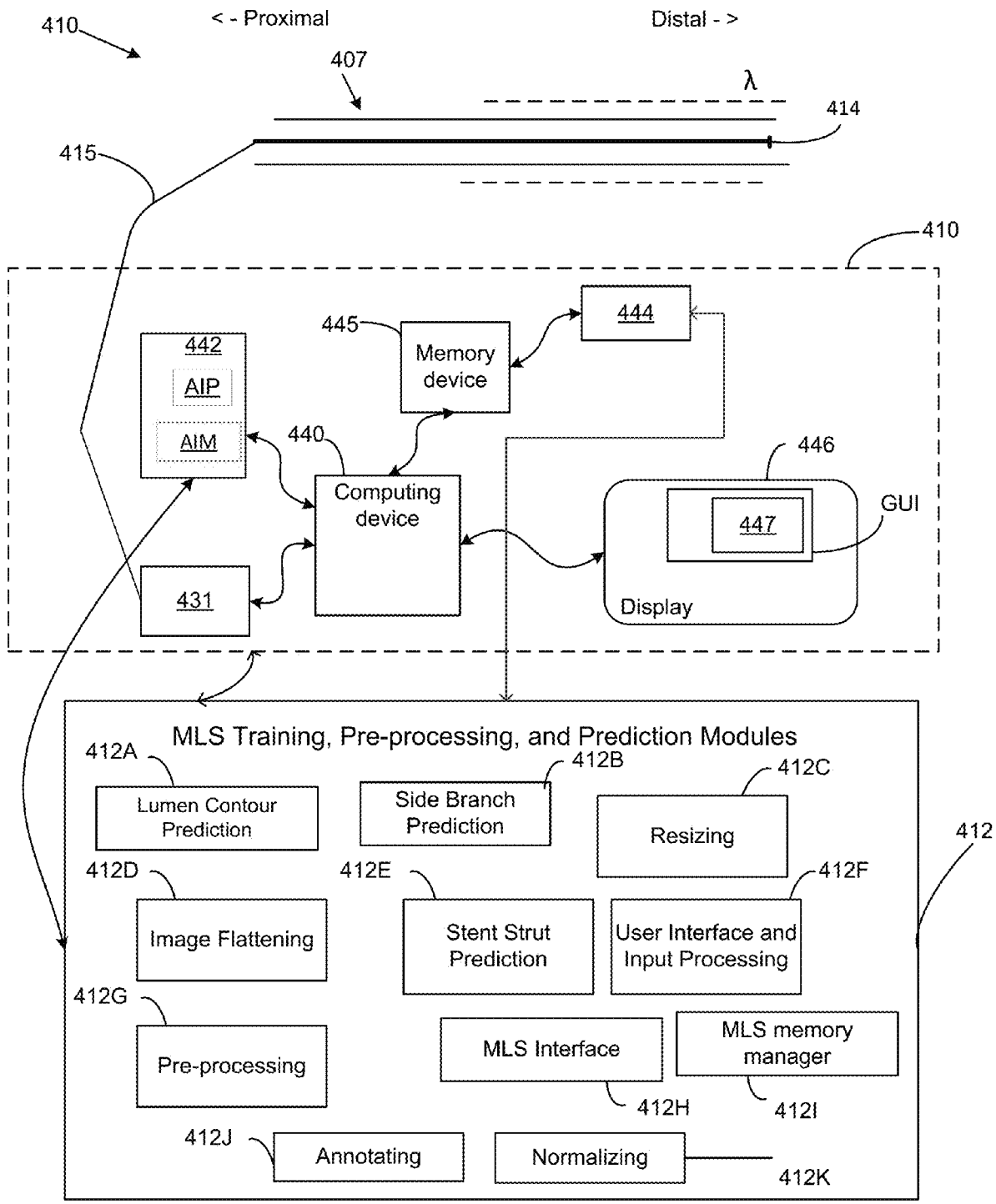
FIGS. 4A-4C are exemplary imaging and diagnostic systems that include one or more machine learning systems that are or may be integrated with or otherwise combined with an imaging system.
Figure 4B:
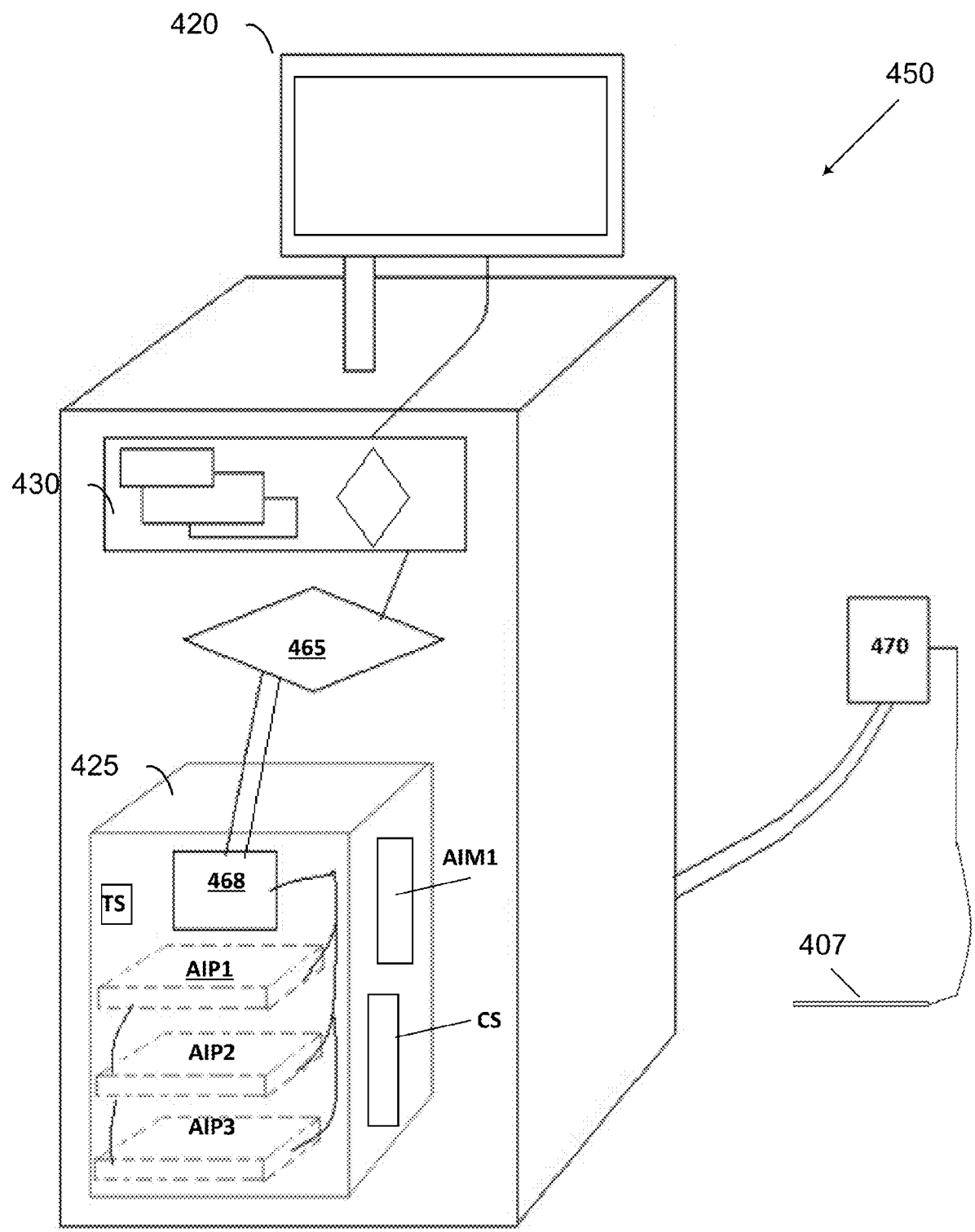
Figure 4C:
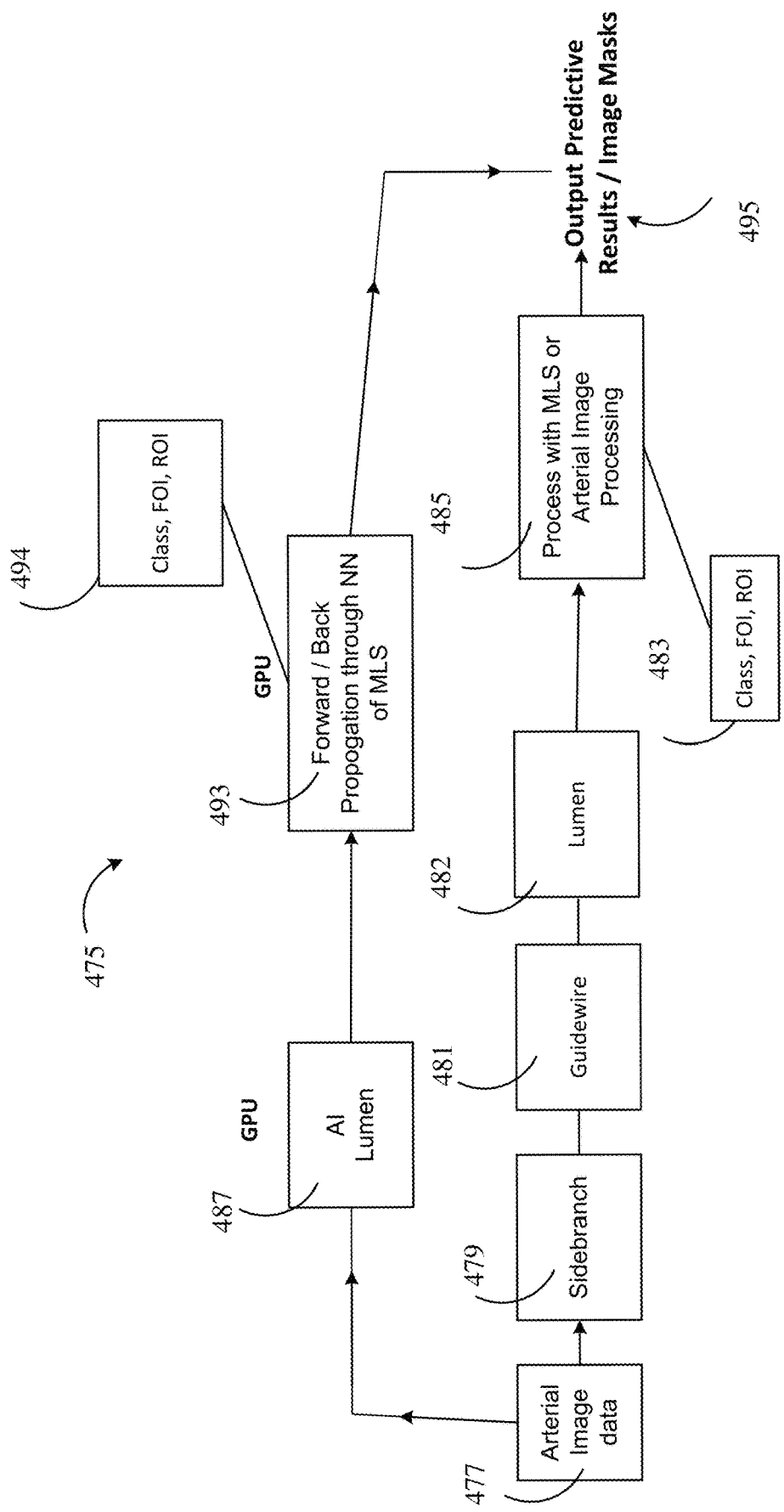

FIGS. 4A-4C are exemplary imaging and diagnostic systems that include one or more machine learning systems that are or may be integrated with or otherwise combined with an imaging system. Exemplary imaging systems can include OCT, IVUS, angiography, fluoroscopy x-ray based imaging systems, and others.

Referring to FIG. 4A, a data collection/imaging probe 407 and imaging system 410 that includes a MLS system 442 suitable for use as intravascular diagnostic system/data collection system is shown. The system 442 can include an AIP such as one or more GPUs in serial or parallel and AI memory AIP. The system can be used for implementing one or more of the AI/ML based techniques, systems, and methods described herein. The system 410 may be used as a stent planning system for suggesting stent placement options and provide graphical user interfaces for simulated or virtual stent planning based on flow measurements such as VFR, IFR, FFR, and others. Some exemplary graphical user interface components for such as system are shown in FIGS. 13A and 13B. FIG. 14B shows a view of an artery cross-section with a measured and predictive VFR value. In addition, a mask has been generated using a trained neural network to show Calcium (Ca/red color), media (M/green color) and lumen (L/blue color). A simulated stent is also shown in a longitudinal view of an arterial representation in user interface shown in FIG. 13B.

In various embodiments, an intravascular probe 407 may be used to image an artery in the presence of x-ray imaging systems such as angiography. Other imaging systems, such as CT scans, MRIs, x-ray based imaging systems, and other 2D and 3D imaging systems may be used to generate and/or store image data in one or more memory storage devices. The probe 407 in various embodiments may include other imaging modalities such as, for example, OCT, intravascular ultrasound (IVUS), and others. The probe 407 is in optical communication with an intravascular diagnostic system/data collection system 410. The OCT optical system or subsystem 431 that connects to probe 407 via an optical fiber 414 includes a light source such as a laser, an interferometer having a sample arm and a reference arm, various optical paths, a clock generator, photodiodes, and other OCT system components.

The system 410 further includes one or more diagnostic software tools or modules 412 relating to MLS-based image detection. This software can be stored as a non-transitory instruction on one or more memory devices such as memory device 445 and executed by one or more computing devices such as computing device 440 or MLS 442. The MLS includes one or more AI processors AIP and dedicated memory AIP in one embodiment. Sent planning software tools can include one or more vessel profiles such as target profiles generated by a user, a comparator or other comparison software routine for comparing pre and post stent profiles or other profiles. In general, the software 412 can process a set of intravascular data and carry out the various methods steps described herein such as those described with regard to FIGS. 1F, 2, 2A, 2B, 4B, 4C, 12A and 12B and other depicted and disclosed herein. In one embodiment, the software 412 is stored in AIP and executable by the AIP.

The software 412 is designed to operate upon intravascular data sets and other blood vessel data from an intravascular probe or other detector or data source such as an angiography system. In one embodiment, blood vessel data can be recorded during a pullback procedure and stored in an electronic memory device. The training, preprocessing, and ground truth mask generation, detected/predicted tissue classification, the neural nets and other features and software components can be run on AIP or computing device 440. The software includes various MLS Training, Pre-processing, and Prediction Modules as shown. These may include Lumen contour prediction 12A, side branch prediction 12B, resizing 12C, image flattening 12D, lumen flattening; stent strut prediction 12E, user interface and input processing 12F, pre-processing 12G, MLS interface 12H, MLS memory manager 121, GUI training module for annotating image data 412J to generate ground truth masks, intensity normalizing modules 412K and others.

In one embodiment, software modules designed to operate upon intravascular data to characterize the tissue and identify regions of interest such as calcium regions, taper regions, lipid pools, and other tissue features such as. The software 412 can also compare Fractional Flow Reserve (FFR), Vascular Resistance Ratio (VRR), and other measured and calculated intravascular data collection parameters. To the extent such parameters change from a stented state to a non-stent state, such parameters can be used to generate one or more metrics.

In one embodiment, an OCT system 431 can be used. The system includes an optical receiver such as a balanced photodiode based system receives light returned by the probe 407. A computing device 440, such as a computer, a processor, an ASIC or other device that is part of the system 410 or is included as a separate subsystem in electrical or optical communication with the system 410 and receives electronic signals from the probe 7. The computing device 440 in various embodiments includes local memory, buses and other components suitable for processing data and utilizing software 444, such as image data processing configured for stent visualization and stent malapposition detection. In one embodiment, a PCIe bus or other high-bandwidth, low latency bus is used to connect various components of a given imaging system, MLS, or combination system that includes both.

The stent deployment planning tools 412 can be part of or exchange data with software 444. These tools can be used to place a virtual stent in the lumen area that the probe 407 is disposed in relative to vessel wall. FIG. 13B shows an exemplary region of a segment of a pullback wherein one or more virtual stents can be deployed and displayed on a user interface.

As shown, in 4A a display 446 can also be part of the system 410 for showing information 447 such as cross-sectional and longitudinal views of a blood vessel generated using collected intravascular data. Once the intravascular data is obtained with the probe 407 and stored in memory 445, it can be processed to generate and display information 447 such as a cross-sectional, a longitudinal, and/or a three-dimensional view of the blood vessel along the length of the pullback region or a subset thereof. Two or three dimensional image masks can be used to show or store ground truth data and predictive outcomes. These views can be depicted as part of a user interface as shown and described below and in subsequent figures. The images of the blood vessel generated using the distances measurements obtained from the system 410 provide information about the blood vessel including lumen contours, vessel diameters, vessel cross-sectional areas, landing zones, and a virtual stent bounded by the landing zones when processed using the tools and software modules described herein. In one embodiment, the MLS 442 includes one or more computing devices and one or more software programs or modules. There various devices, components, systems, and subsystems disclosed herein are operable to perform the tasks, methods, steps, processes and other features described herein relative to each of the foregoing.

The MLS 442 may include one or more AI processors and/or GPU and/or processing cores and/or stream processors and specialized memory for performing MLS training and prediction/inference when operating on patient image data such as image data elements. Additional details to a MLS-based system are shown in FIG. 4B.

As shown in FIG. 4B, a combined imaging and MLS system 450 is shown. The system includes a display 420 that can support annotating raw image data with points and contours to store ground truth data to train the MLS. The display can connect to MLS 425 or an imaging subsystem 430. The MLS 425 and imaging system 430 have a data transfer interface 465. In one embodiment, the MLS 425 includes one or more buses/motherboards 468 to provide communication channels and connections for various AIPs, memory, and other components. In one embodiment, the MLS 425 includes a several AI processors (AIP). These can be arranged in a server configuration. As shown, three AI processors AIP1, AIP2, and AIP3 are in commination serial, parallel, or combinations thereof. The MLS and imaging system are disposed in a housing in one embodiment. The housing includes a cooling system CS to manage the high temperatures generated by the AIPS. In one embodiment, the AIP includes one or more graphics processing units (GPUs). In one embodiment, the housing includes a temperature sensor TS that regulates the cooling system CS to ensure continued operation of the AIPs in the housing. In one embodiment, one or more AIPs are networked to the imaging system and/or MLS and transfer data processed outside of the housing.

In one embodiment, the system includes a motherboard that connects to the AI processor. The motherboard is disposed in the housing of the system. The housing can be a cart that includes wheels to move the housing and its imaging and MLS system components in the cath lab or another location. The system includes a probe interface unit 470 that includes a coupler for an optical imaging probe such as an OCT probe or an IVUS probe. This PIU is also referred to as a dock in one embodiment.

In various embodiments, the trained neural network executed on an AI/ML processor such as a graphics processor/graphics processing unit that is disposed in housing of imaging/data collection system. The AI/ML processor includes N parallel processors. In one embodiment, N ranges from about 2000 to about 2500. In one embodiment, N ranges from about 2000 to about 3000. In one embodiment, N ranges from about 3000 to about 4000. In one embodiment, N ranges from about 4000 to about 5000. In one embodiment, N ranges from about 5000 to about 6000. Multiple parallel processors may be grouped on individual hardware elements referred to as compute units. In one embodiment, the compute units range from about 20 to about 80 compute units for a given AI processor. Each compute unit may have multiple parallel processors. In one embodiment, the Compute Unified Device Architecture (CUDA) is used with CUDA cores ranges from about 2000 to about 10000 cores. In one embodiment, the Compute Unified Device Architecture (CUDA) is used with CUDA cores that range from about 2000 to about 2500 cores. Examples of suitable parallel processors include, without limitation, CUDA core and Tensor core processors from Nvidia and stream processors from AMD. In one embodiment, between about 200 and about 300 Tensor Cores are included in the AI processor/graphics processor used.

In one embodiment, the AI processor memory (AIP) is greater than about 8 GB. In one embodiment, the AI processor memory is greater than about 16 GB. In one embodiment, the AI processor memory is greater than about 32 GB. In one embodiment, the AI processor memory is greater than about 64 GB. In one embodiment, the AI processor memory is greater than about 128 GB. In one embodiment, the AI processor memory ranges from about 4 GB to about 256 GB. In one embodiment, the AI processor memory ranges from about 8 GB to about 128 GB. In one embodiment, the AI processor memory ranges from about 16 GB to about 64 GB. In one embodiment, the AI processor memory ranges from about 8 GB to about 32 GB. In one embodiment, the AI processor memory ranges from about 32 GB to about 64 GB. In one embodiment, one or more of the electronic memory storage devices include an NVMe™ interface to increase processing speeds to reduce data analysis time for MLS operations when patient is in cath lab. In one embodiment, 16 GM or more of on-board RAM is used on motherboard of imaging system/data collection system. In one embodiment, 32 GB or more of on-board RAM is used on motherboard of imaging system/data collection system.

In one embodiment, the AI processor memory ranges from about 1 GB to about 2 GB. In one embodiment, the AI processor memory ranges from about 2 GB to about 4 GB. In one embodiment, the AI processor memory ranges from about 4 GB to about 6 GB. In one embodiment, the AI processor memory ranges from about 6 GB to about 8 GB. In one embodiment, the AI processor memory ranges from about 8 GB to about 10 GB. In one embodiment, the AI processor memory ranges from about 10 GB to about 12 GB. In one embodiment, the AI processor memory ranges from about 12 GB to about 14 GB. In one embodiment, the AI processor memory ranges from about 14 GB to about 16 GB.

FIG. 4C shows a system 475 with software modules suitable for operating upon image data with two alternative process flows for identifying/segmenting features/regions of interest relative to the image data. In one embodiment, the image data is arterial image data such as polar OCT image data, but other image data from various image sources may be used. In the upper process flow alternative, artificial intelligence-based lumen detection 487 is performed such as by using an NN trained on lumen boundaries/lumen masks as ground truths. The AI lumen detection run on an AI processor such as GPU or other processor with dedicated memory. The image data along with masks or other representations of the detected lumen boundaries for frames of image data are then processed with a NN using forward and back propagation to segment/classify the image to generate class, feature of interest, region of interest, and other detections/predictions on which the NN was trained. As a result, predictive results such as output predictive image masks are generated 495.

In contrast, in other embodiments, other detections/predictions are performed in various sequences and orders, prior to using the results of any initial detections, such as sidebranch 479, guidewire 481, and lumen 482 along with arterial image data as inputs to the MLS for processing of the arterial data and prior detections using a trained MLS. In this way, the MLS-based detections/predictions of a given set of pixel's class, FOI, ROI, etc., are determined relative to image data and prior set of detections. The prior detections, such as for sidebranch, guidewire, lumen, etc., may be stored as image masks. In one embodiment, the MLS is trained on ground truth image data sets that included the prior detections implemented such as sidebranch, guidewire, and lumen, in the exemplary embodiment shown.

In part, the disclosure relates to an automated method to detect calcium containing tissue, such as calcified tissue, or calcium plaque, or other region of interest and identify the relevant nodules/region of interest for artherectomy and using a substantially real time guided method for doing artherectomy using a laser. In various embodiments, an OCT imaging probe is in optical communication with an imaging laser such as a swept source laser. As a result, there is an optical path that extends through the probe to a light directing element such as a unitary lens, a GRIN lens, or a beam director by which light is received from the imaging laser, transmitted to the tissue through one of the foregoing optical elements, and then light from the tissue is received and transmitted back to an OCT imaging system where it interferes with light generated by the imaging laser.

Figure 5A:
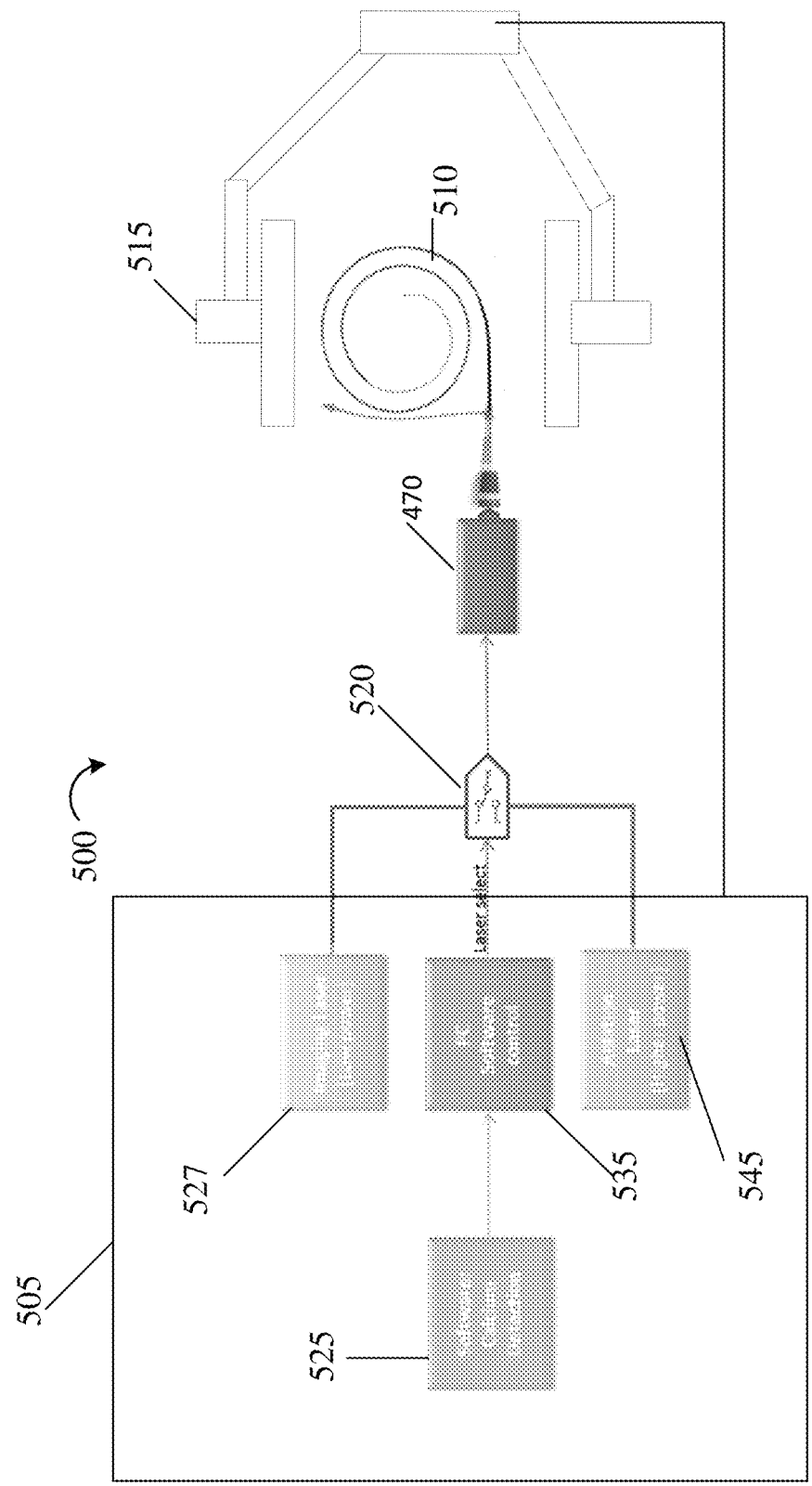
FIG. 5A is a schematic diagram of a system suitable to perform guided artherectomy using an optical imaging system, such as an OCT imaging system, according to illustrative embodiments of the disclosure.
Figure 5B:
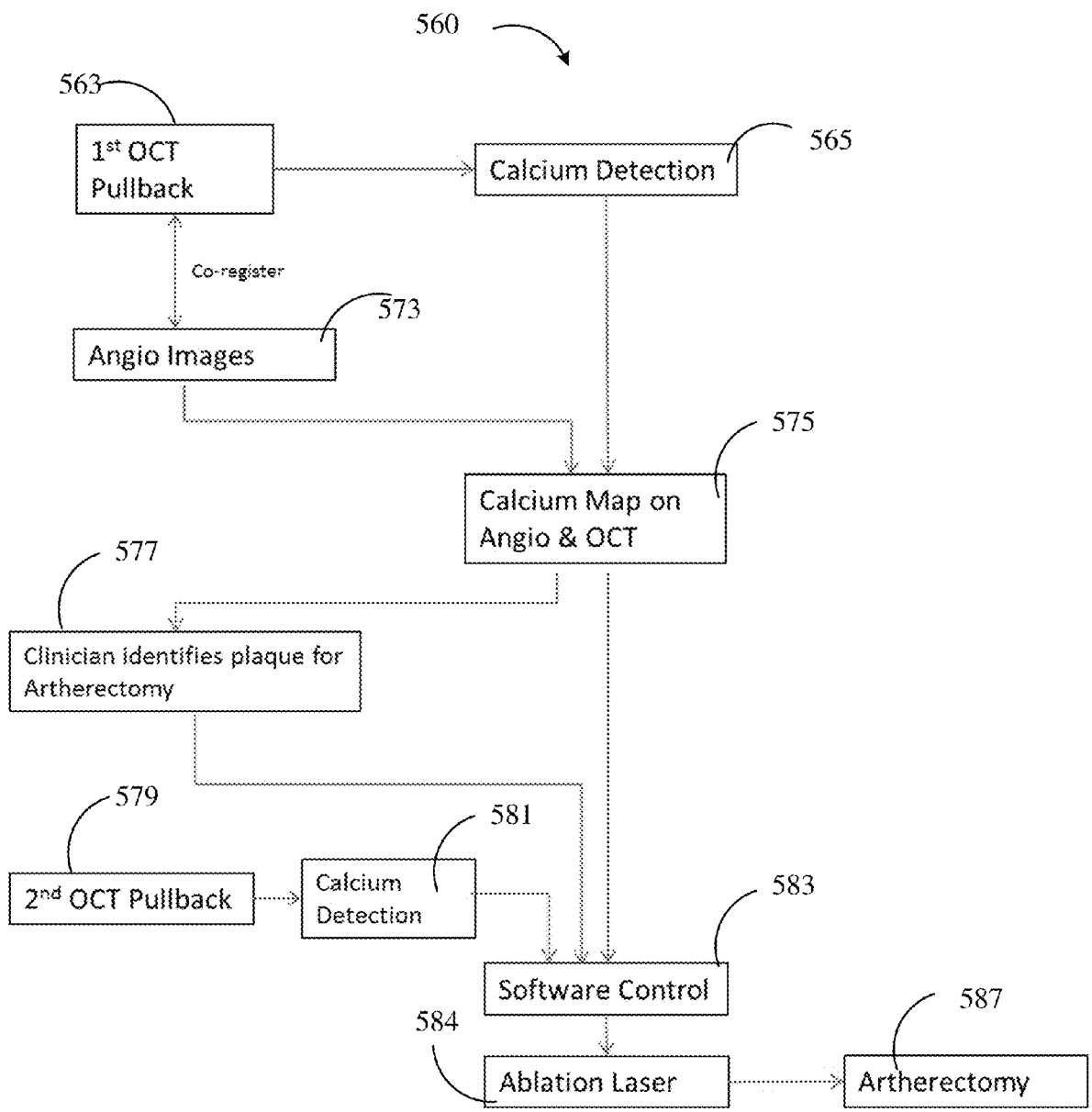
FIG. 5B is a schematic diagram of a method suitable to perform guided artherectomy using an optical imaging system, such as an OCT imaging system, according to illustrative embodiments of the disclosure.

FIG. 5A is a schematic diagram of an exemplary system to perform OCT guided artherectomy. In turn, FIG. 5B, a schematic diagram of an exemplary method to perform OCT guided artherectomy. In FIG. 5A, a system 500 for detecting features of interest with an OCT system 505 that includes one or more MLS systems that include feature detection software such as a trained NN is shown. An imaging probe 510 includes an optical fiber that is part of the sample arm of an interferometer. The reference arm of the interferometer is included in or in communication with the OCT system 500. A patient interface unit 470 includes a rotary coupler or other mechanism to couple the imaging probe and its optical fiber to the OCT system 505.

One or more optical switches 520 may be in optical communication with the PIU 520. The optical switch 520 may be controlled by controller software or a controller. In turn, the OCT system includes an imaging laser 527 and includes or is in communication with an ablation laser. The control software or controller 535 allows the optical switch to switch between the imaging laser for OCT imaging and the ablation laser for targeted ablation using the GRIN lens, beam director, microlens, or other optical element for directing light in the probe 510. In turn, the MLS and its detection software, such as calcium detection software 525, can be used to identify regions of interest that contain calcium or other materials for which ablation is a preferred treatment option.

In part, the disclosure relates to calcium detection using a MLS system such as a deep learning based artificial intelligence system that works in conjunction with OCT software or other imaging software. The MLS highlights the region where there is calcium plaque or other ablation targets. The Deep Learning network/MLS was trained using 450 to 100 annotated OCT images with the calcium region marked by an expert user. This trained network was then fed with raw OCT images that were segmented at a pixel level through the deep learning network.

In one embodiment, the calcium detection using a trained MLS system, such as a deep learning based artificial intelligence that works in conjunction with OCT software is one aspect of the disclosure. The MLS highlights the region where there is calcium plaque or other abatable tissue. The deep learning network was trained using 450 annotated OCT images with the calcium region marked by an expert user. This trained network was then fed with raw OCT images that were segmented at a pixel level through the deep learning network.

Figure 5C:
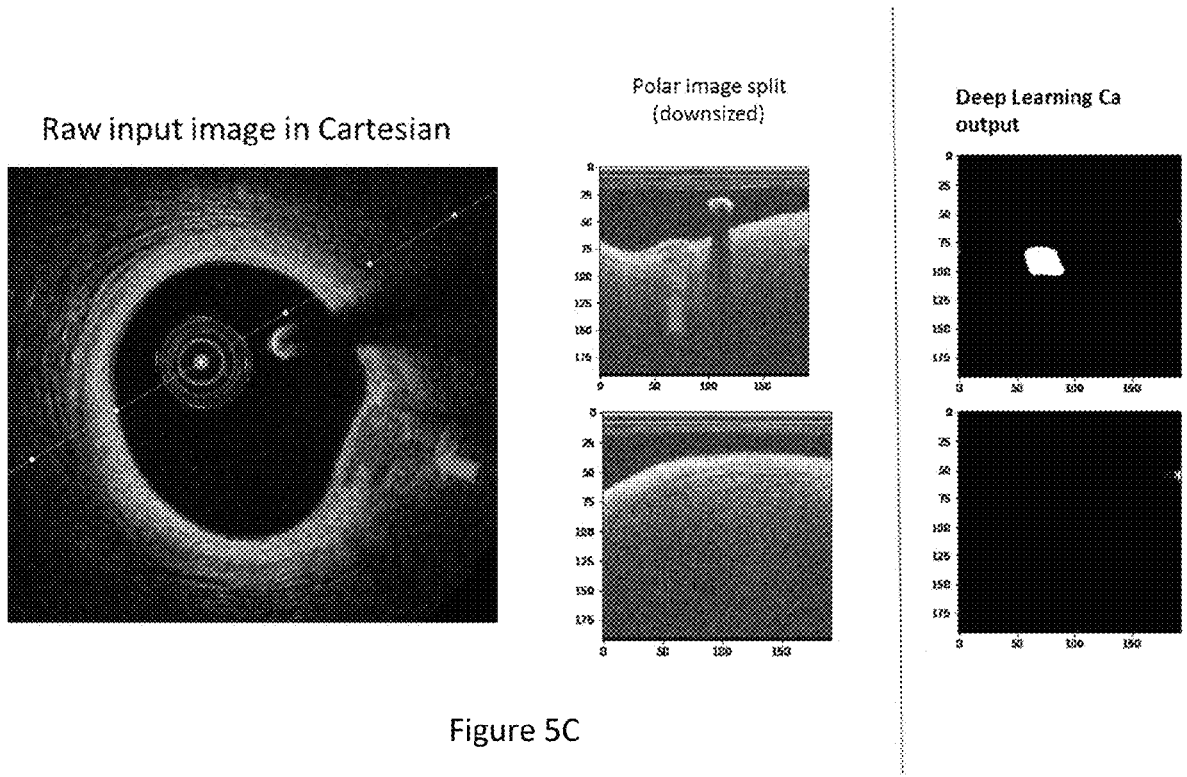
FIGS. 5C and 5D are OCT images segmented to highlight the Calcium plaque regions using a MLS system such as a deep learning based system according to illustrative embodiments of the disclosure.
Figure 5D:
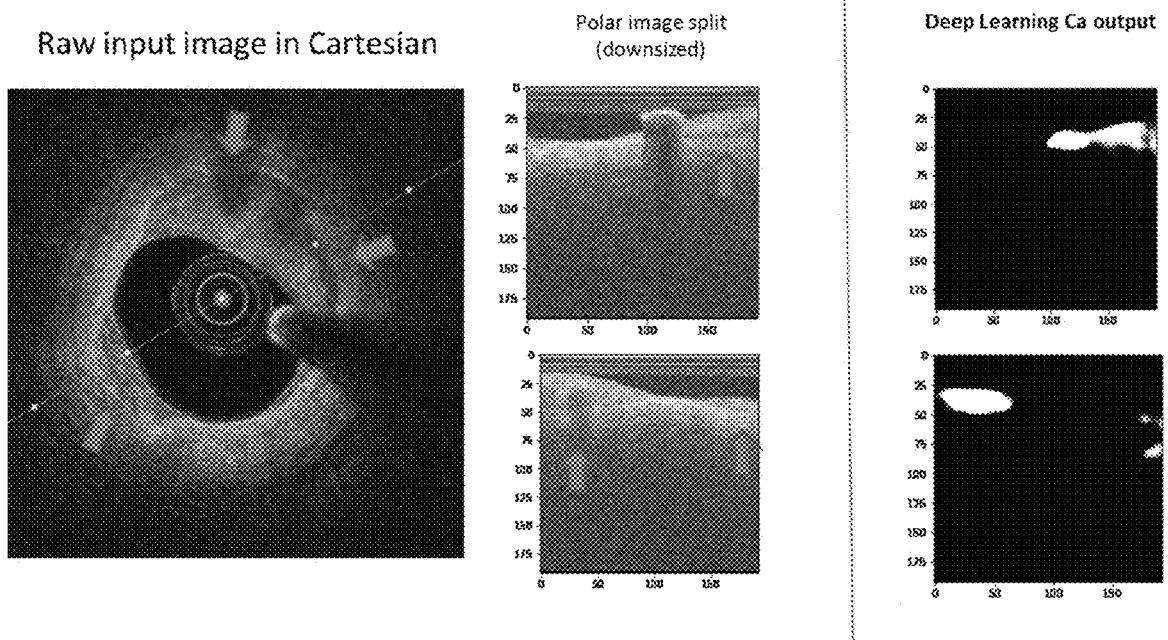
Figure 5E:
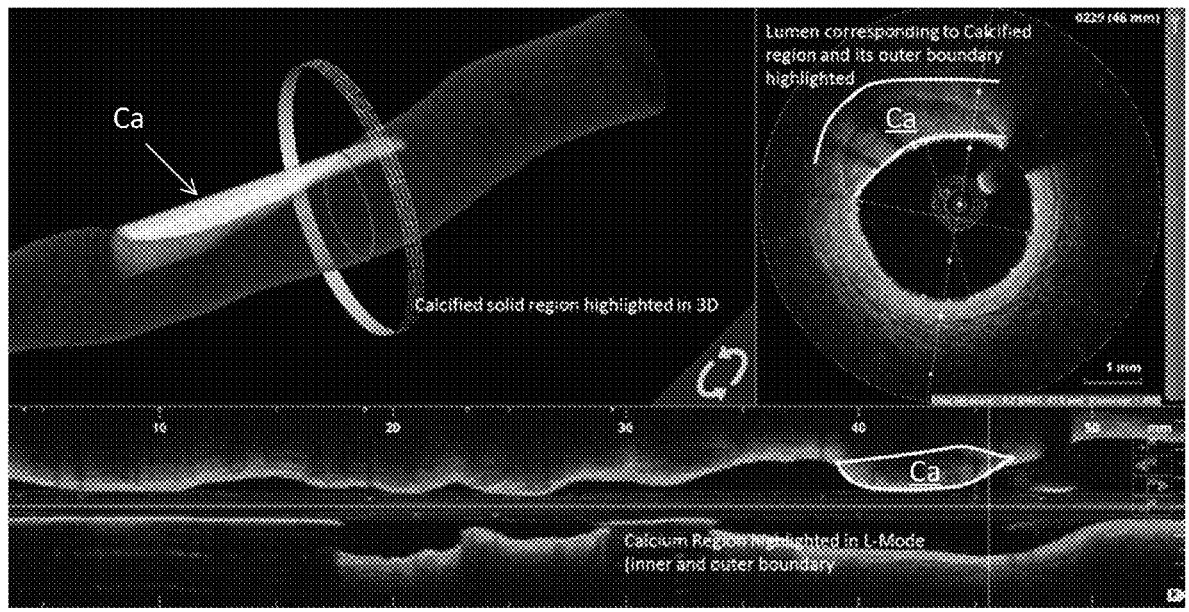
FIG. 5E is a user interface display of Calcium plaque on 3D, cross section and longitudinal views according to an illustrative embodiment of the disclosure.
Figure 5F:
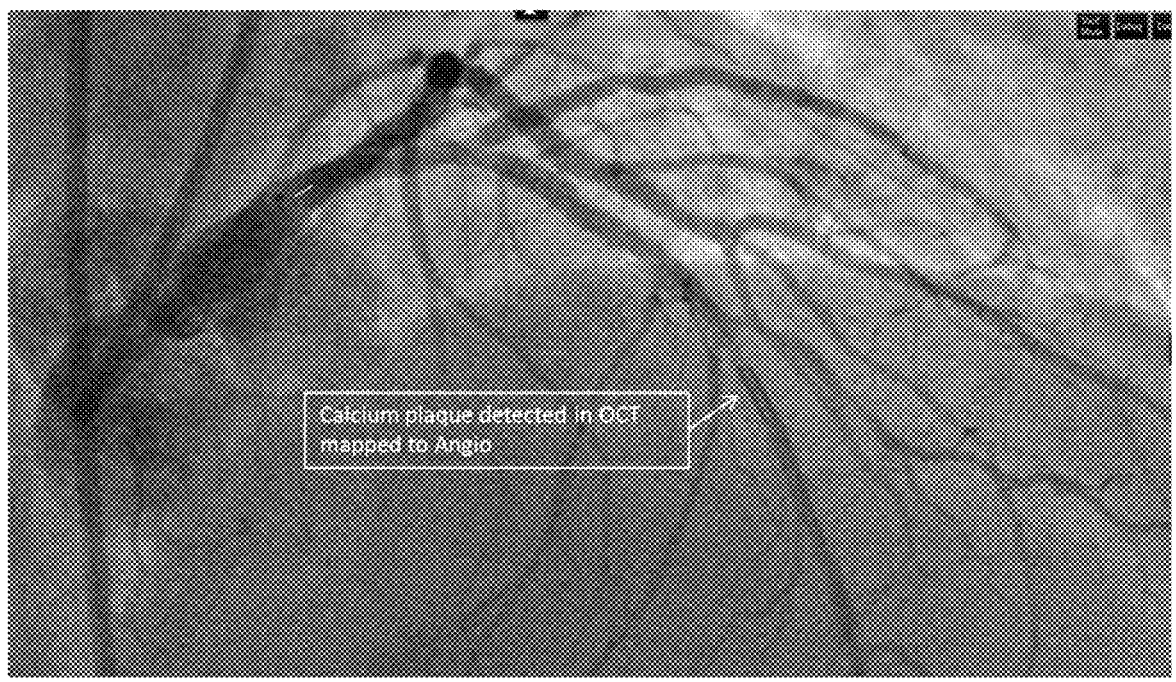
FIG. 5F is a calcium map created on the angiography system using angiography co-registration according to an illustrative embodiment of the disclosure.

FIGS. 5C and 5D show OCT images segmented to highlight the calcium plaque regions using a MLS system. FIG. 5E is a user interface that displays a region of detected calcium such as a calcified plaque on 3D, cross section and longitudinal views. In turn, FIG. 5F is a calcium map created on relative to angiography data, by co-registering OCT data with angiography data, and then displaying frames that contain calcium relative to the angiography data. This maps the calcium plaque detected in OCT onto the angiography graphical user interface for review and planning. The calcium regions detected in the OCT pullback is also mapped onto the angiography data for review by the physician. The physician then identifies the calcium nodules regions of interest that are candidates for artherectomy or an ablative procedure.

As outline in FIG. 5B, a method 560 for detecting and abating tissue of interest using an OCT imaging probe is described. Initially, a first OCT pullback is performed 562. With the initial set of OCT data, calcium detection is performed 565 using a MLS embodiment, or another methods of detecting calcium. The OCT data is collected during an angiography imaging sessions. As a result, the OCT images and the angiography images are co-registered. 573 A calcium map, such as that show in FIG. 5D is generated. 575 Next, a clinician reviews the image data and calcium detections and identifies plaques that warrant ablation. 577 Once the region for artherectomy has been identified, a second OCT pullback is performed. 579 This time during acquisition calcium detection 581 is also performed. The imaging/ablation system uses the calcium map and the target calcium nodule to align the high powered laser for artherectomy as part of software-based control 583. It also performs real time calcium detection to correct for any alignment changes between the first OCT pullback image and the current one. This is facilitated by narrowing down the search window of frames that need to be considered. In one embodiment, when the catheter tip arrives at the target calcium plaque nodule, the high powered ablation laser turns on 584 to provide short bursts of energy to vaporize and de-bulk the calcium nodule. The ablation procedure is user controlled in various embodiments to perform an artherectomy 587.

Figure 5G:
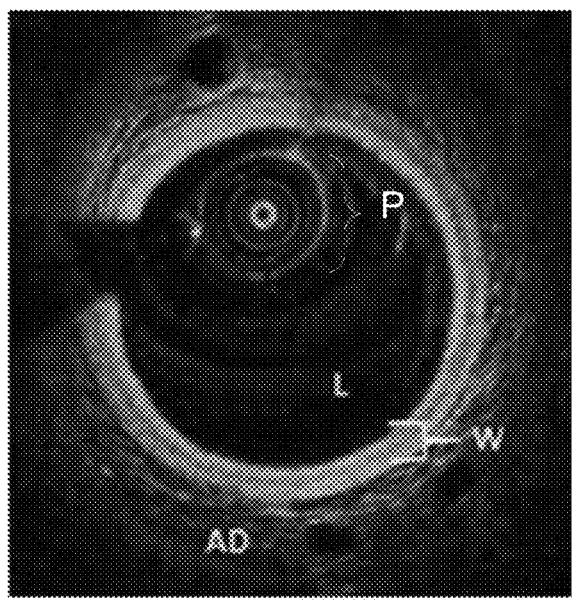
FIGS. 5G and 5H shows annotated Cartesian OCT images according to an illustrative embodiment of the disclosure.
Figure 5H:
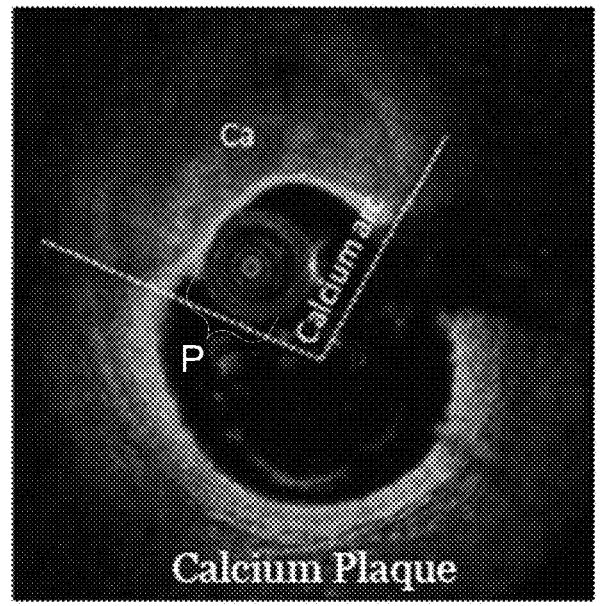

FIGS. 5G and 5H shows annotated Cartesian OCT images according to an illustrative embodiment of the disclosure. They show the position of an imaging probe P in the lumen, the vessel wall W, the adventitia AD, and details relating to a calcium plaque and calcium angle. In one embodiment, a calcium angle measurement can be detected and output using the MLS FIG. 5I shows a magnified Cartesian OCT image that identifies various layers of an artery according to an illustrative embodiment of the disclosure.

Figures 5I, 5J:
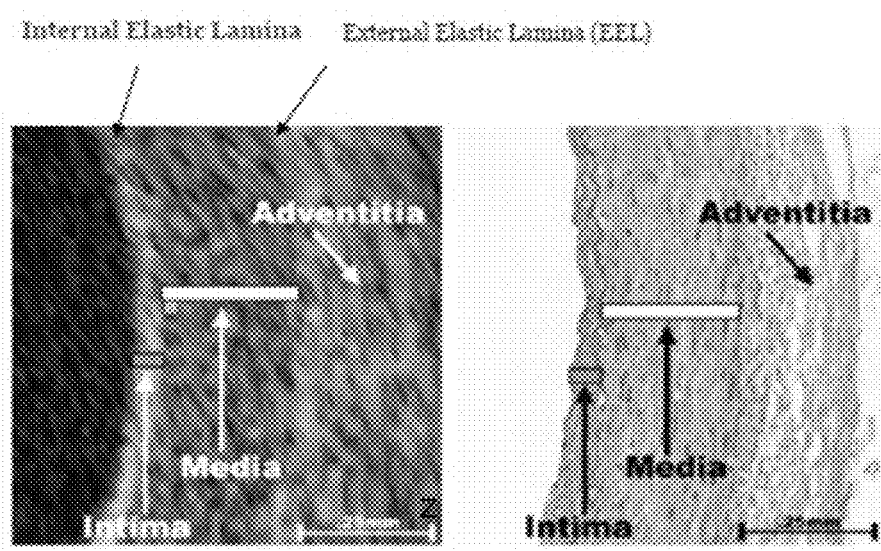
FIG. 5I shows a magnified Cartesian OCT image that identified various layers of an artery according to an illustrative embodiment of the disclosure.
FIG. 5J shows a histology image of the artery of FIG. 5C with various layers of the artery identified as part of a ground truth or training set review suitable for annotating image data for use with a given MLS embodiment according to an illustrative embodiment of the disclosure.

FIG. 5J shows a histology image of the artery of FIG. 5C with various layers of the artery identified as part of a ground truth or training set review suitable for annotating image data for use with a given MLS embodiment according to an illustrative embodiment of the disclosure. In FIGS. 5G and 5H a cross-sectional image of an artery is shown that was obtained by using an intravascular probe P shown in an in-vivo environment with respect to a blood vessel B having a vessel wall VW that defines a lumen L. The elliptical/circular reflections and shadows of the blood vessel B also includes a side branch SB.

Figure 6A:
FIGS. 6A and 6B show a Cartesian OCT image and the predictive output of an MLS that identifies the lumen, media, and a Ca plaques as well as shows an exemplary diameter measurement, respectively according to an illustrative embodiment of the disclosure.
Figure 6B:
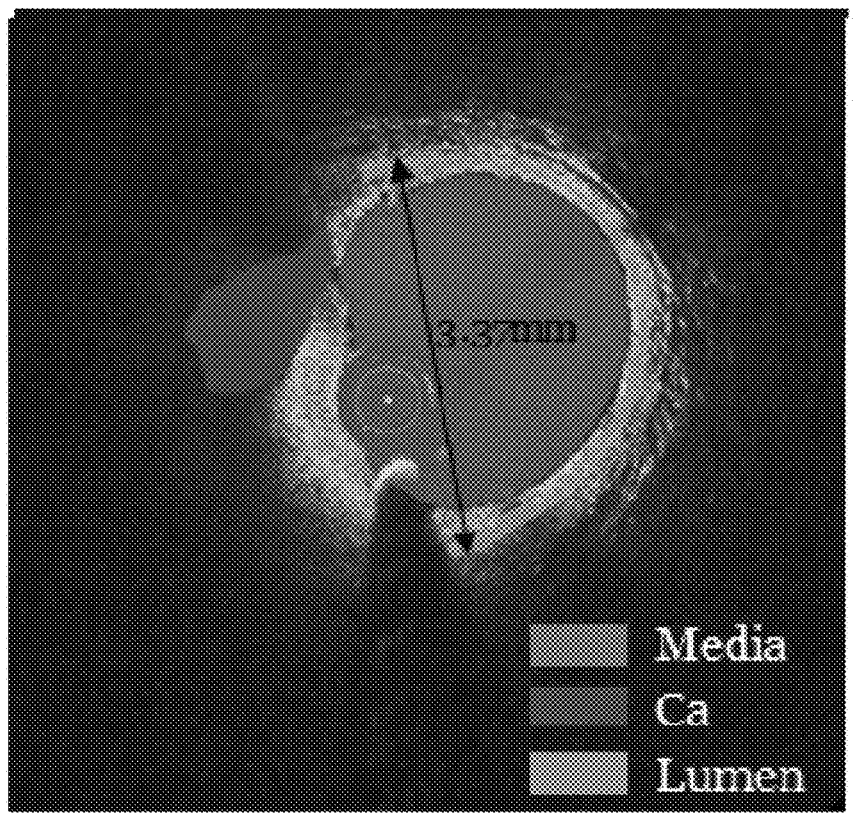
Figure 6C:
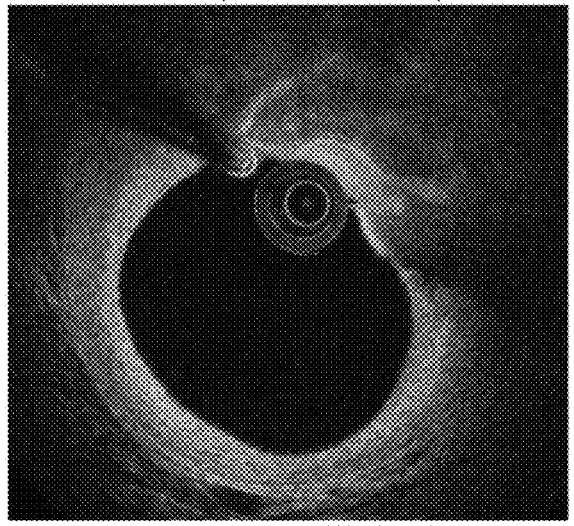
FIGS. 6C to 6F show additional OCT images, ground truth masks, and output masks indicative of tissue classification and prediction using the MLS according to an according to an illustrative embodiment of the disclosure.
Figure 6D:
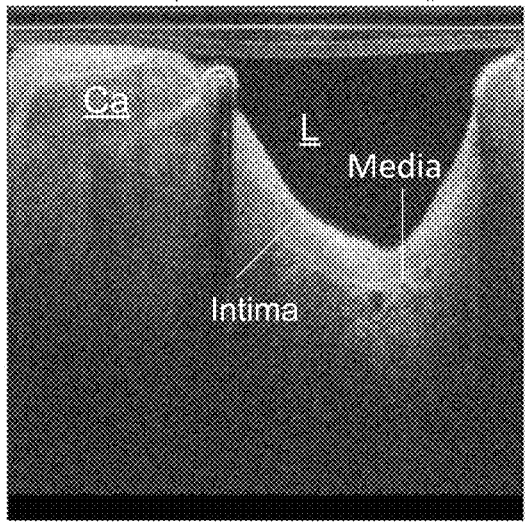
Figure 6E:
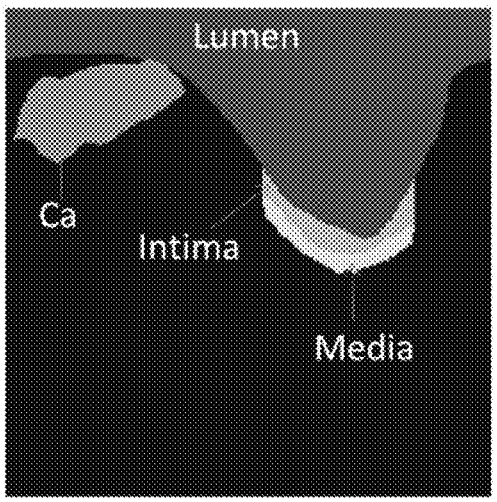
Figure 6F:
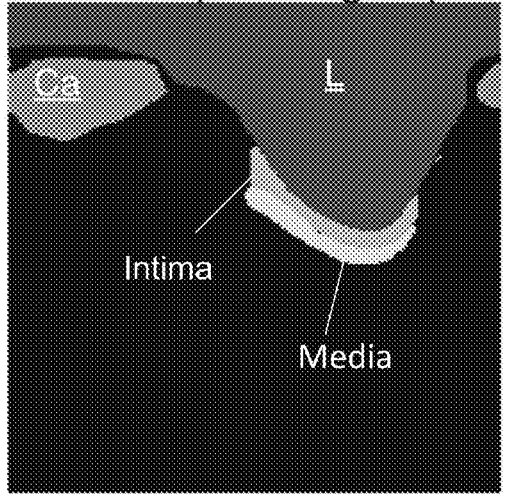

FIGS. 6A and 6B show a Cartesian OCT image and the predictive output of an MLS that identifies the lumen (blue indicia), media (green indicia), and Ca/Ca plaques (red indicia) as well as showing an exemplary diameter measurement of 3.31 mm obtained using an MLS based system with a neural network (NN) trained in accordance with one or more embodiments disclosed herein. FIGS. 6C and 6D show an original Cartesian OCT image and the polar image generated with scan lines collected using an imaging probe. FIG. 6E shows ground truth masks for Ca, lumen, intima, and media. FIG. 6F shows the predictive results that are output from a deep learning MLS of the disclosure.

Figure 7A:
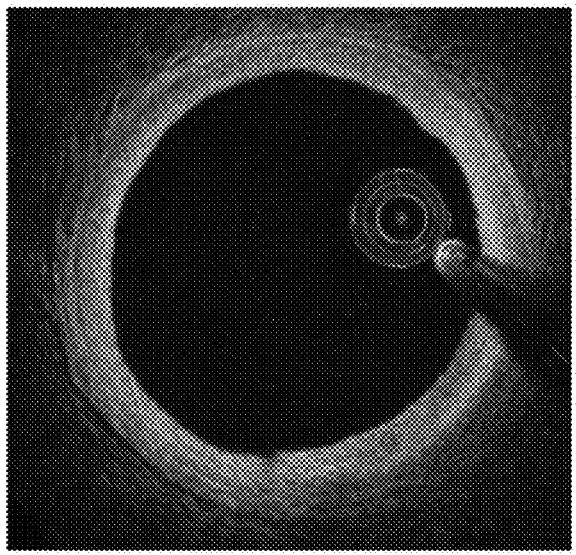
FIG. 7A shows an original exemplary OCT image in Cartesian form as obtained using a combination imaging and MLS-based system according to an illustrative embodiment of the disclosure.
Figure 7B:
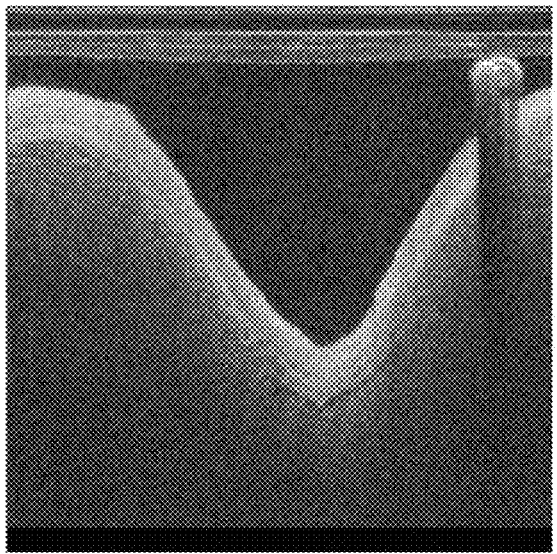
FIGS. 7B, 7C, and 7D shows the grayscale polar image, ground truth masks, and deep learning output of an MLS embodiment generated with the images of FIG. 7B as an input for annotation, training and then prediction using the trained MLS according to an illustrative embodiment of the disclosure.
Figure 7C:
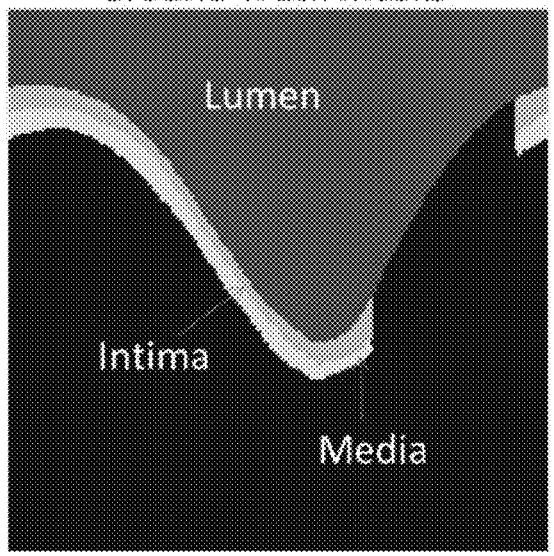
Figure 7D:
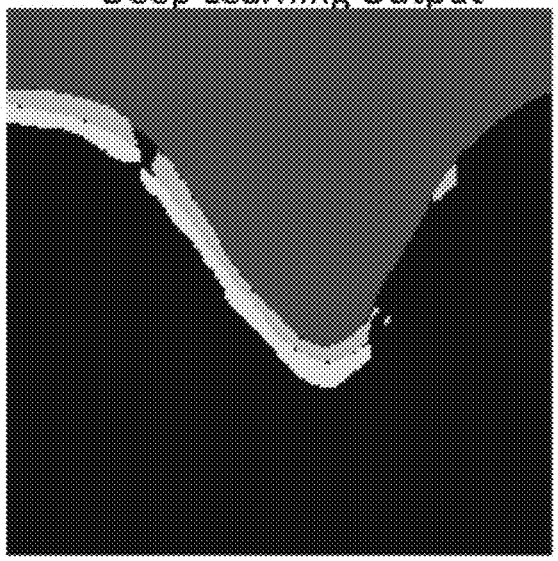

FIG. 7A shows an original exemplary OCT image in Cartesian form as obtained using a combination imaging and MLS-based system. The imaging probe is shown in the top right quarter of the image. The dark lumen region is in the middle. FIG. 7B shows a grayscale polar image corresponding to the Cartesian image of FIG. 7A. FIGS. 7C and 7D show ground truth masks, and deep learning output of an MLS embodiment generated with the images of FIG. 7B as an input for annotation, training and then prediction using the trained MLS. Each mask or detection corresponds to a channel. In part, the disclosure relates to a multichannel MLS designed for use for tissue classification using image masks corresponding to ground truths and predictive results.

In one embodiment, semantic segmentation is performed relative to multiple channels corresponding to a plurality of arterial features such as tissue types, calcium, side branch, lumen, guidewire, intima, media, calcium, fibrous, stents, stent struts, stenosis, and other arterial features. Ground truths for various features are used to train a convolutional neural network. In one embodiment, two neural networks are used, such that a first neural network is used for lumen detection and a second neural network is used to detect other arterial features after lumen detection has been performed by a second neural network. In one embodiment, either the first, the second, or both networks are convolutional neural networks. In some embodiments, lumen detection is performed relative to image data prior to detecting other features of interest, such as calcium, media, intima, and other features disclosed herein. Lumen detection may be implemented using various systems and methods including those disclosed in U.S. Pat. No. 9,138,147 entitled "Lumen morphology image reconstruction based on the scan line data of OCT," filed on Sep. 22, 2010, the details of which are incorporated by reference in their entirety.

In one implementation, a first neural network and a first image processing pipeline are used. It is advantageous to reduce patient time catheterized during an imaging session and as such, reducing the time to generate outputs from a classification system of regions/feature of interest is desirable. Accordingly, in some embodiments, a neural network is trained using frames of image data annotated with M and/or M or more types of classes of features/regions of interests. In some embodiments, M ranges from 2 to 3. In some embodiments, M ranges from 2 to 4. In some embodiments, M ranges from 2 to 5. In some embodiments, M ranges from 2 to 6. In some embodiments, M ranges from 2 to 7. In some embodiments, M ranges from 2 to 8. In some embodiments, M ranges from 2 to 9. In some embodiments, M ranges from 2 to 10. In some embodiments, M ranges from 3 to 4. In some embodiments, M ranges from 3 to 5. In one embodiment, M is 3, and the types/classes used to train the neural network are calcium, lumen, and media. The ground truth annotations/ground truth masks used to train the neural network include masks with a group of regions annotated, wherein at least three of the annotated regions on one ground truth mask include media, calcium, and lumen annotations. In various embodiments, any collections of the types and classes of features/regions of interest may include any of the types and classes disclosed herein.

In various embodiments, using an image processing pipeline along with a trained neural network supports expedited processing of image data through each of the foregoing. In addition, training a neural network to predict features/regions of interest with annotations for all possible detectable features in image results in one or more of excessive training times for network, excessive network complexity, and excessive processing times when using network to predict outcomes.

Figure 8A:
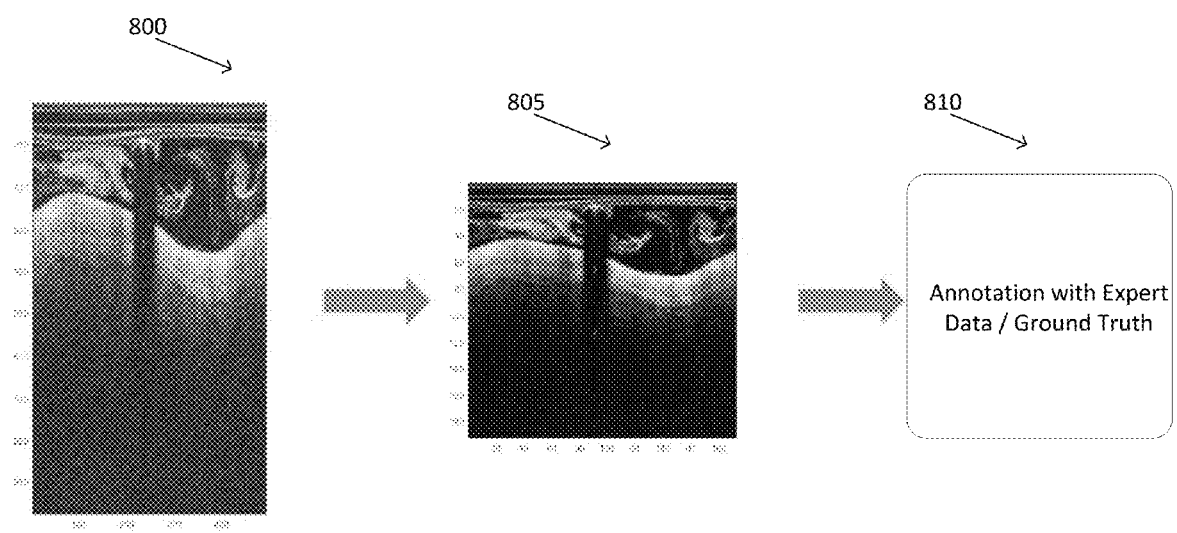
FIG. 8A shows a pre-processing operation on a polar OCT image prior to being annotated with expert data/ground truth data according to illustrative embodiments of the disclosure.

FIG. 8A shows a pre-processing operation on a polar OCT image 800 prior to being annotated with expert data/ground truth data. As shown, as part of a preprocessing step, the depth pixels that do not encode or capture useful imaging data or detectable tissue or ROIs or FOIs is effectively excluded by shrinking or constraining the depth dimension to generate the reduced, image data element 805 that can be used for iterative augmentations or direct annotation with expert truth data. In one embodiment, multiple data augmentation processes are used to transform one image or image data element into multiple versions thereof such as through circular shifts, right left flips, and other image-based transformation.

For example, if an original image is circle shifted, by multiple phases, such as 90 degrees, 180 degrees, and 270 degrees, those new versions and the original image or image data element constitute four versions. Each of these four versions can be right left flipped to yield eight versions or augmentations. In turn, each of these can be annotated with ground truth annotations 810 such as by using the user interface software depicted in FIGS. 3A and 3B, by which users may select sets of pixels, boundaries of pixel regions, and other geometric elements to annotate image data with ground truth information such as classification of calcium, lumen, sidebranch, etc. In turn, these can also be evaluated by a trained MLS to measure detection accuracy with a cost function or other metrics. Averages of the results or statistical analysis of multiple versions/augmentations can be used to improve detection accuracy.

Figure 8B:
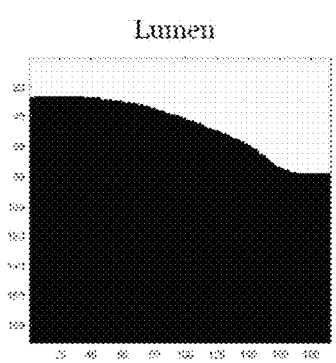
FIGS. 8B to 8D show various exemplary polar image masks for detecting lumen, media, and calcium according to illustrative embodiments of the disclosure.
Figure 8C:
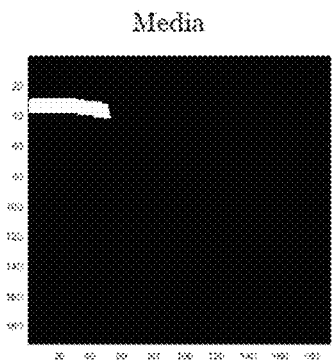
Figure 8D:
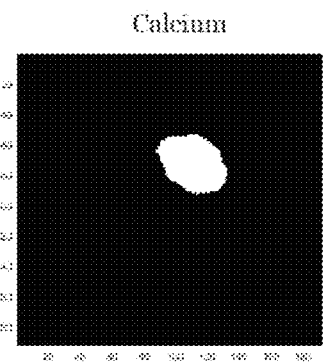

FIGS. 8B to 8D show various exemplary image masks for detecting lumen, media, and calcium according to illustrative embodiments of the disclosure. Various image masks can be used such as lumen, intima, media, calcium, fibrous, and masks for any ROI or FOI disclosed herein. The masks are binary masks in one embodiment. Further, in one embodiment, each mask can be used to reflect ground truth detections. In some embodiments, a given ground truth mask includes one or more regions that correspond to a ground truth class, such as calcium, lumen, intima, etc., and other regions of the mask that do not correspond to one or more of the classes. In one embodiment, the ground truth masks includes a first set of pixels that correspond to one or more classes and a second set of pixels that do not correspond to the one or more classes. Ground truth masks can be used to train the neural network of a given MLS, such as the neural network shown in FIGS. 1C and 2. In one embodiment, resizing and other steps such as flattening and others described herein are performed before generating augmentations or additional versions of a given raw image. A given mask can include a subset of pixels corresponding to a particular channel, wherein the channel corresponds to a feature of interest, such as calcium, intima, and others as disclosed herein. A mask can identify pixels for a given channel used for training a ground truth or as a result of using a trained MLS to operate on image data to yield an output. In one embodiment, a plurality of masks are associated with a plurality of channels on a one to one basis, and the processing of a given image assigns pixels to a given channel such as a given region of interest in a mask. In one embodiment, ground truth annotations include multiple channels of information. For example, a given ground truth annotation/mask for training the neural network includes a calcium region, a media region, and a lumen region, and an intima region.

Figure 9A:
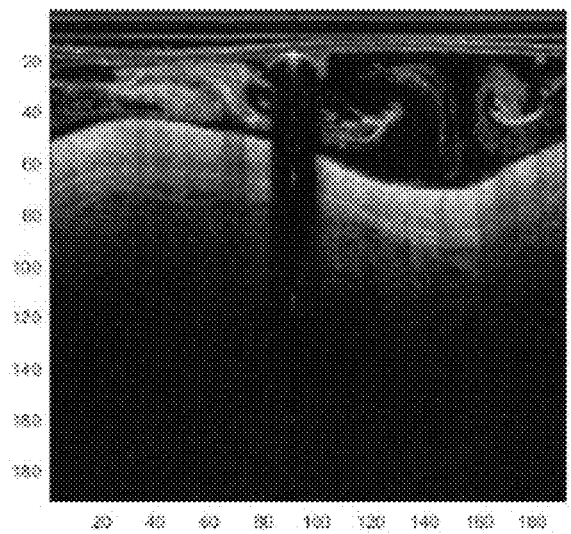
FIGS. 9A to 9C are polar OCT images showing circular shift and left right flips as applied to an original OCT polar image as part of a pre-processing step according to illustrative embodiments of the disclosure.
Figure 9B:
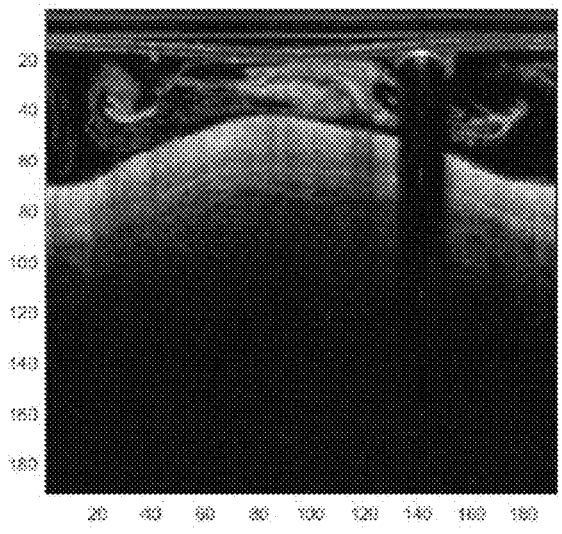
Figure 9C:
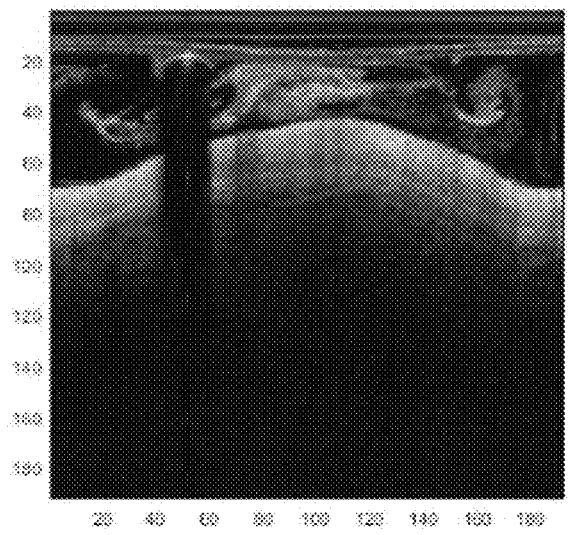

FIGS. 9A to 9C are polar OCT images showing circular shift and left flips, right flips as applied to an original OCT polar image as part of pre-processing steps performed prior to training the neural network of MLS. In FIGS. 9A to 9C various pre-processing steps are performed relative to image data, such as raw polar OCT images. The results of these processing steps or transforms is to transform one raw polar image into seven additional alterations or versions. This data augmentation process can be implemented in various ways. FIG. 9B shows a circular shift of the original image of 9A. FIG. 9C shows a left right flip of the transformed shifted Figure of 9B. A given augmentation such as this may create 8 alterations of an image for a single frame. This includes 1 original and 3 circular shifts (90 degrees each). The left right flip for each of the 4 copies yields 8 in total. These operations, additional operations, or a subset of them can be used to pre-process data for training and/or prediction using the MLS.

Figure 10B:
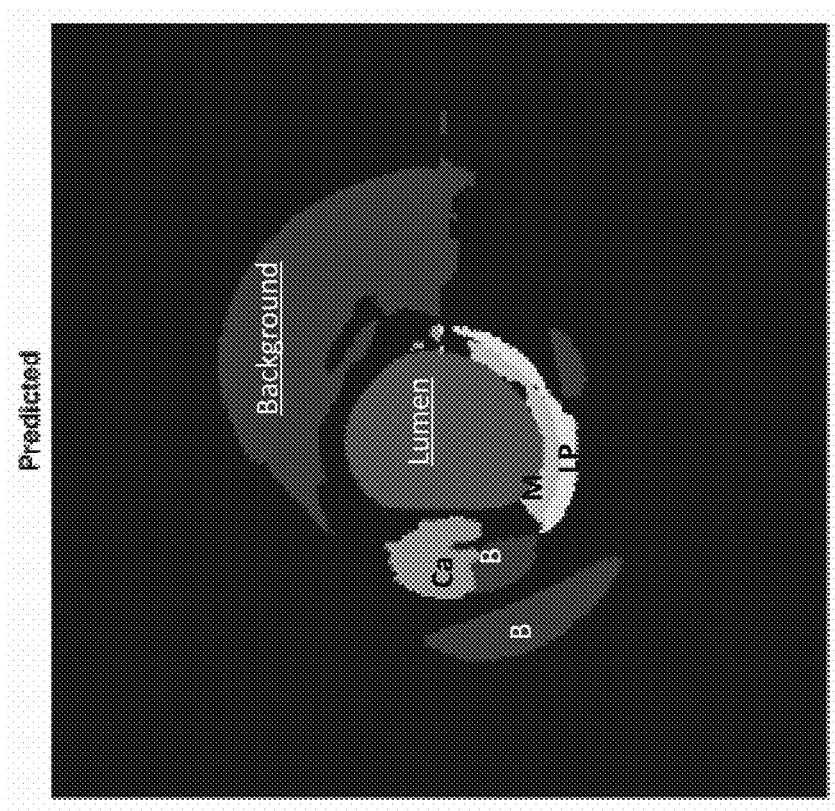
FIGS. 10A to 10B are images showing ground truth annotated images and predicted outputs according to illustrative embodiments of the disclosure.
Figure 10A:
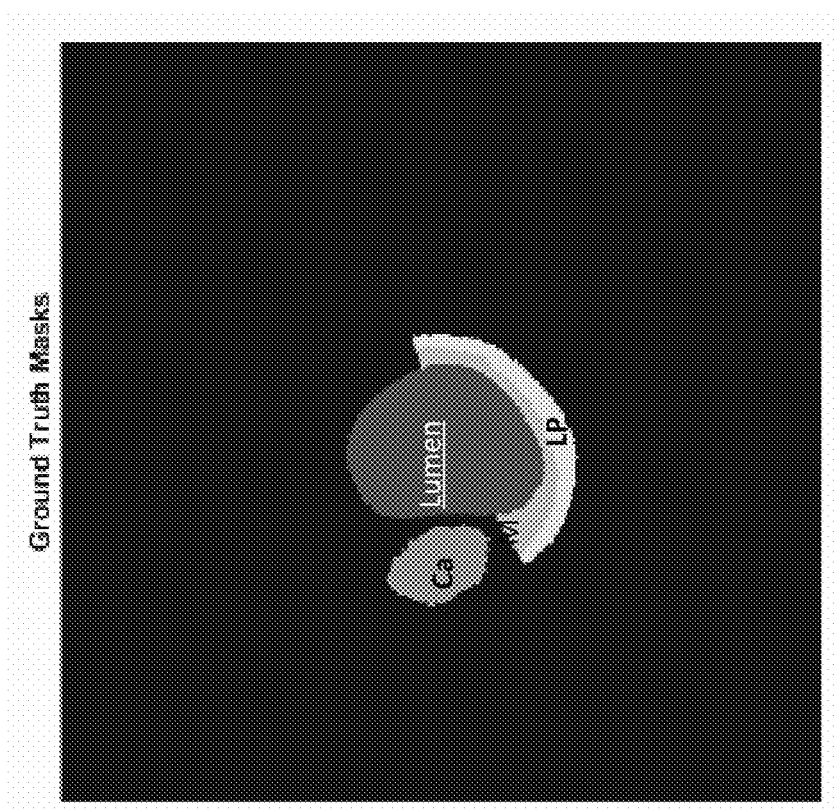

FIGS. 10A to 10B are images showing ground truth annotated images and predicted outputs, respectively. The inner blue ground truth math of FIG. 10A, is bounded by the lighter media layer. The yellow layer may be encoded as another channel or classification such as lipid LP. The orange region corresponds to calcium. In some embodiments, it is desirable to implement a penalty or constraint system to avoid "false positives". In FIG. 10B, the background channel "B" is shown. With background identified in predicted results, this can be used to effectively prevent background from being incorrectly classified as one of the other classes or types of interest. In various embodiments, channels may be established using features that correspond to imaging artifacts, background, non-uniform rotational distortion effects, and others, which can be generated using ground truth annotations. Thus, in some embodiments, the neural network may be trained to identify artifacts, imaging system errors, false positives, and other imaging phenomena for which it is desirable to screen out or prevent from being displayed in a given user interface representation of imaging data. The masks showing predicted results are displayed in FIG. 10B.

Figure 11A:
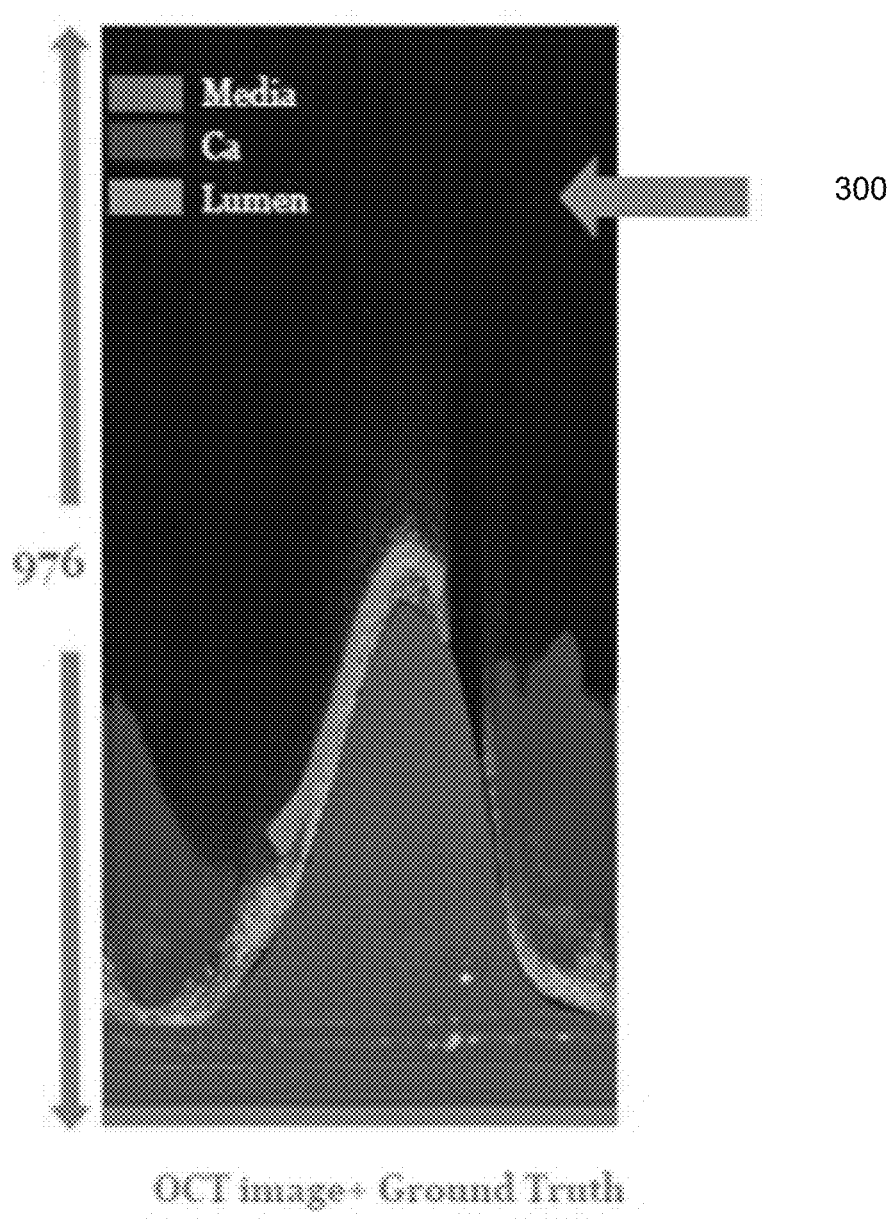
FIGS. 11A to 11D are images showing various pre-processing steps that have been developed to increase MLS processing speed to reduce patient waiting time according to illustrative embodiments of the disclosure.
Figure 11B:
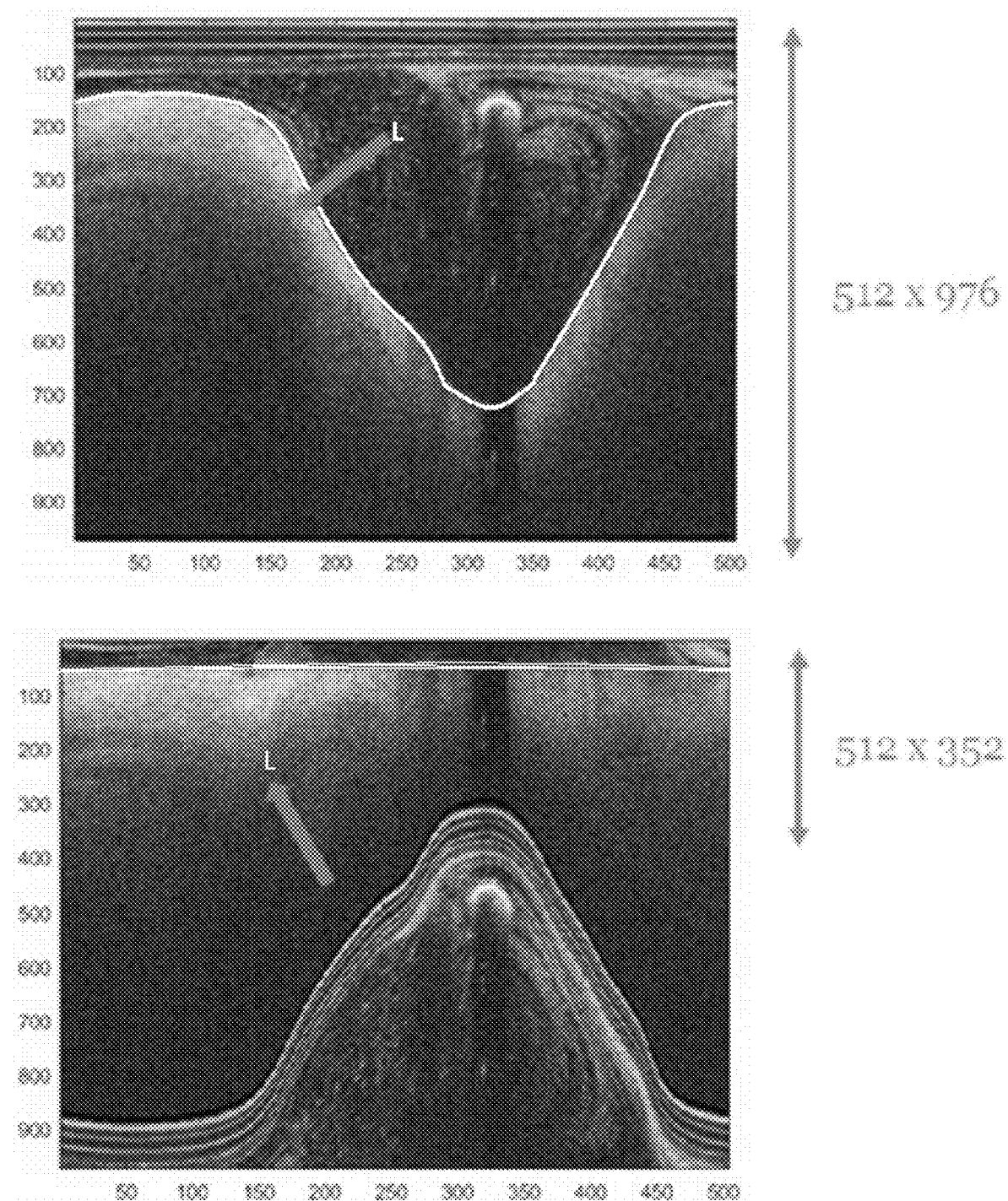
Figure 11C:
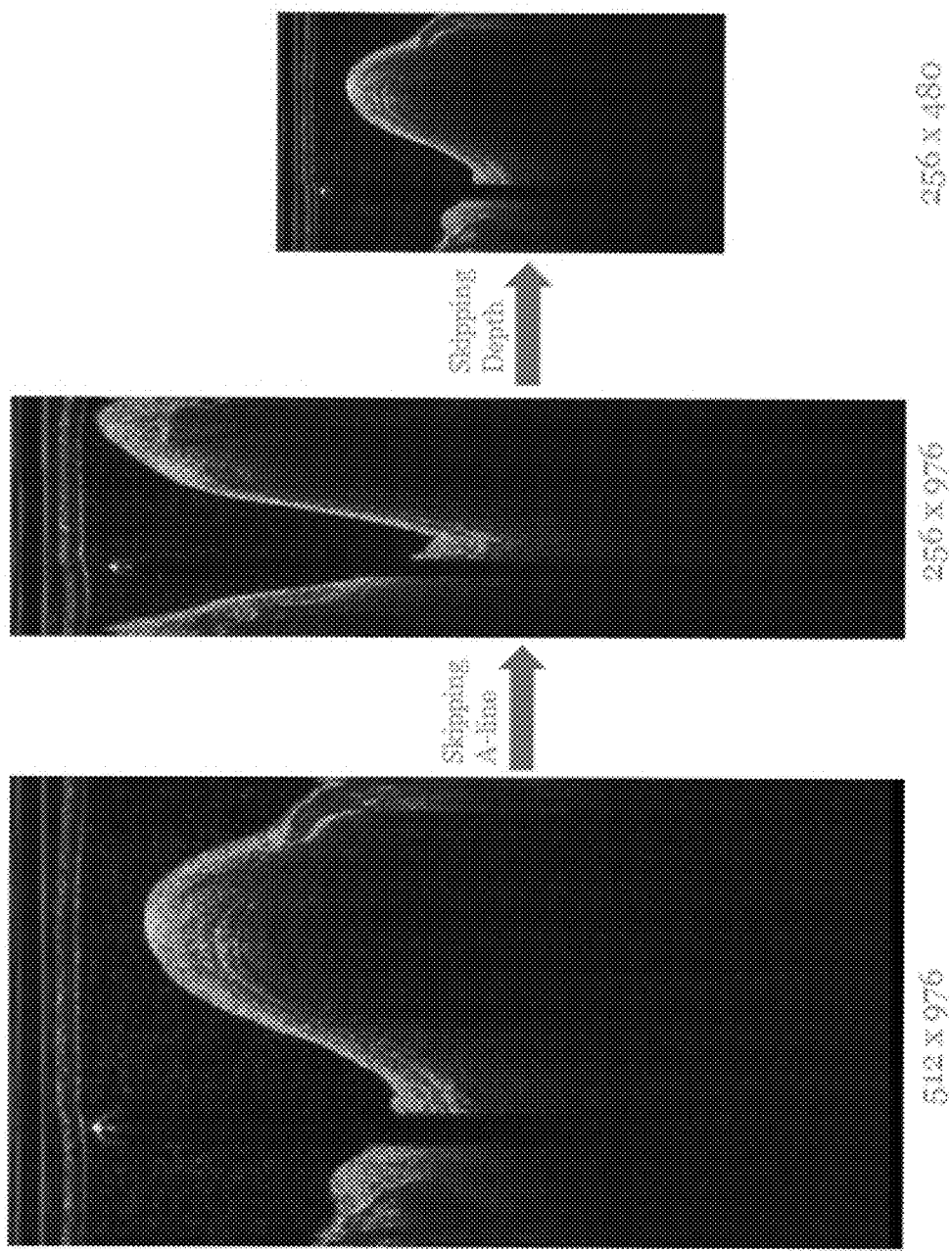
Figure 11D:
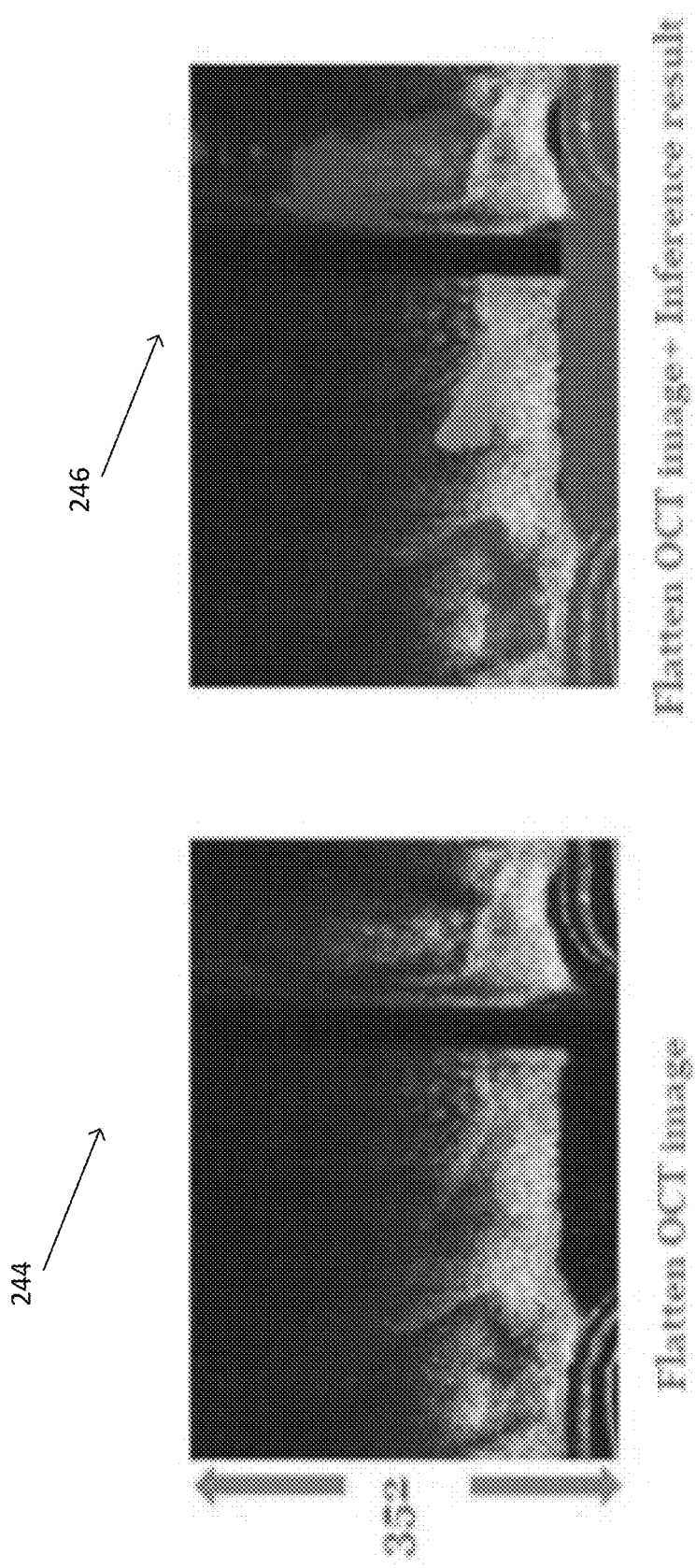

FIGS. 11A to 11D are images showing various pre-processing steps that have been developed to increase MLS processing speed to reduce patient waiting time. As shown in FIG. 11A, the OCT image with ground truth shown via the color-coded masks (green for media, red for Ca, and blue for lumen) reveals that along 976 pixels in vertical direction there are regions, such as region 300 along the depth dimension that lack useful data. The images may be flattened as shown in FIG. 11B. The white lumen contour in the middle and top regions of the polar image are flattened to an almost straight line in FIG. 11B. This flattening allows the MLS/NN to operate on a region of the image in a transformed state that is likely to contain relevant tissue data. Similarly, in FIG. 11C, a half resolution resizing is performed such as by skipping A lines (scan lines) to generate the middle image. In turn, the depth pixels in the image are skipped or excluded to further resize the image to obtain the pre-processed image on the right size of FIG. 11C. These steps improve MLS operation and can be performed in real time or substantially real time when a patient is catheterized after an OCT or IVUS image. In this way, these processes can save time and improve patient outcomes. FIG. 11D, shows a flattened OCT image 244 and the same flattened OCT image with inference or predictive results in the form of image masks showing red calcium plaque regions, blue lumen regions, and green media regions. Flattening may be performed as preprocessing step in some embodiments. This polar image can be converted to Cartesian form and displayed to an end user in view that would resemble the Cartesian image of FIG. 6B.

Figure 12A:
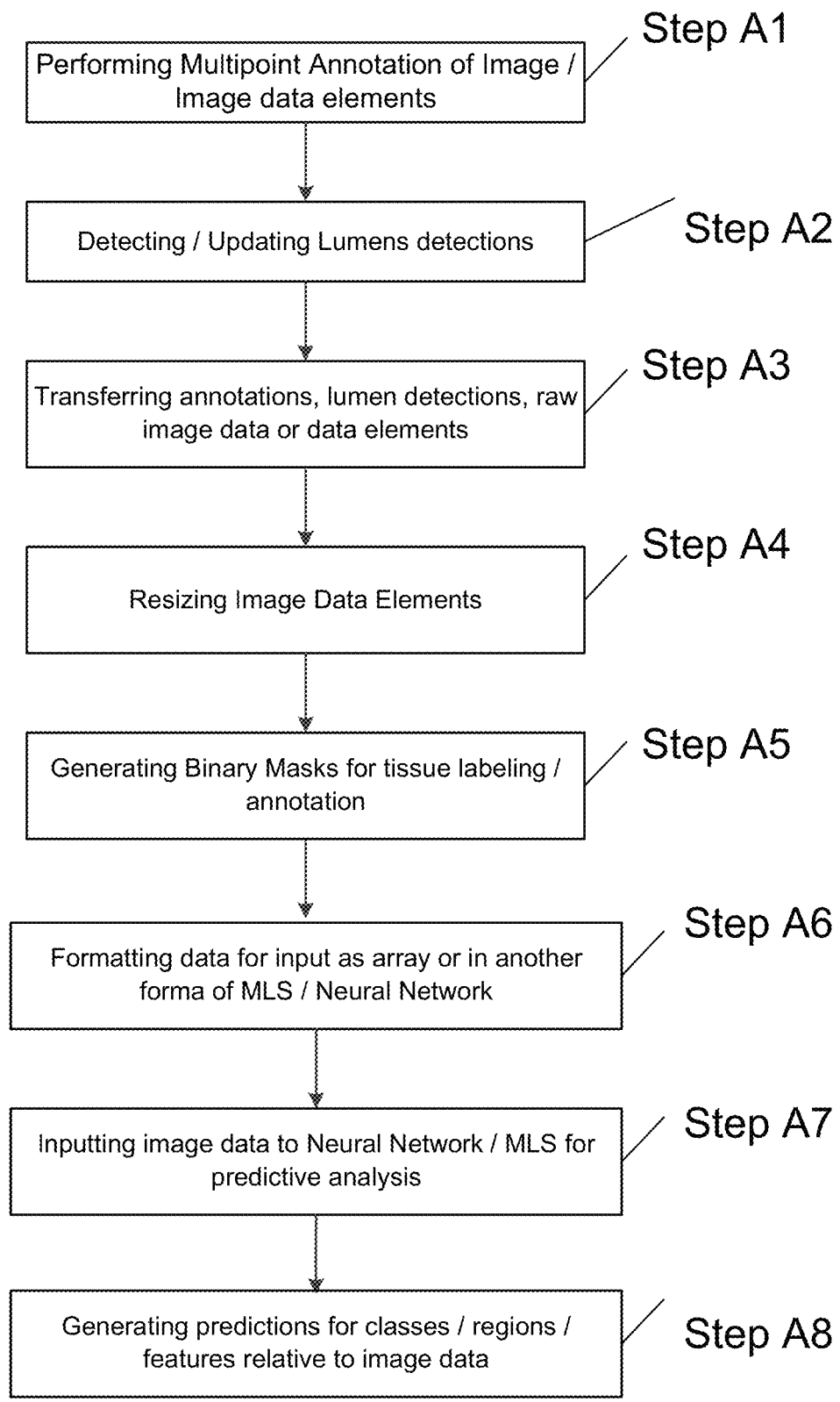
FIGS. 12A and 12B are flow charts of exemplary processing steps by which raw image data is routed and processed along with annotations with ground truth data according to illustrative embodiments of the disclosure.
Figure 12B:
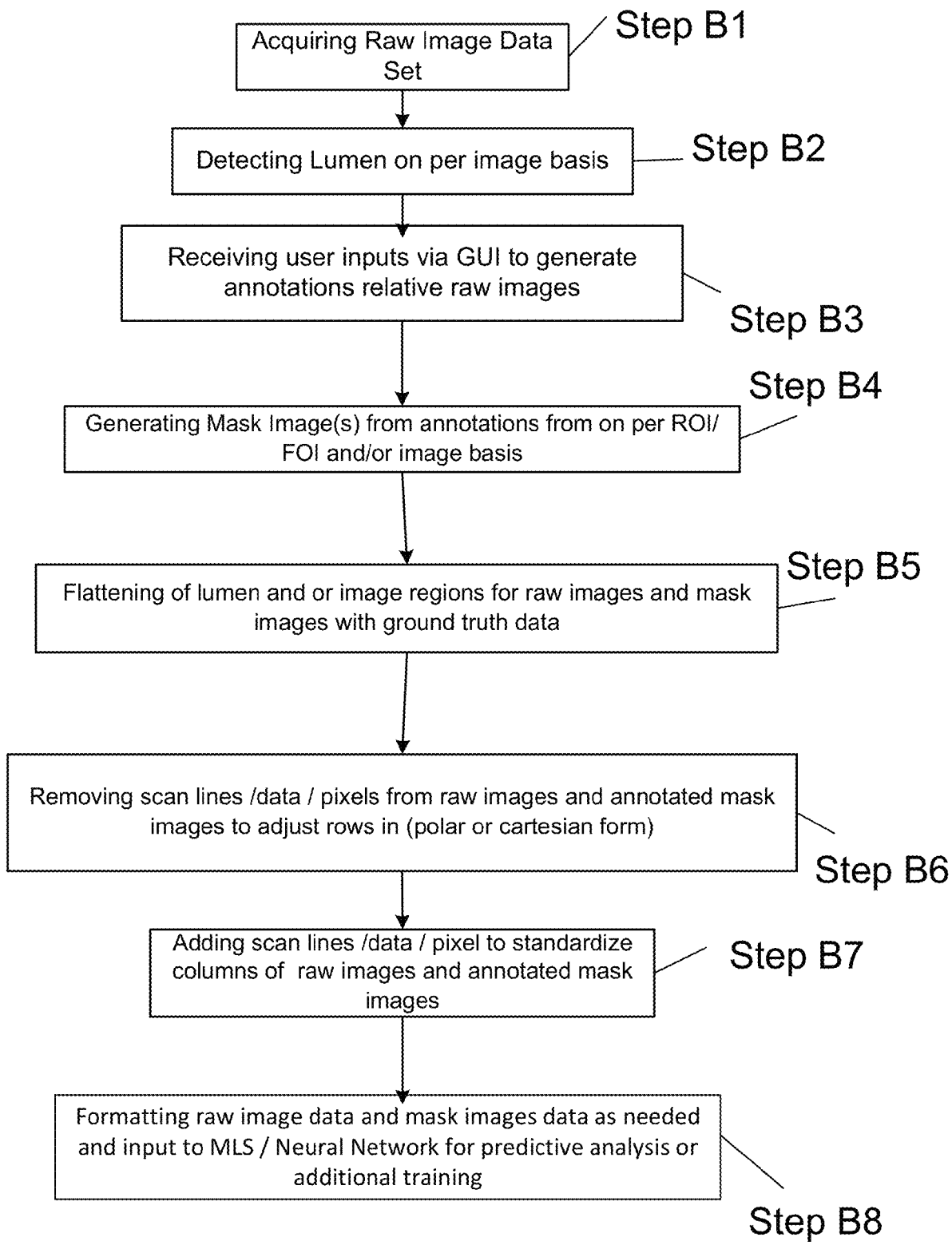

FIGS. 12A and 12B are flow charts of exemplary processing steps by which raw image data is routed and processed along with annotations with ground truth data. In FIG. 12A, one or more of steps A1 to A8 may be performed using one or more computing device based systems disclosed herein. As shown, in FIG. 12A, according to one embodiment, the systems and methods may perform one or more of the following. The imaging system and/or MLS via a computing device or AIP may perform multipoint annotation of image data or image data elements. The annotation GUI facilitates placing and connecting points to define boundary that can be converted to image masks that effectively label a given tissue type in an image. The method may include detecting/updating lumen detections such as a lumen boundary or contour. The method may include transferring annotations, lumen detections, raw image data or data elements from one system, such as the imaging system, to interface or intermediate system that provides inputs to MLS/neural network. In one embodiment, resizing image data elements is performed to remove non-useful image data to improve processing time. In one embodiment, the method includes generating binary masks for tissue labeling/annotation. Further, the data may be formatted for input as array or in another format. Finally, the input data, which can include image mask and resized raw image data or data elements, is input to the MLS/NN for processing such as training or prediction.

FIG. 12B is another embodiment and includes various steps which can be performed by the various systems disclosed herein. In FIG. 12B, one or more of steps A1 to A8 may be performed using one or more computing device based systems disclosed herein. The steps may include one or more of the following. One or more system components, such as an imaging systems (OCT, IVUS, x-ray, Anglo, etc.) acquires raw image data set. Various pre-processing steps can be performed. Flattening of lumen and or image regions for raw images and mask images with ground truth data may be performed. In one embodiment, every other scan line is removed. In one embodiment, lumen contour or border is flattened to emphasize meaningful ROI/FOI data such as shown in FIGS. 11B and 11D. In other embodiments, images may be circle shift, right left flipped, or transformed in different ways. This can increase entries in a given training set or create different versions for MLS/NN to operate on such that results of ML can be monitored and tested.

Clipping, skipping, or remove scan lines/data/pixels from raw images and annotated mask images to adjust rows in (polar or Cartesian form) may be performed. For example, as shown in FIG. 11A, pixels corresponding to depth in vertical axis can be removed to resize image as shown in FIGS. 11B and 11C. In addition, it may be useful to add scan lines/data/pixel to standardize columns of raw images and annotated mask images for MLS/NN processing. The method may include formatting raw image data and mask images data as needed and input to MLS/neural network for predictive analysis or additional training FIGS. 13A and 13B show exemplary user interfaces for diagnostic tools to support stent planning through virtual stenting that incorporate tissue classification. These user interfaces help depict MLS analysis that can identify the most significant lesion based on physiology and or the shortest stent that provides maximal flow recovery. In one embodiment, as shown by the white stent regions formed from half circles (VS) can be positioned relative to lumen representations to perform interactive virtual stenting. Interactive virtual stenting allows the stent to be tailored to the lesion. The user can get predicted VFR values and the current VFR values. The MLA view in the bottom panel, that shows percent diameter stenosis, and the minimum lumen area, also shows VFRp and VFR values that change based on stenosis and/or virtual stent selection. The angiography image shows in the top right panel is co-registered with the Cartesian or polar views or longitudinal views of the artery in the other panels. In FIG. 13B, the predictive VFRp and the current VFR are shown relative to a virtual stent VS and a Cartesian arterial image that has been masked or characterized with various indicia corresponding to lumen, calcium plagues and media ROIs/FOIs.

The methods and systems disclosed herewith provide diagnostic and planning tools for a user. For example, the methods and systems include tools such that placement of virtual stents in an artery can be performed automatically relative to image data from a pullback. Additional details to such diagnostic graphic user interface based tool can be seen in FIGS. 13A and 13B. Exemplary user interfaces from a combination imaging and machine learning system suitable for such diagnostic planning is shown in FIGS. 13A and 13B. Further, the automatic placements of such stents include processes, user interface, and related software-based features to display such stents at optimal locations and with the size of a suitable stent identified for an end user.

The disclosure includes various implementations of stent planning software to place a stent at an optimal location or otherwise at a location that optimizes certain parameters. In one embodiment, the parameters optimized to facilitate stent planning include the amount of flow, which can be achieved by deploying a stent of a particular length. The proximal and distal landing zone locations for the stent and the size of the stent are provided to an end user. These are determined by optimizing the improvement in flow that can be achieved using a set of possible stents and stent deployment locations.

In one embodiment training data is created using ground truth expert guidance or guidance from a MLS such as for lumen detection. The training data is separated into masks.

In one embodiment, the mask is one or more individual channels. Those are used to train the training set. When the training set is run through the neural network each one of those channels is basically going to contribute to different weights and filters of the network. In this way, the NN adapts and changes in response to masks/training data. In turn, when patient sample data is input into a trained network, the raw image data is tagged or labeled with different channels and call those channels corresponds to different features used in the training set such as images of lumen, intima, intima, media, adventitia, lumen, EEL, IEL, plaque, calcium, calcium plaques, stent, calcium, guidewires, etc.

In general, the MLS systems disclosed herein related to a multi-channel segmentation process wherein each tissue type, region of interest, arterial layer, etc. is processed as a separate data channel with its own image masks for generating training sets and predictive outputs.

As one exemplary approach to evaluating flow restoration as a result of stent deployment, the methods described in U.S. patent application Ser. No. 14/115,527 entitled "METHOD AND APPARATUS FOR AUTOMATED DETERMINATION OF A LUMEN CONTOUR OF A STENTED BLOOD VESSEL," the contents of which are incorporated by reference herein in their entirety, can be used. Other approaches can be used, including as otherwise as recited herein. To understand some aspects relative to flow changes and behaviors in an artery, it is informative to consider the features shown in FIGS. 13A and 13B which show a stenosis and various features relating to the selection and position of virtual stents based on identified landing zones and stent length(s).

In various aspects, the disclosure relates to the training of one or more of a machine learning system, a neural network, and a convolutional neural network using polar images of coronary arteries. In various aspects the disclosure relates to the training of one or more of a machine learning system, a neural network, and a convolutional neural network using ground truth annotations made to polar images of coronary arteries. In various aspects the disclosure relates to the training of one or more of a machine learning system, a neural network, and a convolutional neural network using ground truth annotations made to polar images of coronary arteries in which various tissue types and features of interest are annotated in a training set.

In various aspects the disclosure relates to the training of one or more of a machine learning system, a neural network, and a convolutional neural network using ground truth annotations made to Cartesian or non-polar images of coronary arteries in which various tissue types and features/regions of interest are annotated in a training set. In various aspects the disclosure relates to using a trained a machine learning system, a neural network, and/or a convolutional neural network, and combinations thereof, to classify/characterize input patient data, in polar or non-polar or Cartesian form to identify various tissue types and features/regions of interest using ground truth annotations made to polar images of coronary arteries in which various tissue types and features of interest are annotated in a training set.

The disclosure relates to using ground truth tissue types and features/regions of interest and classifying, identifying, and or characterizing various tissue types and features/regions of interest in patient image data and image data elements. In various embodiments, aspects, and for one or more MLS embodiments, the tissue types and features of interest (FOI)/regions of interest (ROI) may include one or more of the Cartesian, polar, non-polar images of or images of portions of: coronary arteries, a coronary artery, OCT image, IVUS images, x-ray images, ultrasound images, angiography images, graphs or plots of artery trees, side branches, lumen, guidewire, stents, jailed stents, Bioresorbable Vascular Scaffold (BVS), drug eluting stents (DES), fibrous, blooming artifacts, pressure wires, lipids, calcium, atherosclerotic plaques, stenosis, plaques, calcium, calcified plaques, calcium containing tissue, lesions, fat, malapposed stents; underinflated stents; over inflated stents; radio opaque markers; branching angles of arterial trees; calibration elements such as PET doped films; sheaths; doped sheaths; fiducial registration points, diameter changes of artery; radial changes to artery; flow measurements obtained using imaging data; FFR values for images; and branching models; combinations of the foregoing and classification or types of the foregoing.

In one embodiment, the probe includes a probe tip which includes or is in optical communication with an optical fiber. The optical fiber and the tip of the probe are disposed within one or more sheaths such as catheter sheath. The probe tip can include various elements such as an angled beam director or a lens cap as well as transducers for other imaging modalities. The optical fiber of the probe 407 can also include a torque wire disposed around the fiber. The probe transmits light, in the lumen L and receives light scattered from the vessel wall VW.

In one embodiment, the optical fiber is a portion of a sample arm of an interferometer. A data collection probe 407, such as an OCT probe, can be used to collect depth information suitable for imaging a sample such as a blood vessel. For example, a set of frames of image data, such as polar or Cartesian images shown in 3D, respectively. Figures are generated based upon optical signals sent and received by such a probe 407. A cross-sectional image of blood vessel is formed by a collection of scan lines as the probe rotates (see Cartesian images shown in 3D, 3E, 6A, 6B. The cross-sectional image, such as images 6A, 6B is a Cartesian image. FIGS. 7B and 8A show examples of polar views or polar form of medical images. Cartesian images and polar images can be referred to frames in various embodiments.

An OCT image, such as the cross-sectional images of FIGS. 3B, 3C, and 3D are typically acquired one scan line at a time. A sequence of samples along a ray originating at the catheter center to the maximum imaging depth is referred to as a scan line in one embodiment. In one embodiment, the smallest data unit in an OCT image is called a sample. A sequence of samples along a ray originating at the probe center to the maximum imaging depth is called a scan line. An OCT image is typically acquired one scan line at a time. A cross-sectional image can be formed from a set of scan lines collected as the probe rotates. Further, to image a segment of an artery or other vessel, the catheter is moved longitudinally while rotating. In this way, the probe acquires a set of cross-sectional images in a spiral pattern. The images originate from the various scan lines associated with a slice of the vessel or artery of interest. The scan lines are arranged with angles between them like spokes on a wheel. Scan lines are acquired in a polar format in one embodiment.

User Interface Features Relating to Mapping of Tissue Features

In part, the disclosure is directed to medical diagnostic systems including image navigation, user interface design, time saving enhancements and other design considerations. The foregoing features are the disclosure were developed improve upon the problem of time and information management during time critical medical procedures such as those performed in the cath lab. This disclosure describes the way that converting results of tissue characterization into tissue map display. Tissue characterization can be performed using various techniques including pathology studies, artificial intelligence techniques, machine learning techniques, attenuation and backscattering based techniques, and image processing detection and enhancement techniques and others as may exist, be in development, or be developed.

The tissue map embodiments disclosed herein provides a user interface that enhances viewing of image data that includes various characterized tissues and the boundaries and relative arrangement thereof with regard to one or more portions of a subject such as an artery, blood vessel, or other body lumen. Physicians, researches, technicians, and other end users can reach planning decisions and make informed decisions based upon diagnostic information more quickly and with a more informed context than would otherwise be possible given a set of images with tissue characterized regions.

Figure 16:
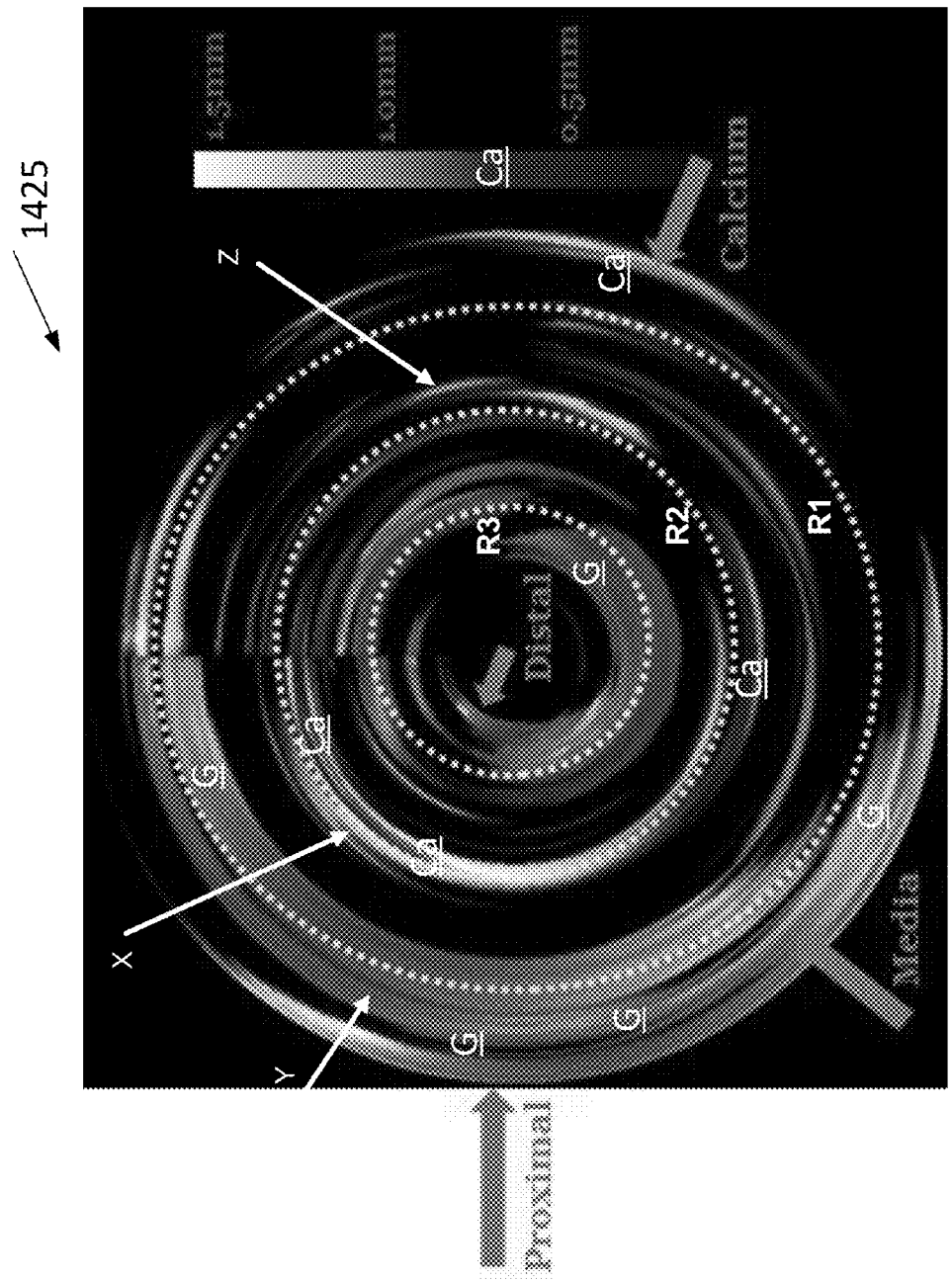
FIGS. 16-18 show various tissue map representations generated using an OCT imaging pullback of an artery with various indicia integrated into a user interface displaying the various tissue maps to support diagnosis and treatment plans such as stenting and artherectomy according to illustrative embodiments of the disclosure.
Figure 17:
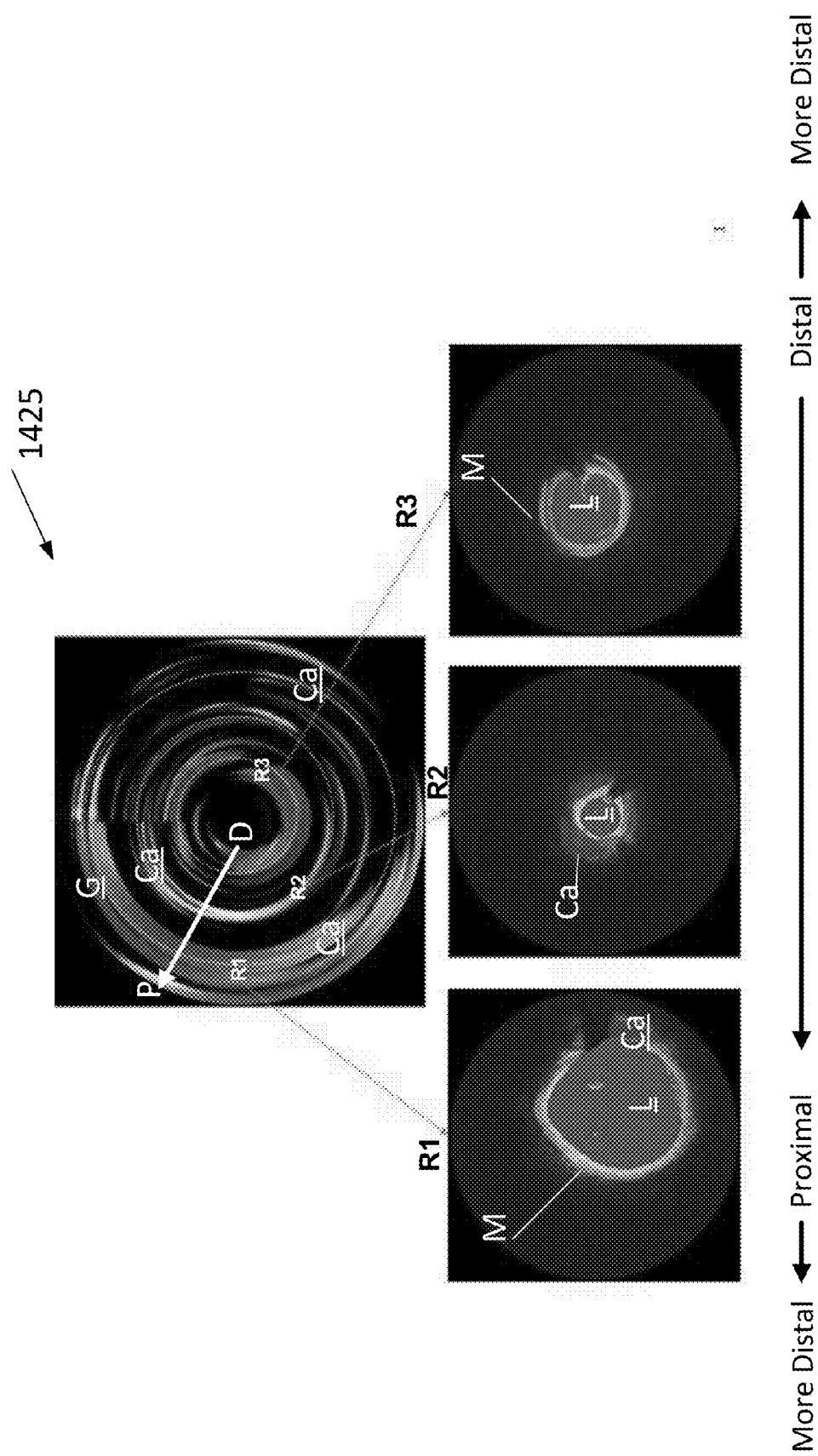
Figure 18:
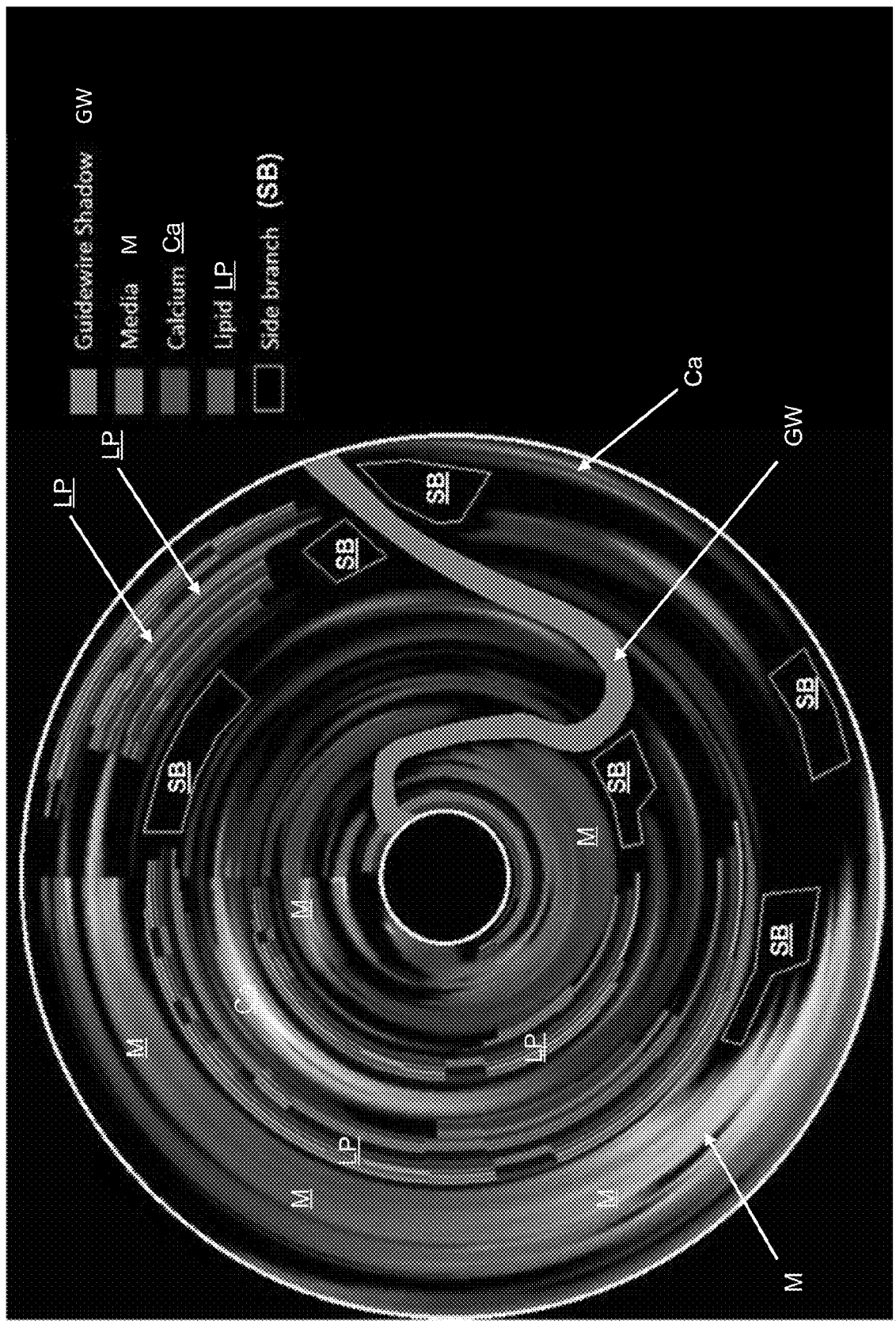

Tissue characterization generally includes one or more methods to determine the type of tissue or other tissue properties for a given set of patient tissues. Thus, if an artery is imaged, and multiple images form the set of image data, the tissues in each image can be characterized to determine whether they are of a particular type such as fat, muscle, at a high level and also at a more granular level such as calcified, intima, EEL, and other types as disclosed herein or that otherwise exist in subjects being imaged. Typically, one or more detection processes are used to detect the type of tissue at issue in a region of an image. Calcium plaque mask and media mask are available for a set of image frames after machine learning inference process or another detection process, such as an image processing pipeline-based process detect calcium and media in image data. The ring like structure may be obtained by projecting each mask along A-line as discussed above with regard to FIG. 2A. FIGS. 16-18 show various tissue map representations generated using an OCT imaging pullback of an artery with various indicia integrated into a user interface displaying the various tissue maps to support diagnosis and treatment plans such as stenting and artherectomy according to illustrative embodiments of the disclosure.

Figure 14:
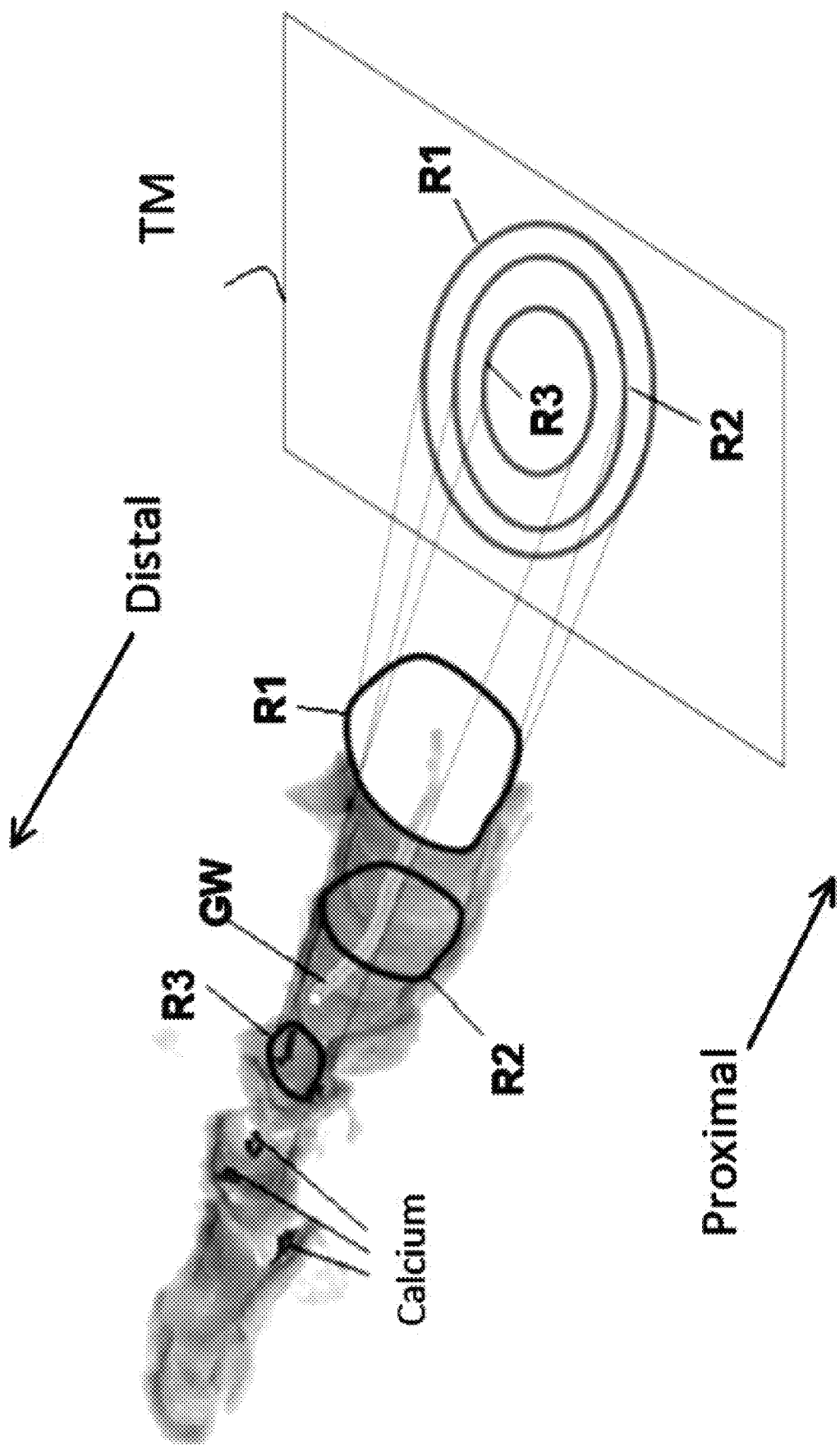
FIG. 14 shows a representation of an artery that includes various cut planes our boundaries from an OCT scan of a subject's artery and generation of a tissue map using the various sets of image data obtained during the pullback according to illustrative embodiments of the disclosure.
Figure 15:
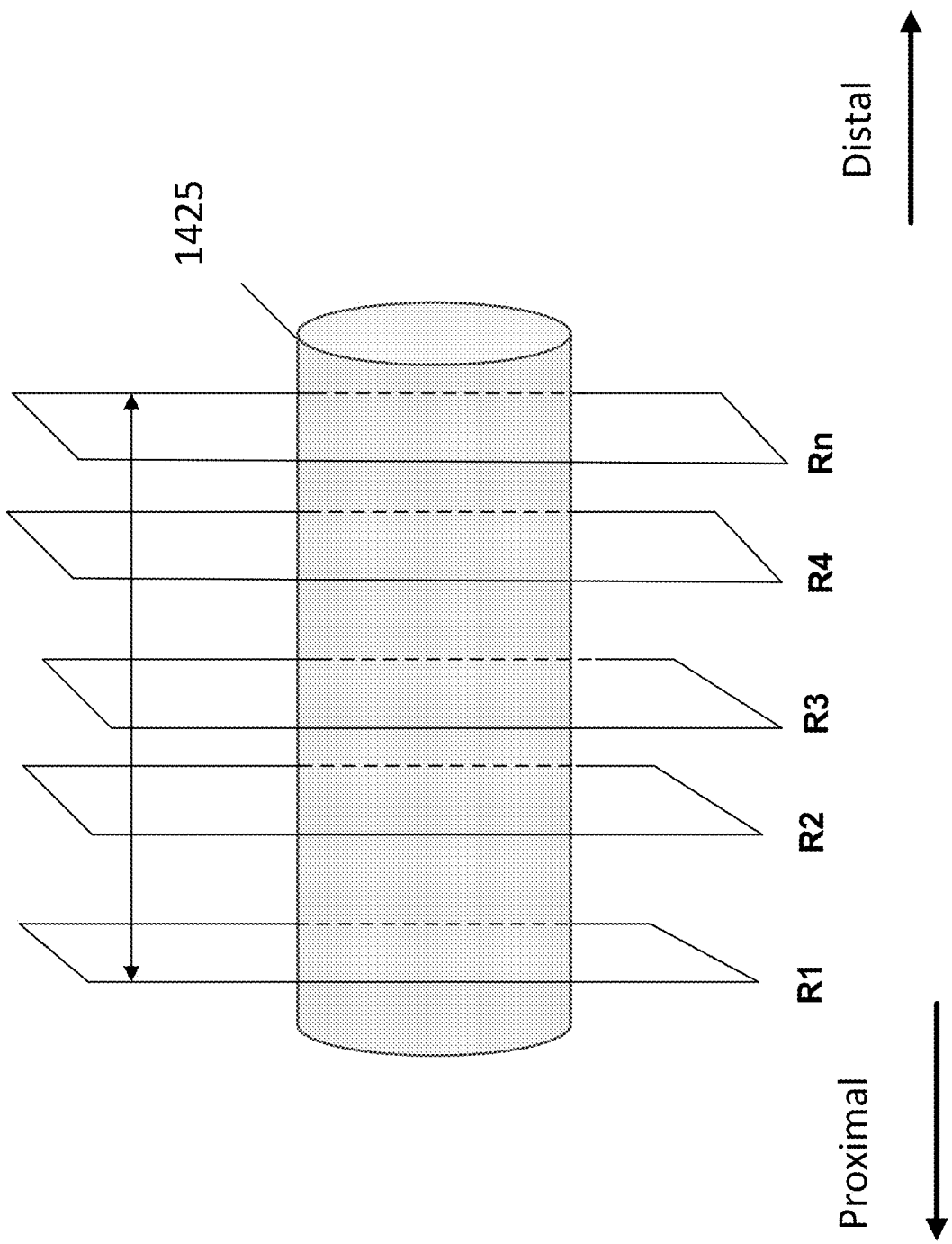
FIG. 15 is a schematic representation of an artery obtained using one or more imaging modalities and various cut planes suitable for generating a tissue map according to an illustrative embodiment of the disclosure.

In FIGS. 14, 15, 16, 17, and 18 each ring on the plane indicate one frame of tissue characterization result from 3D pullback OCT data. In FIG. 14, a three-dimensional representation of an artery 1405 is shown with a guidewire GW, regions of calcium that have been detected using a MLS or another approach and three cross-sectional boundaries R1, R2, and R3 as shown these boundaries or rings are projected into a plane to generate a tissue map TM. Another version of a tissue map is also shown in FIG. 2A and in FIGS. 16 and 17. FIG. 15 shows a schematic representation of various cut planes/rings/boundaries R1 to Rn that are shown along a 3D artery representation 1425 extending in the proximal and distal direction. In one embodiment, imaging data, such as OCT, IVUS, x-ray, or other imaging modalities may be used to generate such a 3D representation of an arty 1425.

Intravascular optical coherence tomography (OCT) images provide high-resolution visualization of coronary artery morphology. In part, the disclosure relates to the automatic detection and/or classification of intracoronary plaques (calcium, lipid, fibrosis, and thrombus). Inner and outer calcified boundaries are also detected and displayed in one embodiment. The process of detection and classification can enhance the interpretation of OCT images and provide targeted information to diagnosticians. In part, the disclosure relates to systems and methods for displaying the results of data analysis applied to an intravascular data set to the user in a way that is clear, easy to interpret, and conducive to diagnosing a subject such as a tissue map TM and those examples shown in FIGS. 14-18.

In part, this disclosure describes a graphic user interface (GUI) that provides user interface and graphic data representations that can be that generate an overall tissue map from a set of imaging data for a given artery or another body lumen (intestine, esophagus, etc.) The tissue map is responsive to user selections such as user selections of a particular region of the tissue map. In response to a user clicking on or otherwise selecting a tissue map region, the user interface software modules of the applicable imaging system can redirect the information displayed to the user such that the underlying images or frames of image data specific to the use selection can be displayed.

In this way, rather than scrolling through a long series of images or frames of image data, a tissue map is presented to a user. The interaction and selections relative to the tissue map reduces diagnosis and analysis by expeditiously directing an end user to regions of interest such as calcium plaques or lipids in artery. In turn, this can expedite stent planning while a patient is catheterized on a table and while blood flow has been temporarily stopped to image a section of a vessel. In this way, faster decisions can be made to improve patient outcomes. Selecting stent landing zones is also enhanced by avoiding calcified regions in which proper stent expansion is limited by the presence of calcium or another undesirable arterial state. Favorable and unfavorable regions of an artery can be flagged as suitable or unsuitable for stent landing zones using colors, graphics, visual cues, or other indicia or user interface features such as animations or other cues.

In part, the disclosure relates to a data collection system such as an intravascular data collection system suitable for use in cath lab such as an optical coherence tomography system. In part, the disclosure relates to a data collection system that includes a processor suitable for displaying intravascular image data. The image data displayed includes data or images generated based upon depth measurements. In one embodiment, the image data is generated using optical coherence tomography. The system can also display a user interface for display of intravascular information such as data relating to intravascular plaques.

In part, the diagnostic systems, methods, navigational tools, and tissue maps and related features disclosed herein provide improvements in the form of better tools to interpret and make decisions based on plaque composition, lesion properties, tissue types, and related tissue information and blood vessel information after one or more tissue characterization processes and image data detection and analysis software modules have operated. The tissue map interfaces and organized characterized tissue data from the underlying image data obtained during a scan of a given subject demonstrate various improved image views. For example, in the context of OCT and other intravascular imaging modalities a given tissue map can provide a volumetric view of a full imaging probe pullback in single image.

In this instances, the imaging probe is pulled back through the vessel as it rotates to obtaining the imaging data. An end user can use a given tissue map to quickly realize the arc extend and thickness of calcium plagues and healthy landing zone for stent implantation. Further, other details relating to tissue types can be assessed. In addition, to the extent a given tissue map reveals excessive amounts of calcium or other undesirable tissue states, this information can facilitate an end user electing an alternative treatment option such as a bypass or artherectomy. A given tissue map can be generated using different methods. A given method can vary based upon the source of the image data obtained from scanning a patient with an imaging system.

At Pre-intervention assessment stage, physician could access plaque composition. As show in FIG. 16, the tissue map display 1425, pixels having a green color G indicate the area where media has been detected in tissue characterization, while red color indicate the presence of calcium plaque Ca. The colors referenced in a given tissue map user interface may vary and may be replaced by hatching in some instances or by using other indicia.

The dotted lines in the tissue map are shown to provide a reference to rings in R1, R2, and R3 in FIG. 14 along the length of the artery representation. In one embodiment, a given tissue map may show the extent of calcium plaque. The intensity value corresponds to the thickness of calcium plaque in millimeters as shown by legend that ranges from about 0.5 mm to about 1.5 mm Any classes or types for ROIs/FOIs detected using methods disclosed herein may be displayed using a tissue map representation such as tissue map 1425. In addition, other information like fibrous and lipid containing plaque could also be added to the tissue map such as shown in exemplary tissue map in FIG. 18. At stent deployment stage, physician could confirm landing zone easily from this plot. The intensity of green color indicates that the thickness of media but could be changed to indicate the distance of two EEL opposite endpoints in 180 degree. In turn, this may be used to useful information regarding stent size.

FIG. 17 shows tissue map of FIG. 16 with cross-sectional frames R1, R2, and R3 shown with media M, lumen L, and Calcium C identified. In one embodiment, these regions of interest are color coded, such as with lumen as blue, Calcium as red, and media as green. In turn, FIG. 18 shows a tissue map 1490 that includes indicia for guidewire GW (gray color), media M (green color), calcium Ca (red color), lipid LP (blue color), and sidebranch SB (border is shown). These various representations may be used to support various workflows and diagnostics.

In part, the disclosure relates to diagnostic systems and interfaces for the same that facilitate navigating a blood vessel representation with respect to which one or more imaging and tissue detection methodologies has been applied. With respect to a given blood vessel, such as a coronary artery or other body lumen, one or more tissue types or other regions of interest can be identified using various techniques. In particular, calcium nodules, calcified tissue and other calcium associated tissues can be represented such as calcified regions in blood vessels. One or more tissue map representations can be generated and used to displaying characterized tissue and regions of interest to a user. The characterized tissues and/or regions of interest suitable for detection and inclusion on a one or more tissue maps can include one or more of the following Lipid regions, lumen regions, stent struts, side branches, guidewires, external elastic layer (EEL), internal elastic layer (IEL), boundaries and volumes relating to the forgoing and other arterial features and tissues types as disclosed herein.

In part, the disclosure relates to user interface designs that facilitate improved information and time management using one or more tissue map representation based on characterized tissue of body lumen such as a coronary artery. In the various tissue maps shown, moving into direction of page is moving distally to the location in which an OCT image probe was positioned and then pulled back. The length of pullback is between R1 and RN, wherein RN is frame count of pullback. Lowest ring count is most proximal. In one embodiment, high ring count is most distal. This can be seen in ring arrangement of FIG. 15.

The disclosure is based in part on the discovery that calcium and other tissues of a blood vessel can be detected and characterized image data obtained with regard to a blood vessel such as OCT image data, IVUS image data, CT scan image data, MRI image data, angiography image data and other sources of image data. In some imaging modalities, calcified regions appear as discrete, darkened shapes. This is the case in OCT images with calcium showing as darker regions relative to the brighter vascular tissue background of OCT images.

In part, the disclosure relates to a method for identifying regions of interest in a blood vessel that can include tissue types and other features such as lumen, side branches, stents, guidewires and other features, characteristics and materials of the blood vessel.

In one embodiment, a representation of a blood vessel that has undergone tissue type analysis and/or tissue type segmentation one or more a two-dimensional cross-section of a blood vessel or a three-dimensional longitudinal rendering of the blood vessel. In one embodiment, the representation of the blood vessel or the underlying tissue characterized image data obtained with regard to the blood vessel is transformed into a tissue map. In one embodiment, various colors, shapes, hatching, masks, boundaries, and other graphical elements or overlays are used to identify or segment detected tissue types and/or regions of interest in the tissue map.

In part, the disclosure relates to a system for identifying regions of interest in a blood vessel, the system includes: a processor in communication with a memory, the memory containing instructions that when executed cause the processor to: obtain image data of the blood vessel; apply a plurality of filters to the image data to generate a characteristic or type such as a tissue type. In one embodiment, the image data is a plurality of scan lines. In one embodiment, the image data is an x-ray-based data. In one embodiment, the image data is a polar image. In one embodiment, one or more polar images are sampled. The samples are combined to generate a tissue characterized representation of a blood vessel. The tissue characterized representation of a blood vessel is in polar form. A tissue map is obtained in one embodiment by transforming the polar tissue characterized representation into a Cartesian representation. In one embodiment, the tissue map is a series of rings, circles, or ellipses arranged in order along a proximal to distal axis.

In part, one embodiment of the disclosure relates to an intravascular data collection system and one or more software-based graphic user interfaces and software modules to perform one or more detection and display processes as described herein. In one embodiment, intravascular data is collected while angiography data is simultaneously collected. In other embodiments, angiography, CT scans, x-ray-based imaging, photography, or other imaging modalities are used to obtain imaging data which is used to generate a tissue map.

In part, the disclosure relates systems and methods for treatment assessment including stent planning and surgical options by visualizing a subject's blood vessels such as one or more coronary arteries. The image data can be obtained using an intravascular data collection probe. The probe can be pulled back through a blood vessel and data can be collected with respect thereto. Such pullbacks and the associated data collection are used to plan stent deployment or evaluate deployed stents. The resulting intravascular data from a pullback can be used in various ways such as to visualize various blood vessel regions, features, and stents deployed in relation thereto. The image data used to generate the tissue map can be co-registered with corresponding angiography data. Thus, a user can select a region of a tissue map and see the underlying image data used to generate the map (OCT, IVUS, x-ray, etc.) and also see the angiography data with highlighting or other indicia showing the region of the blood vessel that was selected on the tissue map.

Stents can be visualized relative to side branches in various embodiments of the disclosure. This is an important feature as it is typically the case that during stent deployment it is desirable to avoid stenting a side branch. In this way, the tissue map can show side branches and the frames that contain them can be flagged as unsuitable for use a stent landing zones. The systems and methods described herein facilitate visualization of stent landing zones relative to different types of tissues and regions of interest. The tissue map can be co-registered with angiography data various user interface and representations of stent struts and side branches based upon the detection of these features in the intravascular data collected.

In part, the disclosure relates to intravascular data collection systems, such as OCT, IVUS, and other imaging modalities and the generation and visualization of diagnostic information such as stent landing zones, side branches, regions of interest, and characterized tissue regions in the blood vessel as part of a tissue map. Graphical elements suitable for indicating diagnostic information of interest such as the foregoing serve as user selected elements in the tissue map that facilitate movement to the underlying images summarized in the tissue map.

Also disclosed herein are systems and methods for visualizing stents, tissue types, tissue volumes, and tissue boundaries. One or more software modules can be used to detect side branch locations, lumen contours, and stent strut positions, generate a blood vessel representation, generate a tissue map, and control navigation to images based on user selections relative to the tissue map. The systems and methods disclosed herein also include automated measurement systems and related features that can measure angles, thickness, volume, width, frame count, relative proximity of tissue to lumen, of various tissue types including calcium, lipid, fiber and others.

In various embodiments, such measurement tools can be used be used to measure the foregoing parameters and any geometric property for a given region of interest for a particular tissue type. These measurements can be used to generate various ratings or scores suitable for consideration by end users. For example, if calcium burden in a particular region of a vessel appears in tissue map but overall is only a minor amount of surface calcium, measurements relative thereto can help guide a user and not exclude such a region as a candidate landing zone.

It will be appreciated that for clarity, the disclosure explicates various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly, it will be apparent that the described embodiments may be susceptible to alteration or variation according to common general knowledge without departing from the scope of the disclosure. The detailed description of embodiments is not to be regarded as limiting the scope of the applicant's teachings in any manner.

The terms "about" and "substantially identical" as used herein, refer to variations in a numerical quantity that can occur, for example, through measuring or handling procedures in the real world; through inadvertent error in these procedures; through differences/faults in the manufacture of electrical elements; through electrical losses; as well as variations that would be recognized by one skilled in the art as being equivalent so long as such variations do not encompass known values practiced by the prior art. Typically, the term "about" means greater or lesser than the value or range of values stated by $1/10$ of the stated value, e.g., ±10%. For instance, applying a voltage of about +3V DC to an element can mean a voltage between +2.7V DC and +3.3V DC. Likewise, wherein values are said to be "substantially identical," the values may differ by up to 5%. Whether or not modified by the term "about" or "substantially" identical, quantitative values recited in the claims include equivalents to the recited values, e.g., variations in the numerical quantity of such values that can occur, but would be recognized to be equivalents by a person skilled in the art.

Non-Limiting Software Features and Embodiments for MLS and Tissue Characterization/Classifying Systems and Methods The following description is intended to provide an overview of device hardware and other operating components suitable for performing the methods of the disclosure described herein. This description is not intended to limit the applicable environments or the scope of the disclosure. Similarly, the hardware and other operating components may be suitable as part of the apparatuses described above. The disclosure can be practiced with other system configurations, including personal computers, multiprocessor systems, microprocessor-based or programmable electronic device, network PCs, minicomputers, mainframe computers, and the like. The disclosure can also be practiced in distributed computing environments where tasks are performed by remote processing devices that are linked through a communications network such as in different rooms of a catheter or cath lab.

Some portions of the detailed description are presented in terms of algorithms and symbolic representations of operations on data bits within a computer memory. These algorithmic descriptions and representations can be used by those skilled in the computer and software related fields. In one embodiment, an algorithm is here, and generally, conceived to be a self-consistent sequence of operations leading to a desired result. The operations performed as methods stops or otherwise described herein are those requiring physical manipulations of physical quantities. Usually, though not necessarily, these quantities take the form of electrical or magnetic signals capable of being stored, transferred, combined, transformed, compared, and otherwise manipulated.

Unless specifically stated otherwise as apparent from the following discussion, it is appreciated that throughout the description, discussions utilizing terms such as "processing" or "computing" or "classifying" or "characterizing" or "correlating" or "detecting" "assessing" or "convolving" or "de-convolving" or "classifying" or "segmenting" or "training" or "annotating" or "registering" or "measuring" or "calculating" or "comparing" "generating" or "sensing" or "determining" or "displaying," or Boolean logic or other set related operations or the like, refer to the action and processes of a trained MLS, computer system, AI processor, GPU, or electronic device, that manipulates and transforms data represented as physical (electronic) quantities within the computer system's or electronic devices' registers and memories into other data similarly represented as physical quantities within electronic memories or registers or other such information storage, transmission or display devices.

The present disclosure, in some embodiments, also relates to apparatus for performing the operations herein. This apparatus may be specially constructed for the required purposes, or it may comprise a general purpose computer selectively activated or reconfigured by a computer program stored in the computer. Various circuits and components thereof can be used to perform some of the data collection and transformation and processing described herein.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language, and various embodiments may thus be implemented using a variety of programming languages.

Embodiments of the disclosure may be embodied in many different forms, including, but in no way limited to, computer program logic for use with a processor (e.g., a microprocessor, microcontroller, digital signal processor, or general purpose computer), programmable logic for use with a programmable logic device, (e.g., a Field Programmable Gate Array (FPGA) or other programmable logic device), discrete components, integrated circuitry (e.g., an Application Specific Integrated Circuit (ASIC)), or any other means including any combination thereof. In a typical embodiment of the present disclosure, some or all of the processing of the data collected using an OCT probe, 2D imaging, or 3D imaging system, and the processor-based system is implemented as a set of computer program instructions that is converted into a computer executable form, stored as such in a computer readable medium, and executed by a microprocessor under the control of an operating system. Thus, query response and input data are transformed into processor understandable instructions suitable for generating training sets, image masks, and other inputs and outputs disclosed herein. Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Python, Perl, Go, FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, or MySQL, using, for example, conventional or object-oriented techniques.

Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C #, COBOL, Fortran, LUA, Clojure, Java, Lisp, Pascal, Object Pascal; and examples of scripting languages include Bourne script, JavaScript, Python, Ruby, PHP, and Perl.

The operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure, based on the description herein with only a reasonable effort and without undue experimentation.

The various machine learning systems and associated neural networks such as deep learning neural networks, 3D neural networks, convolutional neural networks, 2D neural networks, N layer neural networks, feed forward neural networks, feed forward network, feed backward network, radial basis function neural network, Korhonen self-organizing neural network, recurrent neural network (RNN), modular neural network, deep learning network, artificial intelligence-based systems and frameworks, and combinations of the foregoing.

The software for the various machine learning systems described herein and other computer functions described herein may be implemented in computer software using any suitable computer programming language such as .NET, C, C++, Python, C #, Matlab programming modules and tools, and using conventional, functional, or object-oriented techniques. For example, the various machine learning systems may be implemented with software modules stored or otherwise maintained in computer readable media, e.g., RAM, ROM, secondary storage, etc. One or more processing cores (e.g., CPU, GPU and/or AI accelerator cores) of the machine learning system may then execute the software modules to implement the function of the respective machine learning system (e.g., network 107, encoders 111-114, learning coach 110, etc.).

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Various examples of suitable processing modules are discussed below in more detail. As used herein a module refers to software, hardware, or firmware suitable for performing a specific data processing or data transmission task. Typically, in a preferred embodiment a module refers to a software routine, program, or other memory resident application suitable for receiving, transforming, routing and processing instructions, or various types of data such as resistance changes, voltage changes, current changes, guidewire-based probe data, intravascular pressure data, ratios, indices and other information of interest.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system.

Memory may also include any means for storing software or other instructions including, for example and without limitation, a hard disk, an optical disk, floppy disk, DVD (digital versatile disc), CD (compact disc), memory stick, flash memory, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the disclosure described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the disclosure.

A storage medium may be non-transitory or include a non-transitory device. Accordingly, a non-transitory storage medium or non-transitory device may include a device that is tangible, meaning that the device has a concrete physical form, although the device may change its physical state. Thus, for example, non-transitory refers to a device remaining tangible despite this change in state.

The aspects, embodiments, features, and examples of the disclosure are to be considered illustrative in all respects and are not intended to limit the disclosure, the scope of which is defined only by the claims. Other embodiments, modifications, and usages will be apparent to those skilled in the art without departing from the spirit and scope of the claimed disclosure.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

When values or ranges of values are given, each value and the end points of a given range and the values there between may be increased or decreased by 20%, while still staying within the teachings of the disclosure, unless some different range is specifically mentioned.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

It is to be understood that the figures and descriptions of the disclosure have been simplified to illustrate elements that are relevant for a clear understanding of the disclosure, while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the disclosure, a single component may be replaced by multiple components, and multiple components may be replaced by a single component, to provide an element or structure or to perform a given function or functions. Except where such substitution would not be operative to practice certain embodiments of the disclosure, such substitution is considered within the scope of the disclosure.

The examples presented herein are intended to illustrate potential and specific implementations of the disclosure. It can be appreciated that the examples are intended primarily for purposes of illustration of the disclosure for those skilled in the art. There may be variations to these diagrams or the operations described herein without departing from the spirit of the disclosure. For instance, in certain cases, method steps or operations may be performed or executed in differing order, or operations may be added, deleted or modified.

What is claimed is:

1. A method for assessing a coronary artery comprising:
    acquiring a set of blood vessel image data;
    generating calcium annotations within the set of blood vessel image data;
    training a neural network of a machine learning system using the calcium annotations within the set of blood vessel image data;
    providing patient image data to the trained neural network;
    determining a prevalence of calcium within the patient image data based on output of the trained neural network;
    determining one or more blood vessel flow values based on the patient image data;
    providing for display, by one or more processors, a representation of the prevalence of calcium and the one or more blood vessel flow values.

2. The method of claim 1, wherein the representation of the prevalence of calcium comprises a score representing a calcium burden.

3. The method of claim 1, wherein the representation of the prevalence of calcium comprises a representation of a blood vessel that identifies regions of calcium based on output of the trained neural network.

4. The method of claim 1, wherein the representation of the blood vessel is a 3D representation.

5. The method of claim 1, further comprising identifying, one or more stenotic lesions within the vessel based on the output of the trained neural network.

6. The method of claim 1, further comprising:
    receiving, by one or more processors, user input in connection with a representation of the vessel identifying a region for a simulation of stenting;
    calculating, by the one or more processors, one or more updated blood flow values based on the simulation of stenting;
    providing for display, by the one or more processors, the one or more updated blood flow values.

7. A system for assessing a coronary artery comprising one or more computing devices configured to:
    acquire a set of blood vessel image data;
    determine calcium annotations within the set of blood vessel image data;
    train a neural network of a machine learning system using the calcium annotations within the set of blood vessel image data;
    provide patient image data to the trained neural network;
    determine a prevalence of calcium within the patient image data based on output of the trained neural network;
    determine one or more blood vessel flow values based on the patient image data;
    provide for display a representation of the prevalence of calcium and the one or more blood vessel flow values.

8. The system of claim 7, wherein the representation of the prevalence of calcium comprises a score representing a calcium burden.

9. The system of claim 7, wherein the representation of the prevalence of calcium comprises a representation of a blood vessel that identifies regions of calcium based on output of the trained neural network.

10. The system of claim 7, wherein the representation of the blood vessel is a 3D representation.

11. The system of claim 7, wherein the one or more computing devices are further configured to identify one or more stenotic lesions within the vessel based on the output of the trained neural network.

12. The system of claim 7, wherein the one or more computing devices are further configured to:
    receive user input in connection with a representation of the vessel identifying a region for a simulation of stenting;
    calculate one or more updated blood flow values based on the simulation of stenting;
    provide for display the one or more updated blood flow values.

* * * * *